(12) United States Patent
Horiuchi et al.

(10) Patent No.: US 8,184,711 B2
(45) Date of Patent: May 22, 2012

(54) IMAGE PROCESSING DEVICE AND IMAGE PROCESSING METHOD

(75) Inventors: Yuya Horiuchi, Kanagawa (JP); Shojiro Shibata, Kanagawa (JP); Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 12/530,828

(22) PCT Filed: Sep. 12, 2008

(86) PCT No.: PCT/JP2008/066917
§ 371 (c)(1),
(2), (4) Date: Sep. 11, 2009

(87) PCT Pub. No.: WO2009/035149
PCT Pub. Date: Mar. 19, 2009

(65) Prior Publication Data
US 2010/0098173 A1 Apr. 22, 2010

(30) Foreign Application Priority Data

Sep. 12, 2007 (JP) ................................. 2007-236941
Sep. 12, 2007 (JP) ................................. 2007-236942
Jun. 27, 2008 (JP) ................................. 2008-169398

(51) Int. Cl.
*H04N 11/02* (2006.01)
(52) U.S. Cl. ......... 375/240.18; 375/240.13; 375/240.14; 375/240.16; 375/240.24
(58) Field of Classification Search ............. 375/240.13, 375/240.14, 240.15, 240.16, 240.17, 240.18, 375/240.24
See application file for complete search history.

(56) References Cited

U.S. PATENT DOCUMENTS

| | | | | |
|---|---|---|---|---|
| 5,428,396 A | * | 6/1995 | Yagasaki et al. | 375/240.16 |
| 5,488,570 A | * | 1/1996 | Agarwal | 345/501 |
| 5,508,942 A | * | 4/1996 | Agarwal | 709/204 |
| 5,565,921 A | * | 10/1996 | Sasaki et al. | 375/240.13 |
| 5,604,494 A | | 2/1997 | Murakami et al. | |
| 5,703,646 A | | 12/1997 | Oda | |
| 5,721,589 A | | 2/1998 | Murata | |
| 5,805,228 A | * | 9/1998 | Proctor et al. | 375/240.22 |
| 5,870,145 A | | 2/1999 | Yada et al. | |
| 5,933,532 A | | 8/1999 | Mihara | |

(Continued)

FOREIGN PATENT DOCUMENTS

CN  1656818  8/2005

(Continued)

*Primary Examiner* — Phirin Sam
*Assistant Examiner* — Andrew C Lee
(74) *Attorney, Agent, or Firm* — Frommer Lawrence & Haug LLP; William S. Frommer

(57) ABSTRACT

To stop the decline of the quality of image associated with encoding. The present invention multiplies a decoding rescaling factor (RFr) possibly used in the decoding process by only a transformation matrix (D), which is scale change, to calculate a rescaling factor (RF), which is a plurality of division factors, and then calculates, for each detection unit, the sum (ΣY) of evaluation values (Y) based on a residue (r) obtained as a result of dividing an element of a DCT coefficient by a plurality of rescaling factors (RF). Moreover, the present invention compares correlations of the sum (ΣY) of the evaluation values (Y) with a plurality of rescaling factors (RF), and detects, based on the rescaling factor (RF) whose sum (ΣY) of the evaluation values (Y) is a minimum value, a quantization factor used in the previous process of encoding the input image data.

18 Claims, 31 Drawing Sheets

U.S. PATENT DOCUMENTS

| | | | |
|---|---|---|---|
| 6,100,931 | A | 8/2000 | Mihara |
| 6,101,276 | A * | 8/2000 | Adiletta et al. ............... 382/236 |
| 6,163,573 | A | 12/2000 | Mihara |
| 6,337,879 | B1 | 1/2002 | Mihara et al. |
| 6,393,060 | B1 * | 5/2002 | Jeong ....................... 375/240.19 |
| 6,408,027 | B2 * | 6/2002 | Mori et al. ............... 375/240.05 |
| 6,678,322 | B1 | 1/2004 | Mihara |
| 6,934,330 | B2 | 8/2005 | Sugiyama et al. |
| 7,286,715 | B2 | 10/2007 | Togashi et al. |
| 7,386,049 | B2 * | 6/2008 | Garrido et al. ........... 375/240.15 |
| 7,688,891 | B2 * | 3/2010 | Kondo et al. ............. 375/240.03 |
| 7,925,107 | B2 * | 4/2011 | Kim et al. ..................... 382/248 |
| 2003/0223495 | A1 | 12/2003 | Sun et al. |
| 2003/0223496 | A1 | 12/2003 | Sun et al. |
| 2003/0223645 | A1 | 12/2003 | Sun et al. |
| 2004/0022318 | A1 * | 2/2004 | Garrido et al. ........... 375/240.11 |
| 2004/0057523 | A1 * | 3/2004 | Koto et al. ............... 375/240.26 |
| 2005/0025249 | A1 * | 2/2005 | Zhao et al. ............... 375/240.24 |
| 2006/0215763 | A1 | 9/2006 | Morimoto et al. |
| 2007/0253479 | A1 * | 11/2007 | Mukherjee ................. 375/240.1 |
| 2007/0263728 | A1 * | 11/2007 | Yanagihara et al. ..... 375/240.24 |
| 2008/0101707 | A1 * | 5/2008 | Mukherjee et al. .......... 382/236 |
| 2009/0116760 | A1 * | 5/2009 | Boon et al. .................... 382/238 |

FOREIGN PATENT DOCUMENTS

| | | |
|---|---|---|
| DE | 603 13 454 T2 | 1/2008 |
| DE | 60313454 T2 | 1/2008 |
| EP | 1510078 | 3/2005 |
| EP | 1553782 | 7/2005 |
| EP | 1705920 | 9/2006 |
| EP | 1 746 843 | 1/2007 |
| JP | 4-114585 | 4/1992 |
| JP | 8-65677 | 3/1996 |
| JP | 09-294263 | 11/1997 |
| JP | 10-174098 | 6/1998 |
| JP | 2000-224587 | 8/2000 |
| JP | 3264043 | 12/2001 |
| JP | 2002 290914 | 10/2002 |
| JP | 3358620 | 10/2002 |
| JP | 2002-359853 | 12/2002 |
| JP | 3561962 | 6/2004 |
| JP | 2005-192232 | 7/2005 |
| JP | 2006-148419 | 6/2006 |
| JP | 2006-222555 | 8/2006 |
| JP | 2006-270437 | 10/2006 |
| JP | 2007-067469 | 3/2007 |
| JP | 4135427 | 6/2008 |
| KR | 10-2006-0115404 | 11/2006 |
| KR | 10-2007-0051807 | 5/2007 |
| TW | 241532 | 10/2005 |
| WO | WO 98/26602 | 6/1998 |
| WO | WO 03/101117 A1 | 12/2003 |
| WO | WO 03/101117 B | 5/2004 |

* cited by examiner though it offers the same quality as MPEG with half the amount of data.

IMAGE PROCESSING DEVICE AND IMAGE PROCESSING METHOD

TECHNICAL FIELD

The present invention relates to, for example, an encoding device that detects what the previous decoding process used, such as a quantization matrix or a quantized parameter, on a predetermined unit basis.

BACKGROUND ART

Conventionally, when video data are exchanged between television broadcasting stations or when video data are copied by, a plurality of videotape recorders (VTR devices), the video data encoded in MPEG (Moving picture experts group) are first decoded and then encoded again. This is why an encoder and a decoder need to be serially connected in tandem.

And such tandem systems repeat encoding and decoding, and the quality of video data deteriorates accordingly. To prevent this, so-called "back search" can be applied.

Here, "back search" is to calculate a quantization step of a minimum value as an appropriate quantization step based on the following characteristic: if a quantization step used in the previous encoding process or a quantization step that is a multiple of it is used, the sum of residues of DCT (discrete cosine transfer) coefficients becomes minimum.

A video data compression device equipped with the back search function is disclosed in Patent Document 1, for example: in order to prevent the deterioration of the video quality, which might occur due to the tandem connection of encoders and decoders and a repeat of encoding and decoding, the device uses the back search function to reproduce a quantization step of the previous encoding process, and uses the same quantization step and GOP (Group of pictures) phase as the previous one did to encode input video data again.

On the other hand, instead of MPEG, AVC (Advanced Video Coding) is becoming popular: it is used for low-speed and low-quality video transmission, such as a television telephone of a cell phone, and sizeable, high-quality video transmission, such as high-definition broadcast. AVC is a combination of algorithms, including motion compensation, interframe prediction, DCP, and entropy coding. It can offer the same quality as MPEG with half the amount of data.

And, especially, for AVC intra images (referred to as "AVC Intra," hereinafter), a quantization parameter QP is appropriately determined based on a target bit rate for quantization, but this quantization parameter QP is not necessarily the same as the one used in the previous encoding process. Using a different quantization parameter QP from the previous one may cause a deformation due to the rounding of the subsequent quantization processes; dubbing video many times hurts the quality of video data.
Patent Document 1: Japanese Patent Publication No. H10-174098

However, even if AVC Intra uses the same detection technique as that of MPEG to solve the above-mentioned dubbing problem, this may not work: dubbing causes the quality of video data to deteriorate because their encoding systems are different and the accuracy of back search therefore decreases.

DISCLOSURE OF THE INVENTION

To solve the above problem, an image processing device of the present invention includes: an orthogonal transformation section that generates a transformation coefficient by performing orthogonal transformation for image data, and performs, in terms of correlation with inverse orthogonal transformation, scale change on a value of a coefficient element constituting the transformation coefficient with a plurality of scales; a division factor calculation section that calculates a plurality of division factors by multiplying the scale change by a decoding factor calculated based on a plurality of quantization factors possibly used during decoding; a sum calculation section that calculates, for each detection unit, the sum of evaluation values based on a residue obtained as a result of dividing the element of the transformation coefficient by a plurality of the division factors; and a quantization factor detection section that compares correlations of the sum of the evaluation values with a plurality of the division factors, and detects, based on the division factor whose sum of the evaluation values is a minimum value, the quantization factor used in the previous process of encoding the image data.

Accordingly, the image processing device can compensate the scale change of the DCT process with the division factor. Therefore, the image processing device can prevent the scale change of the residue by a plurality of scales, and equally compare each evaluation value based on the residue. Thus, the accuracy of detection of back search improves.

Moreover, an image processing method of the present invention includes: an orthogonal transformation step of generating a transformation coefficient by performing orthogonal transformation for image data, and performing, in terms of correlation with inverse orthogonal transformation, scale change on a value of a coefficient element constituting the transformation coefficient with a plurality of scales; a division factor calculation step of calculating a plurality of division factors by multiplying the scale change by a decoding factor calculated based on a plurality of quantization factors possibly used during decoding; a sum calculation section step of calculating, for each detection unit, the sum of evaluation values based on a residue obtained as a result of dividing the element of the transformation coefficient by a plurality of the division factors; and a quantization factor detection step of comparing correlations of the sum of the evaluation values with a plurality of the division factors, and detecting, based on the division factor whose sum of the evaluation values is a minimum value, the quantization factor used in the previous process of encoding the image data.

Accordingly, the image processing device can compensate the scale change of the DCT process with the division factor. Therefore, the image processing device can prevent the scale change of the residue by a plurality of scales, and equally compare each evaluation value based on the residue. Thus, the accuracy of detection of back search improves.

Furthermore, an image processing device of the present invention includes: an orthogonal transformation section that performs orthogonal transformation for image data to generate a transformation coefficient; an element count section that counts, as the number of element occurrences, the number of times when each value of coefficient elements constituting the transformation coefficient appears; and an original image determination section that makes a determination as to whether the image data are an original image that have not yet undergone any encoding process or an unoriginal image that has undergone an encoding process at least once, based on the dispersion state of the number of element occurrences.

Accordingly, the image processing device can detect whether the image data is an original or unoriginal image before the back search process. This prevents the back search process from being wrongly applied to an original image.

An image processing device includes: a carrying section that carries, when performing an 8×8 DCT process as an integer DCT process, each element of calculation-target image data or a transformation matrix by three bits in the horizontal and vertical directions before completing an 8×8 DCT calculation process for the horizontal and vertical directions; and a borrowing section that borrows three bits for each item of coefficient data based on a DCT coefficient after completing the 8×8 DCT calculation process for the horizontal and vertical directions.

Accordingly, the image processing device can reduce the number of times when the calculation rounding occurs during the 8×8 DCT process, thereby improving the accuracy of calculation.

According to the present invention, since they can compensate the scale change of the DCT process with the division factor, the image processing device and the image processing method can prevent the scale change of the residue by a plurality of scales to equally compare each evaluation value based on the residue. Therefore, the accuracy of detection of back search improves. Thus, the image processing device and image processing method capable of stopping the decline of the quality of image associated with encoding can be realized.

Moreover, according to the present invention, the image processing device can detect whether the image data are an original or unoriginal image before the back search process, and therefore prevent the back search process from being wrongly applied to an original image. Thus, the image processing device capable of stopping the decline of the quality of image associated with encoding can be realized.

Furthermore, according to the present invention, the image processing device can reduce the number of times when the calculation rounding occurs during the 8×8 DCT process, thereby improving the accuracy of calculation. Thus, the image processing device capable of stopping the decline of the quality of image associated with encoding can be realized.

BEST MODE FOR CARRYING OUT THE INVENTION

The best embodiment of the present invention (just referred to as an embodiment, hereinafter) will be described in detail with reference to the accompanying drawings in the following order:
(1) Overview of the present invention
(2) First embodiment (AVC back search)
(3) Second embodiment (back search's determination as to an original/unoriginal image)
(4) Third embodiment (preliminary QP detection before back search)
(5) Fourth embodiment (Setting of quantization matrix)
(6) Fifth embodiment (Curbing of calculation rounding during 8×8 integer DCT).

(1) Overview of the Present Invention

(1-1) Premise

Generally, a deformation occurs on an original baseband image after encoding and decoding processes because the encoding of AVC (Advanced Video Coding) is an irreversible conversion. So dubbing video many times, or repeating encoding and decoding processes, in a tandem system causes the quality of video to deteriorate due to distortion.

Therefore, according to a first embodiment of the present invention, in which an encoded image is decoded and then the decoded image is encoded again, AVC intra-image encoding uses the following three parameters again after it used them in the previous encoding process. This reduces the deformation of the image to a level at which only the arithmetic errors of an encoder and a decoder are observed.
(1) Intra-image prediction mode
(2) Quantization matrix (Qmatrix)
(3) Quantization parameter (QP)

Among them, a quantization matrix detection process of the first embodiment especially focuses on (2); a quantization parameter detection process focuses on (3); an intra-image prediction mode detection process focuses on (1).

That is, when dubbing is carried out for AVC intra image, or AVC Intra, the previously-used quantization matrix Qmatrix, quantization parameter QP and intra-image prediction mode are detected; the use of the same Qmatrix and QP prevents the rounding of quantization, improving the quality of dubbing.

Figure 1:
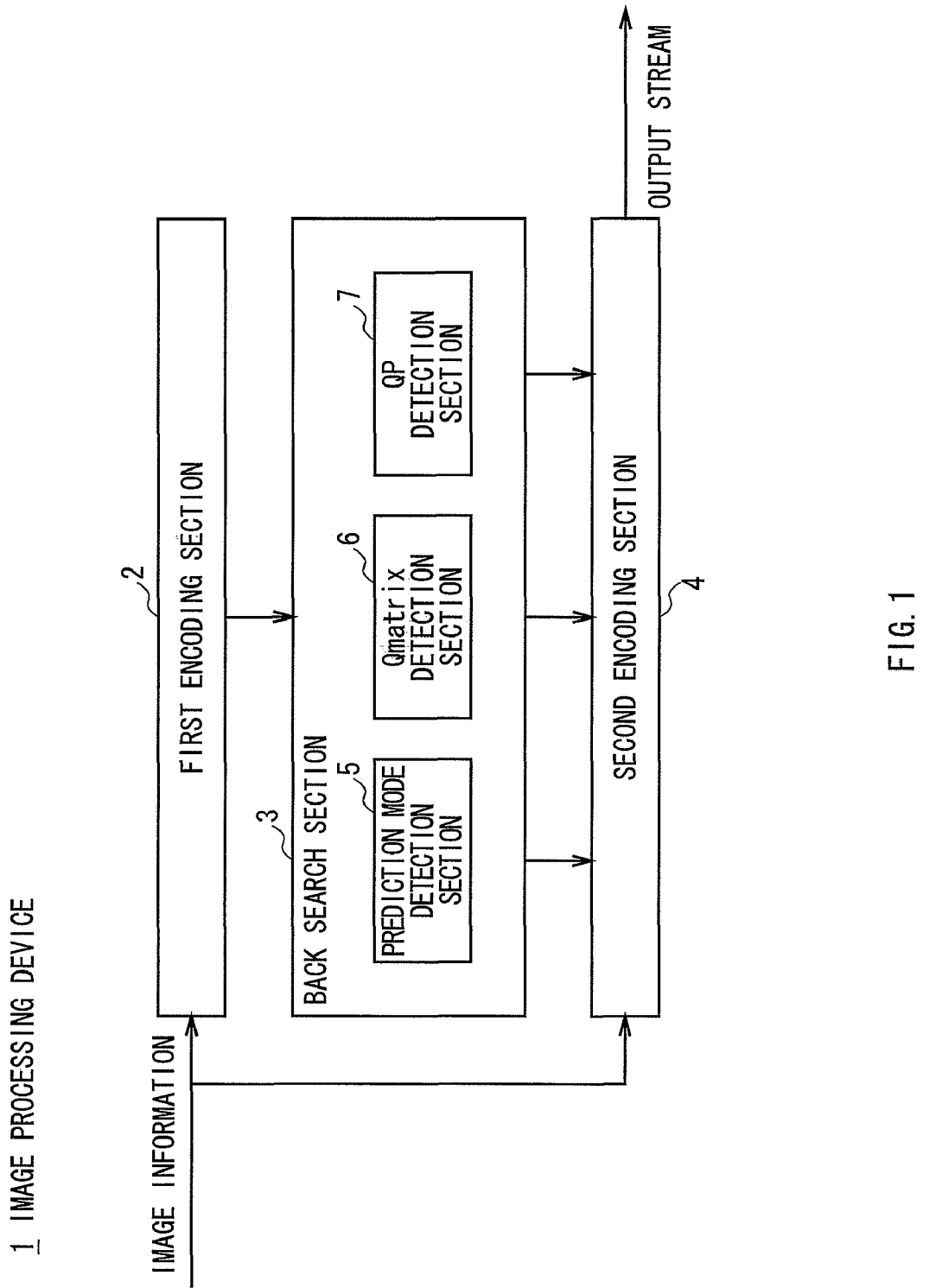
FIG. 1 is a schematic diagram illustrating an image processing device according to first and second embodiments of the present invention.

Here, FIG. 1 is a conceptual diagram regarding an encoding device and method according to the first embodiment of the present invention. They are described below.

As shown in FIG. 1, an image processing device 1 includes a first encoding section 2, a second encoding section 3, and a back search section 3. Moreover, the back search section 3 includes a prediction mode detection section 5, a quantization matrix (Qmatrix) detection section 6, and a quantization parameter (QP) detection section 7.

With this configuration, the first encoding section 2 performs a first encoding process for the input image information. By evaluating a residue r obtained as a result of dividing an integer DCT coefficient, which is obtained in the process of the first encoding process, by a rescaling factor (RF), which is a combination of various quantization matrixes Qmatrix and quantization parameters QP, the back search section 3 detects the quantization matrix Qmatrix, quantization parameter QP and intra-image prediction mode used in the first decoding process. And the second encoding section 2 performs a second encoding process using the quantization matrix Qmatrix, quantization parameter QP and intra-image prediction mode, which were detected by the back search section 3 during the first encoding process.

More specifically, the Qmatrix detection section 6 of the back search section 3 uses the residue r obtained as a result of dividing the integer DCT coefficient, which is obtained in the process of the first encoding process, by the rescaling factor (RF), which is a combination of various quantization matrixes Qmatrix and quantization parameters QP, to detect a quantization matrix Qmatrix on per slice basis.

The QP detection section 7 uses the residue obtained as a result of dividing the integer DCT coefficient, which is obtained in the process of the first encoding process, by the rescaling factor (RF), which is a combination of various quantization matrixes Qmatrix and quantization parameters QP, to detect a quantization parameter QP on per macro block basis.

Moreover, the prediction mode detection section 5 detects the intra-image prediction mode, which was used in the previous encoding process. This detected prediction mode will be used by the second encoding section 2.

First, in order to have a much better understanding of the image processing device 1 of the first embodiment of the present invention, the following describes in detail unique characteristics and principles that the present embodiment focuses on.

As shown in FIG. 1, according to AVC, for an Intra image, one intra-image prediction mode is selected from nine intra-image prediction modes, and the selected intra-image prediction mode is used to generate a difference image data from the input image. Incidentally, AVC for Intra images is referred to as AVC Intra. Then, according to AVC Intra, a DCT process is performed for the difference image data, and a resultant DCT coefficient is quantized by a combination of the quantization matrix Qmatrix and the quantization parameter QP to generate quantization data which is a quantization level (quantization coefficient). The quantization data is encoded by a predetermined encoding process and becomes an encoding stream. In the encoding stream, the intra-image prediction mode, quantization matrix Qmatrix and quantization parameter QP used in the encoding process are set.

According to AVC, the set intra-image prediction mode, quantization matrix Qmatrix and quantization parameter QP are used to decode the quantization data. But it cannot reproduce the residues dropped during the encoding process, and the quality of video data deteriorates accordingly. This deterioration of the video quality is referred to as a quantization deformation, hereinafter.

For example, professional broadcasting devices often repeat encoding and decoding processes of video data several times; if different intra-image prediction modes, quantization matrixes Qmatrix and quantization parameters QP are used each time, the quantization deformation occurs in each encoding process, thereby decreasing the quality of video data.

According to AVC Intra, when an image is encoded again after being encoded and then decoded, using the same quantization matrix Qmatrix, quantization parameter QP and intra-image prediction mode as the previous encoding did can prevent further deformation of quantization because the previous encoding process has already eliminated the quantization deformation.

Therefore, according to the present invention, the quantization matrix Qmatrix, quantization parameter QP and intra-image prediction mode used in the previous encoding process are detected, and the encoding process is carried out with them. This prevents the quality of video data from deteriorating.

The process by which the quantization matrix Qmatrix, quantization parameter QP, or intra-image prediction mode used in the previous encoding process is highly likely to be detected is referred to as a "back search" below.

As mentioned in the above. Patent Document 1, according to back search, for MPEG (Moving picture experts group)-2, a DCT coefficient is divided by each quantization scale Q; the quantization scale Q having the smallest residue r can be detected as a quantization scale Q used in the previous encoding process.

However, applying the MPEG-2's method to the case of AVC decreases the accuracy of detection because there are differences between AVC and MPEG-2:

The encoding process cannot use the DCT coefficient in the same way as the decoding process does because of the introduction of integer arithmetic;

The decoding process's calculation error is large, affecting the accuracy of detection;

Since the residue function has a cycle regarding the quantization parameters QP, there is a plurality of points which have the same minimum value.

Accordingly, the aim of the present invention is that: by using AVC for decoding, it tries to detect what the previous encoding process used, such as the quantization matrix Qmatrix and the quantization parameter QP, on a predetermined unit basis; and it uses them again to reduce the rounding error of quantization caused by dubbing, thereby improving the quality of dubbing.

(1-2) Principle of Back Search (1-2-1) Detection of the Quantization Parameter and the Quantization Matrix The following provides a specific example of the above back search.

According to AVC Intra, the decoding process reproduces an integer DCT coefficient W left-shifted by six bits by multiplying a quantization level Z by a rescaling factor RF, which is a function of the quantization matrix Qmatrix and the quantization parameter QP:

$$(W<<6)=Z*RF \quad (1)$$

$$RFr=\{VQmatrix2^{floor(QP/6)}\}>>4 \quad (2)$$

V: Multiplication factor for AVC

In this manner, during the decoding process, the integer DCT coefficient W is obtained by multiplying the quantization level Z by RF. Therefore, the integer DCT coefficient W is divisible by RF in the subsequent encoding process. This means that if the subsequent encoding process divides the shifted integer DCT coefficient (W<<6) by the same RF, the resultant residue is considered to be zero. Accordingly, the quantization matrix Qmatrix and quantization parameter QP used in the previous encoding process can be detected by evaluating the magnitude of the residue r obtained by dividing the shifted integer DCT coefficient (Q<<6) by the rescaling factor RF, which is a combination of the various quantization matrixes Qmatrix and quantization parameters QP.

In addition to that, the image processing device 1 of the first embodiment takes into account the following points (i) to (vi) regarding the characteristics of AVC Intra, which MPEG does not take into account, in order to improve the accuracy of detection. Each point is described below.

(i) Transform of RF for Encoding and Decoding

According to AVC Intra, the DCT portion is divided into two sections; an integer section, which is referred to as an integer DCT, and a non-integer section, which, along with quantization, is referred to as quantization. According to AVC Intra, a point where the integer section is separated from the non-integer section is different between the encoding process and the decoding process: the integer DCT for the encoding process (referred to as "DCT," hereinafter) and the integer inverse DCT for the decoding process (referred to as "inverse DCT," hereinafter) are not inverse transformation. This means that the DCT coefficient W for the encoding process is different from the inverse DCT coefficient W (designated as "W'," hereinafter) for the decoding process.

Accordingly, the DCT coefficient W and the inverse DCT coefficient W' are expressed as follows:

$$W = A \times A^T = \begin{pmatrix} 1 & 1 & 1 & 1 \\ 2 & 1 & -1 & -2 \\ 1 & -1 & -1 & 1 \\ 1 & -2 & 2 & -1 \end{pmatrix} x \begin{pmatrix} 1 & 1 & 1 & 1 \\ 2 & 1 & -1 & -2 \\ 1 & -1 & -1 & 1 \\ 1 & -2 & 2 & -1 \end{pmatrix}^T \quad (3)$$

$$x = CW'C^T = \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix} W' \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix}^T \quad (4)$$

The above equations of the DCT and the inverse DCT leads to the following, equation for the DCT coefficient W and the inverse DCT coefficient W':

$$\begin{aligned}
W &= \begin{pmatrix} 1 & 1 & 1 & 1 \\ 2 & 1 & -1 & -2 \\ 1 & -1 & -1 & 1 \\ 1 & -2 & 2 & -1 \end{pmatrix} x \begin{pmatrix} 1 & 1 & 1 & 1 \\ 2 & 1 & -1 & -2 \\ 1 & -1 & -1 & 1 \\ 1 & -2 & 2 & -1 \end{pmatrix}^T \\
&= \begin{pmatrix} 1 & 1 & 1 & 1 \\ 2 & 1 & -1 & -2 \\ 1 & -1 & -1 & 1 \\ 1 & -2 & 2 & -1 \end{pmatrix} \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix} W' \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix}^T \begin{pmatrix} 1 & 1 & 1 & 1 \\ 2 & 1 & -1 & -2 \\ 1 & -1 & -1 & 1 \\ 1 & -2 & 2 & -1 \end{pmatrix}^T \\
&= \begin{pmatrix} 4 & 0 & 0 & 0 \\ 0 & 5 & 0 & 0 \\ 0 & 0 & 4 & 0 \\ 0 & 0 & 0 & 5 \end{pmatrix} W' \begin{pmatrix} 4 & 0 & 0 & 0 \\ 0 & 5 & 0 & 0 \\ 0 & 0 & 4 & 0 \\ 0 & 0 & 0 & 5 \end{pmatrix} \\
&= \begin{pmatrix} 16 & 20 & 16 & 20 \\ 20 & 25 & 20 & 25 \\ 16 & 20 & 16 & 20 \\ 20 & 25 & 20 & 25 \end{pmatrix} \otimes W'_{ij} \\
&= D_{ij} \otimes W'_{ij}
\end{aligned} \quad (5)$$

In this manner, W is obtained as a result of multiplying 16, 20, and 25 according to the position (i,j) of the DCT coefficient W': this transformation matrix is designated as "D" for an equation (6). This means that RF, which is used for the back search's encoding process, is obtained by multiplying RF (designated as "RFr," hereinafter) that is used for the decoding process by the transformation matrix D of the DCT coefficient W and the inverse DCT coefficient W':

$$D = \begin{pmatrix} 16 & 20 & 16 & 20 \\ 20 & 25 & 20 & 25 \\ 16 & 20 & 16 & 20 \\ 20 & 25 & 20 & 25 \end{pmatrix} \quad (6)$$

Figure 2:
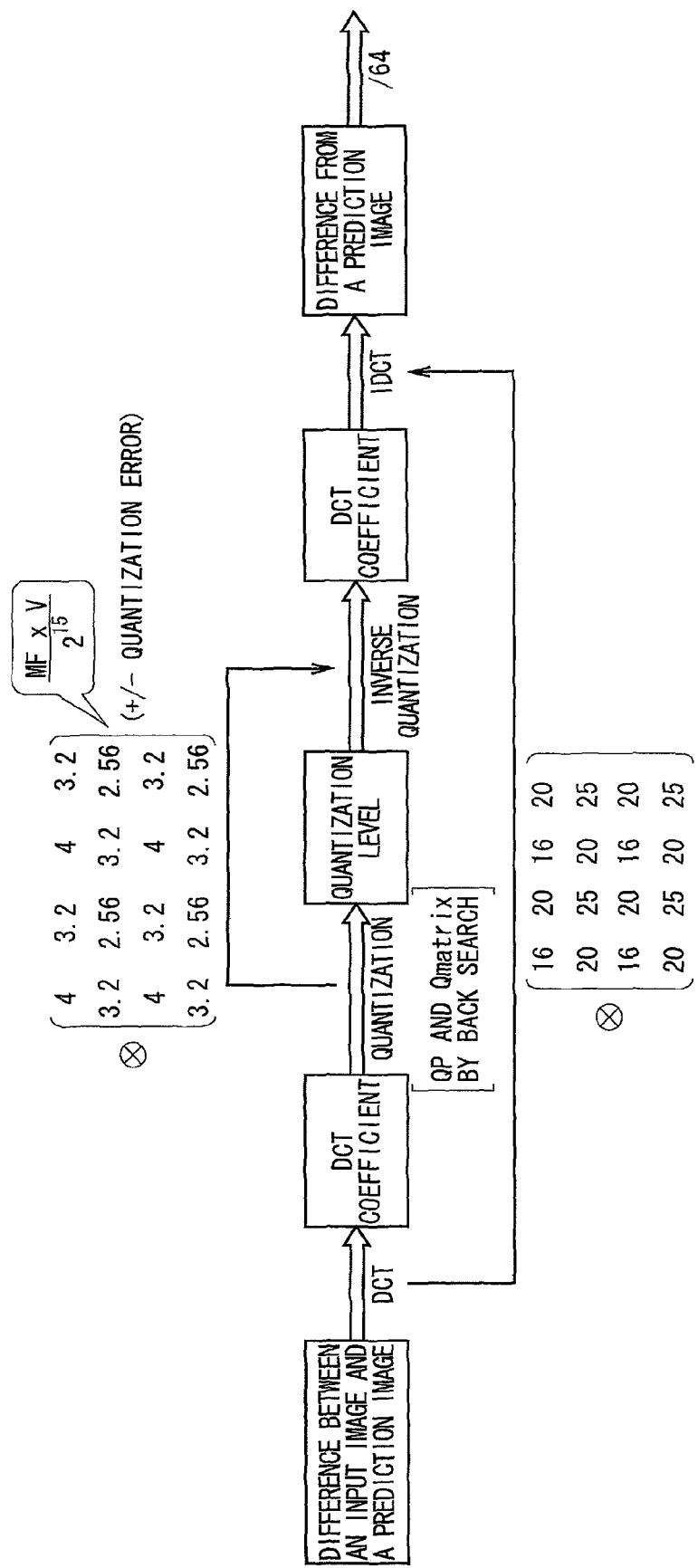
FIG. 2 is a schematic diagram illustrating the conversion and quantization of AVC standard.

So as shown in FIG. 2, according to AVC Intra, if the encoding and decoding processes perform a DCT process for difference image data and then an inverse DCT process for them, a value of the decoded difference image data is scaled up by the equivalent of the transformation matrix D.

Moreover, according to AVC Intra, a scaling ER, as indicated in the following equation, occurs during quantization. Incidentally, if real numbers are used, the equation (7) can be expressed as an equation (8). This means that, according to AVC Intra, if the encoding and decoding processes perform the quantization process and the inverse quantization process for the DCT coefficient, a value of an element of the inverse DCT coefficient is scaled up by the equivalent of a quantization error ER:

$$ER = MF \times V / 2^{15} \quad (7)$$

$$ER = \begin{pmatrix} 4 & 3.2 & 4 & 3.2 \\ 3.2 & 2.56 & 3.2 & 2.56 \\ 4 & 3.2 & 4 & 3.2 \\ 3.2 & 2.56 & 3.2 & 2.56 \end{pmatrix} \quad (8)$$

So according to AVC Intra, the decoding process divides the decoded difference image data by 64 so that the value of the decoded difference image data is at the same level as the difference image data.

Therefore, according to AVC Intra, one can assume that the difference image data have been already multiplied by the transformation matrix D and scaled up at a time when the DCT process is performed for them. This means that the value of residue r is scaled up accordingly: the value (i.e. a coefficient element), however, varies according to the position of the matrix as indicated by the equation (8).

Accordingly, if the DCT coefficient is divided by a decoding rescaling factor RF, the residue r may become larger or smaller depending on where the DCT coefficient is. This makes it impossible to simply compare the residues r.

Accordingly, the image processing device 1 calculates a rescaling factor RF, which is used to divide during the back search process, by multiplying the rescaling factor used in the decoding process (referred to as a decoding rescaling factor RFr, hereinafter) by the transformation matrix D:

$$RF = RFr * D \quad (9)$$

$$= \{VQmatrixD2^{floor(QP/6)}\} \gg 4$$

So if the transformation matrix D of the DCT coefficient W and the inverse DCT coefficient W' of the equation (5) is taken into account, the DCT coefficient W of the input image (difference image data) which once underwent the decoding process is thought to be divisible by $\{VQmatrix\ D2^{floor(Q/P6)}\}$ and the residue r is thought to be zero.

This allows the image processing device 1 to eliminate the effect of the scaling up of the DCT process from the residues r and to compare the residues at the same scale.

In that manner, the image processing device 1 calculates the rescaling factor RF by multiplying the decoding rescaling factor RFr by the value of the transformation matrix D. Therefore, by dividing the difference image data by the rescaling factor RF, the image processing device 1 can divide what the DCT process has scaled up at the same time. This reduces a change in residue r, which is caused by scaling up, and therefore improves the accuracy in detection of the back search.

(ii) Error During the Decoding Process

According to AVC Intra, the difference image data, which shows a difference from a prediction image predicted from surrounding pixels, are encoded. During the decoding process, the quantization level Z is multiplied by the decoding rescaling factor RFr. In this case, to prevent the rounding of calculation during the decoding process, the decoding rescaling factor RFr's figures have been moved six bits to the left (therefore, the inverse DCT coefficient left-shifted by six bits is obtained during the decoding process) according to the standard.

Accordingly, the inverse quantization process and the inverse DCT process are carried out with the figures moved six bits to the left. After adding the prediction image and the one whose figures have been moved six bits to the left, the result of addition is moved six bits to the right to obtain a baseband image. After moving the figures six bits to the right, the lower six bits are rounded off, thereby causing an arithmetic error E. In this case, the shifted DCT coefficient (W<<6) which will be obtained after the subsequent encoding process may not be divided by the rescaling factor RF.

The present invention therefore detects the quantization parameter QP whose residue r is the smallest; not the one whose residue r is zero.

In case the arithmetic error E of the decoding process is a negative number, the real residue r is compared with the result of subtracting the residue r from the rescaling factor r, and the smaller one is regarded as an evaluation value Y.

The following describes a case in which RF is 3600 and the DCT coefficient W is 7200.

If there is not arithmetic error E, the residue r is expressed as follows:

$$r = W \% RF \quad (10)$$
$$= 7200 \% 3600$$
$$= 0$$

The matter of the fact is that it cannot estimate the arithmetic error E. But if E is −2 and the residue r is simply regarded as the evaluation value Y, the following equation is obtained, and it becomes difficult to detect it as the smallest value:

$$Y = r = (W+E)\%RF = 3598 \quad (11)$$

Here, as mentioned above, if the real residue r is compared with the result of subtracting the residue r from the rescaling factor r and the smaller one is regarded as an evaluation value Y, the following equation is obtained, and the evaluation value Y is an absolute value of the arithmetic error E:

$$Y = \min[r, (RF-r)] = \min[3598, 2] = 2 \quad (12)$$

Accordingly, the image processing device 1 of the present invention follows the equation (12) to calculate the evaluation value Y and detects the quantization parameter QP whose evaluation value Y is the smallest. This allows the image processing device 1 to detect the appropriate quantization parameter QP using the appropriate evaluation value Y.

Figure 3:
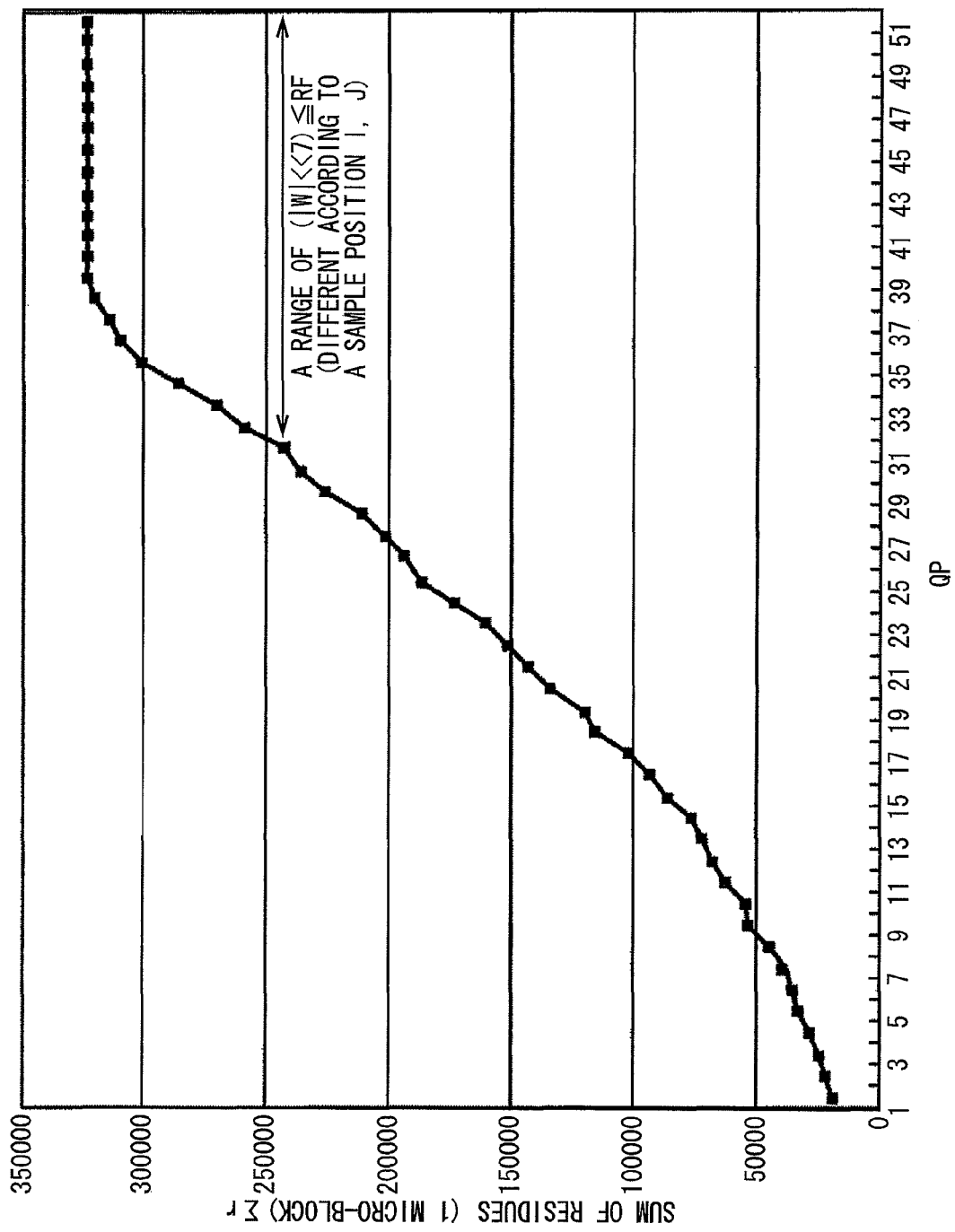
FIG. 3 is a diagram illustrating a correlation between a quantization parameter QP and the sum of residues Σr when an input image is an image that has not yet undergone any encoding process.

(iii) Characteristics of a Residue Curve and a Cycle of the Quantization Parameter QP If an image which has not yet undergone any encoding process is input and the residues r are calculated by dividing the 6 bit-shifted DCT coefficient (W<<6) by the rescaling factors RF of various quantization parameters QP, a upward-sloping curve is obtained as shown in FIG. 3: the horizontal axis of the graph represents the quantization parameter QP while the vertical axis represents the sum of the residues r ($\Sigma$r).

Figure 4:
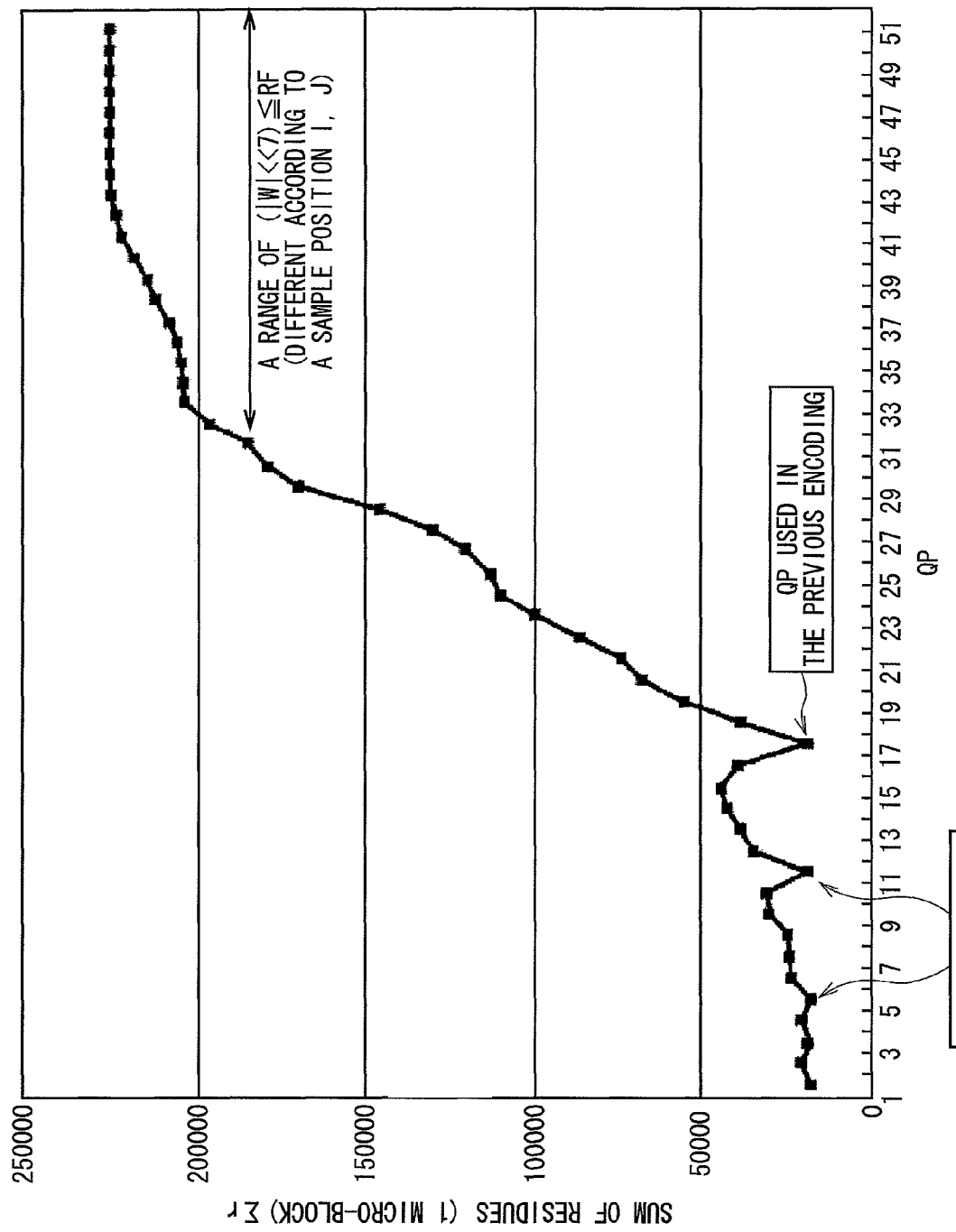
FIG. 4 is a diagram illustrating a correlation between a quantization parameter QP and the sum of residues Σr for an input image that has already undergone encoding and decoding processes.

Similarly, if an image which has undergone the encoding and decoding processes is input and the residues r are calculated by dividing the 6 bit-shifted DCT coefficient (W<<6) by the rescaling factors RF of various quantization parameters QP, a curve is obtained as shown in FIG. 4: the horizontal axis of the graph represents the quantization parameter QP while the vertical axis represents the sum of the residues r ($\Sigma$r). In this case, even though the sum of the residues r ($\Sigma$r) has the smallest value, it still slopes upwards when going from left to right. When the quantization parameter QP becomes smaller, so does the sum of the residues r ($\Sigma$r), regardless of whether the encoding and decoding process have been done or not.

Accordingly, if the sum of the residues r ($\Sigma$r) of one quantization parameter QP is simply compared with that of the other, a quantization parameter QP which is smaller than the quantization parameter QP used in the previous encoding process may be wrongly detected as the smallest. To prevent this, it uses the evaluation values Y obtained as a result of standardizing the values of the residues r by the rescaling factor RF.

Figure 5:
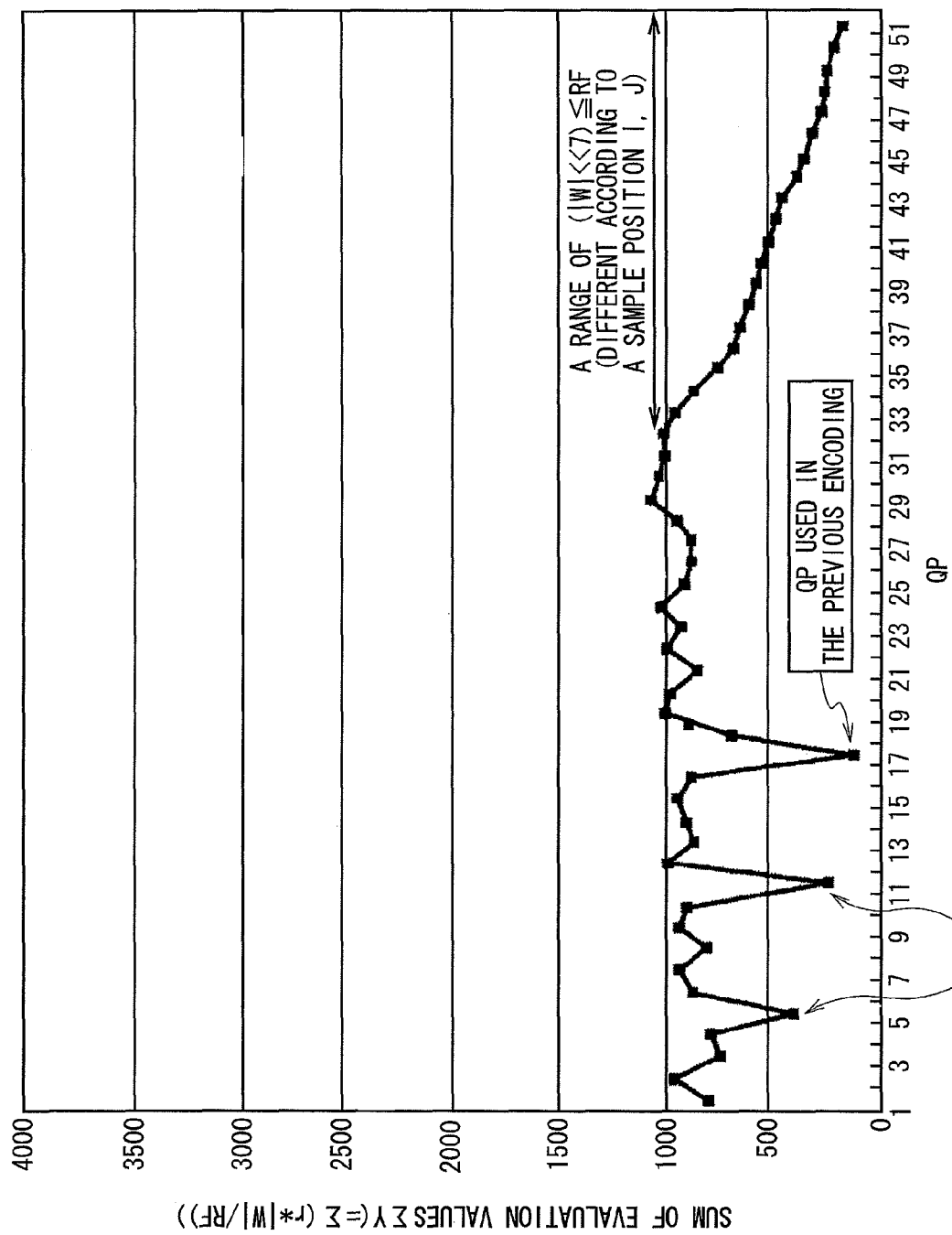
FIG. 5 is a diagram illustrating a correlation between a quantization parameter QP and the sum of residues Σr after standardization by a rescaling factor RF.

FIG. 5 shows a correlation between the sum of the evaluation values Y ($\Sigma$Y) and the quantization parameters QP at that time. It is obvious from FIG. 5 that the sum of the evaluation values Y ($\Sigma$Y) of the quantization parameter QP used in the previous encoding process is smaller than the sum of the evaluation values Y ($\Sigma$Y) of the quantization parameter QP whose figures have been moved by 6n.

Moreover, as shown in FIGS. 3 and 4, there may be a range where the evaluation values Y (the absolute values of the residues r) of the quantization parameter QP with (|W|<<7) $\leq$RF becomes flat; after the standardization of the rescaling factor RF, this range monotonously decreases (see FIG. 5) and may become a cause of detection error.

In this case, even if divided by the same rescaling factor RF, the residue r statistically becomes larger as the DCT coefficient W increases. Accordingly, after scaling the residue by the absolute value |W| of the DCT coefficient, it is standardized by the rescaling factor RF. So if the DCT coefficient W which could offer a large residue actually offers a small residue, it assumes that it did not incidentally happen and therefore can weight it (it usually weights low-frequency components because the lower-frequency components have the larger DCT coefficients W for lower frequency components).

Figure 6:
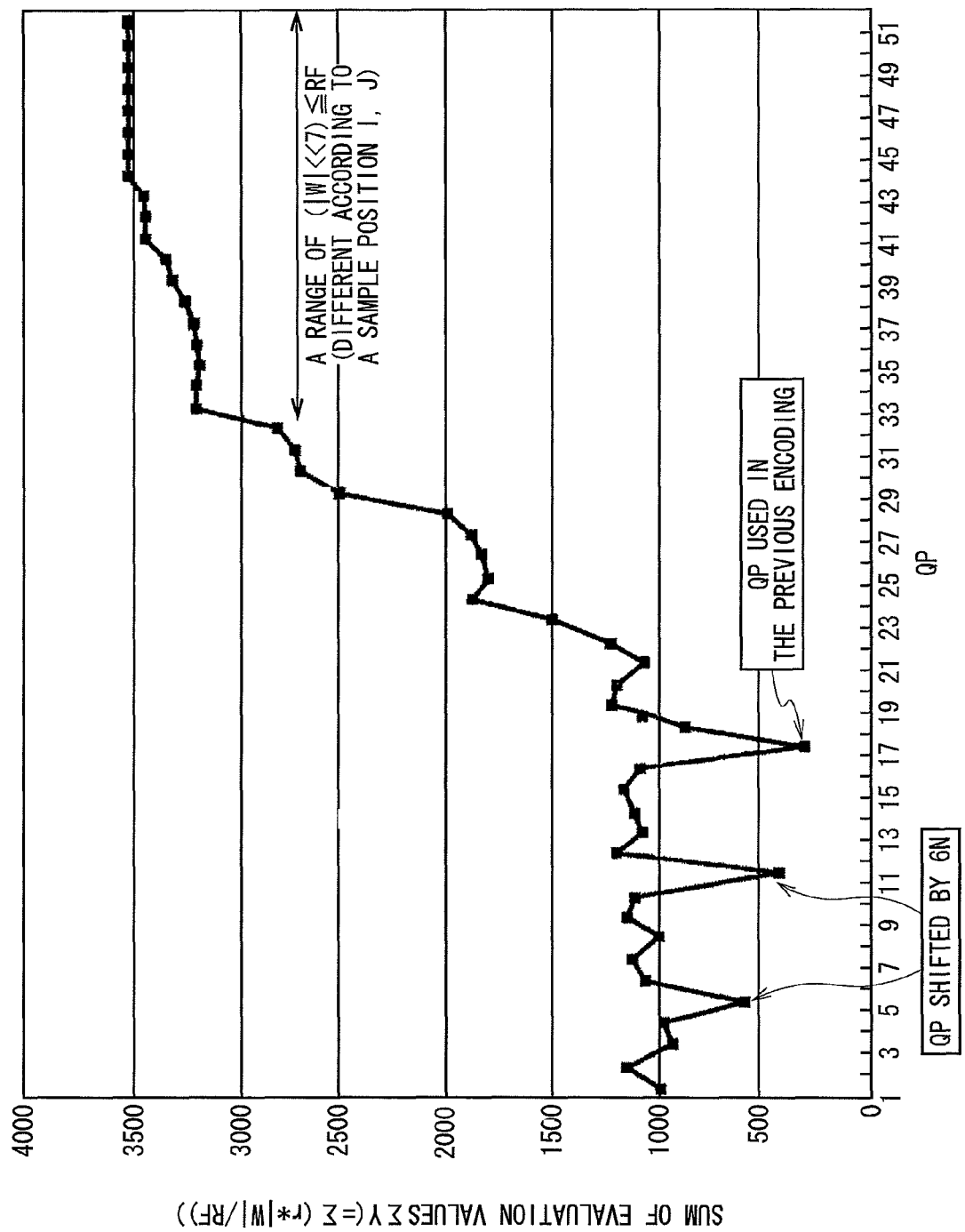
FIG. 6 is a diagram illustrating a correlation between a quantization parameter QP and the sum of residues. Σr after standardization by a rescaling factor RF and the correction of predetermined area.

FIG. 6 shows a correlation between the sum of the evaluation values Y ($\Sigma$Y), whose residues r were scaled by the absolute value |W| of the DCT coefficient and then standardized by the rescaling factor RF, and the quantization parameters QP. It is obvious from the diagram that there is substantially no difference between FIG. 6 and FIG. 5 in terms of the sum of the evaluation values Y ($\Sigma$Y) of the quantization parameter QP used in the previous encoding process and the sum of the evaluation values Y ($\Sigma$Y) of the quantization parameter QP whose figures have been moved by 6n.

Moreover, the image processing device 1 may perform the standardization of the rescaling factor RF only in the range of (|W|<<7)>RF where the sum of the evaluation values Y ($\Sigma$Y) makes a slope, while using, in the other ranges, the value of the DCT coefficient |W| as the evaluation value Y.

This allows the image processing device 1, as shown in FIG. 6, to prevent the situation in which the sum of the evaluation values Y ($\Sigma$Y) becomes the smallest in the range of (|W|<<7)$\leq$RF due to the standardization of the rescaling factor RF and the wrong quantization parameter QP is recognized as the previously-used quantization parameter QP.

(iv) Cycle of the Quantization Parameter QP

According to AVC Intra, if the quantization parameter QP changes in a range of ±6, the rescaling factor RF becomes ±2 times larger. Accordingly, if the sum of the residues r ($\Sigma$r) of one quantization parameter QP has the smallest value, the sum of the residues r ($\Sigma$r) of QP±6n (n=1, 2, may have the smallest value (see FIG. 4).

So if the above evaluation value E is evaluated in a simple manner, the quantization parameter whose figures have been moved by 6n may be detected. Accordingly, if the quantization parameter QP which is 6n larger than the quantization parameter QP whose sum of the residues r ($\Sigma$r) is the smallest has the smallest value, the image processing device 1 uses this quantization parameter QP.

More specifically, the image processing device 1 chooses about five quantization parameters QP whose $\Sigma$r (the sum of the residues r) is smaller than the rest, and stores them in an ascending order of their $\Sigma$r in a queue; the image processing device 1 then compares QP whose $\Sigma$r is the smallest with another QP whose $\Sigma$r is the second smallest, and if the difference between them is 6n, the image processing device 1 selects the larger QP. Moreover, the image processing device 1 compares the selected quantization parameter QP with the quantization parameter QP whose $\Sigma$r is the third smallest, and if the difference between them is 6n, the image processing device 1 replaces it to select the larger QP.

In this manner, if it has detected a plurality of the minimum values of the sum of the residues r ($\Sigma$r), the image processing device 1 selects the quantization parameter QP whose value is 6n larger than the other, even if its residue is not the smallest. This prevents the image processing device 1 to wrongly recognize the quantization parameter QP whose value has been shifted by 6n as the quantization parameter QP used in the previous encoding process.

Moreover, the image processing device 1 checks whether the cycle of the sums of the residues r ($\Sigma$r) detected is 6n to avoid detecting an accidental minimum value as the quantization parameter QP used in the previous encoding process.

(v) Method of Reducing an Amount of Calculation

The image processing device 1 of the present invention calculates the rescaling factor RF in a similar way to that of the above-mentioned method that deals with various quantization parameters QP, and detects the quantization parameter QP used in the previous encoding process using the evaluation value Y calculated from the residues r. Accordingly, the amount of calculation and evaluation increases as the number of the possible quantization parameters QP increases. To prevent this, if the value of the quantization parameter QP used in the previous encoding process can be roughly estimated, the image processing device 1 then evaluates only the quantization parameters QP around the estimated value, thereby reducing the amount of calculation.

Incidentally, this quantization parameter QP can also be calculated by an original image determination process with quantization coefficients, which is described as a third embodiment, for example. It can also be estimated from the activity of the input image data and the like.

(vi) Other Conditions, Including the Following, are Taken into Account.

Even if the intra-image prediction mode is different from that of the previous encoding process, the rate of detection can be maintained as long as the replacement of 6n, as mentioned in the above (iv), is carried out. The same holds for the case in which the value of the quantization parameter QP can be roughly estimated. This focuses on the problem that occurs when the prediction mode is different from that of the previous encoding process. However, even if the prediction mode is different from that of the previous encoding process, this embodiment can deal with it.

Assume that there have been several patterns of quantization matrix Qmatrix (and each can be identified by ID numbers, for example).

So in the image processing device 1, as the quantization matrix Qmatrix changes, so does the rescaling factor RF. The image processing device 1 therefore needs to detect the quantization matrix Qmatrix, as well as the quantization parameter QP.

While changing the combination of the quantization matrix Qmatrix and the quantization parameter QP on a micro-block unit basis, the image processing device 1 calculates the rescaling factor RF for each quantization matrix Qmatrix and each quantization parameter QP. Incidentally, as mentioned with reference to FIG. 4, the smallest value of the residue R has a cycle of 6n with respect to the quantization parameter QP; even if there is a difference of 6n between the quantization parameters QP, there is no problem as long as it can detect the quantization matrix Qmatrix. Accordingly, if the value of the quantization parameter QP used in the previous encoding process can be roughly estimated, the image processing device 1 evaluates only, the six successive quantization parameters QP including the estimated one.

Accordingly, taking the above characteristics into account, the image processing device 1 of the present invention performs a quantization matrix detection process to detect the previous quantization matrix Qmatrix, and then a quantization parameter detection process to detect the quantization parameter QP using the detected quantization matrix Qmatrix.

(1-2-2) Detection of the Intra-Image Prediction Mode

For AVC's intra frames, reusing the intra-image prediction mode used in the previous encoding process of dubbing is an effective measure to prevent image quality from declining. Accordingly, the feature of an intra-image prediction mode detection process is detect the intra-image prediction mode used in the previous encoding process by performing calculation using only the input image data and its residue r.

According to the quantization matrix detection process and the quantization parameter detection process, as mentioned above as for AVC Intra, the quantization level Z is multiplied by the rescaling factor RF, which is a function of the quantization matrix Qmatrix and the quantization parameter QPk, during the decoding process, and the result of the decoding process is the DCT coefficient W whose figures have been left-shifted by 6 bits. Since the distribution of DCT coefficient changes as the intra-prediction mode changes, the residue r may probably not be zero.

Figure 9:
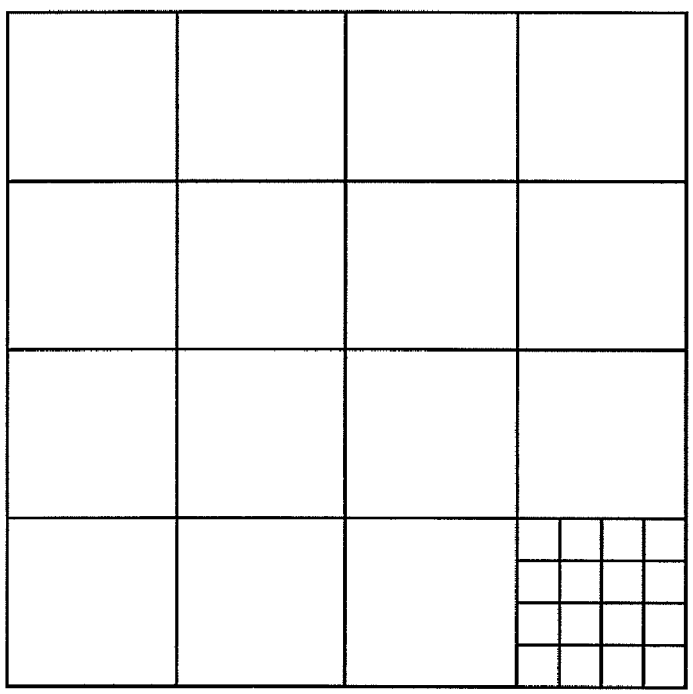
FIG. 9 is a schematic diagram illustrating a correlation between a macro block and an intra encoding unit.

So as shown in FIG. 9, the above quantization matrix detection process and quantization parameter detection process are performed on a macro-block basis; the macro block MB is 16×16 pixels. On the other hand, image prediction is carried out on an intra-encoding unit basis: the intra encoding unit IA uses a 4×4 sub-macro block, for example. That is, the sub-macro block MB contains the intra encoding unit IA of 16 (4×4).

The image processing device 1 previously detects the intra-image prediction mode whose amount of codes is the smallest, and then performs the above quantization matrix detection process and quantization parameter detection process in the detected intra-image prediction mode. At this time the detected intra-image prediction mode is not necessarily the same as the previously-encoded intra-image prediction mode. But since it uses the intra-image prediction mode whose amount of codes is the smallest, many of the 16 intra encoding units IA are expected to be the previously-encoded intra-image prediction mode.

In this case, as mentioned above, the image processing device 1 detects the minimum value using the sum of the residues r ($\Sigma$r) on a macro-block basis. Accordingly, even if the 16 intra encoding unit IA contains a different intra-image prediction mode from the previously-used one, the image processing device 1 can appropriately detect the quantization matrix Qmatrix and the quantization parameter QP based on many of the previously-encoded intra-image prediction modes.

Accordingly, after detecting the quantization matrix Qmatrix and the quantization parameter QP, the image processing device 1 uses the quantization matrix Qmatrix and the quantization parameter QP, changes the intra-image prediction mode for each intra encoding unit IA, and detects the minimum value using the sum of the residues r ($\Sigma$r). This allows the image processing device 1 to detect the previously-encoded intra-image prediction mode for all the intra encoding units IA of the macro block MB.

That is, based on the above-noted concepts of the quantization matrix detection process and quantization parameter detection process, the intra-image prediction mode detection process detect the intra-image prediction mode whose residue r is the smallest: if the quantization matrix and quantization parameter used in the previous encoding process have been already known, it shifts each of the DCT coefficients of the nine intra-image prediction modes by 6 bits and divides the resultant (W<<6) by the rescaling factor RF to detect the intra-image prediction mode whose residue r is the smallest.

In addition to that, in order to improve the accuracy of detection, the image processing device 1 takes into account the following point, which are attributable to the characteristics of AVC Intra and which MPEG does not take into account. That is, the intra-image prediction mode detection process takes into account the following point (vii), as well as the above points (i) and (ii) of the quantization matrix detection process and the quantization parameter detection process.

(vii) Distribution of DCT Coefficient

As the intra-image prediction mode changes, so does the value of the difference. This eventually leads to the change in distribution of DCT coefficient. Accordingly, in general, it is considered to be fair to divide the sum of the residues r in the sub-macro block by the number of DCT coefficients, which is not zero, and compares the residues on per sample basis.

However, the reality is that if the prediction mode used in the previous encoding process is selected, the number, of DCT coefficients which are not zero decreases due to the high accuracy in prediction; if the mode whose direction is different from the previous prediction is selected, the number of DCT coefficients which are not zero increases.

Accordingly, the intra-image prediction mode multiplies the sum of the residues r (Σr) by the number of DCT coefficients which are not zero, instead of dividing the sum of the residues r (Σr) by the number of DCT coefficients which are not zero. One can conclude that this awards a numerical penalty to the sum of the residues r (Σr) of the mode whose direction is different from the previous prediction.

The result of multiplying the sum of the residues r (Σr) by the number of DCT coefficients which are not zero is regarded as an evaluation value Y. An evaluation value Y of one prediction mode is compared with that of the other, and the prediction mode whose evaluation value Y is the smallest is considered to be the prediction mode used in the previous encoding process.

The prediction mode detection section 5 of the image processing device 1 of the present invention takes into account one of the above-noted characteristic points, or (vii), and selects an appropriate prediction mode.

(2) First Embodiment

(2-1) Configuration of an Encoding Device

Figure 7:
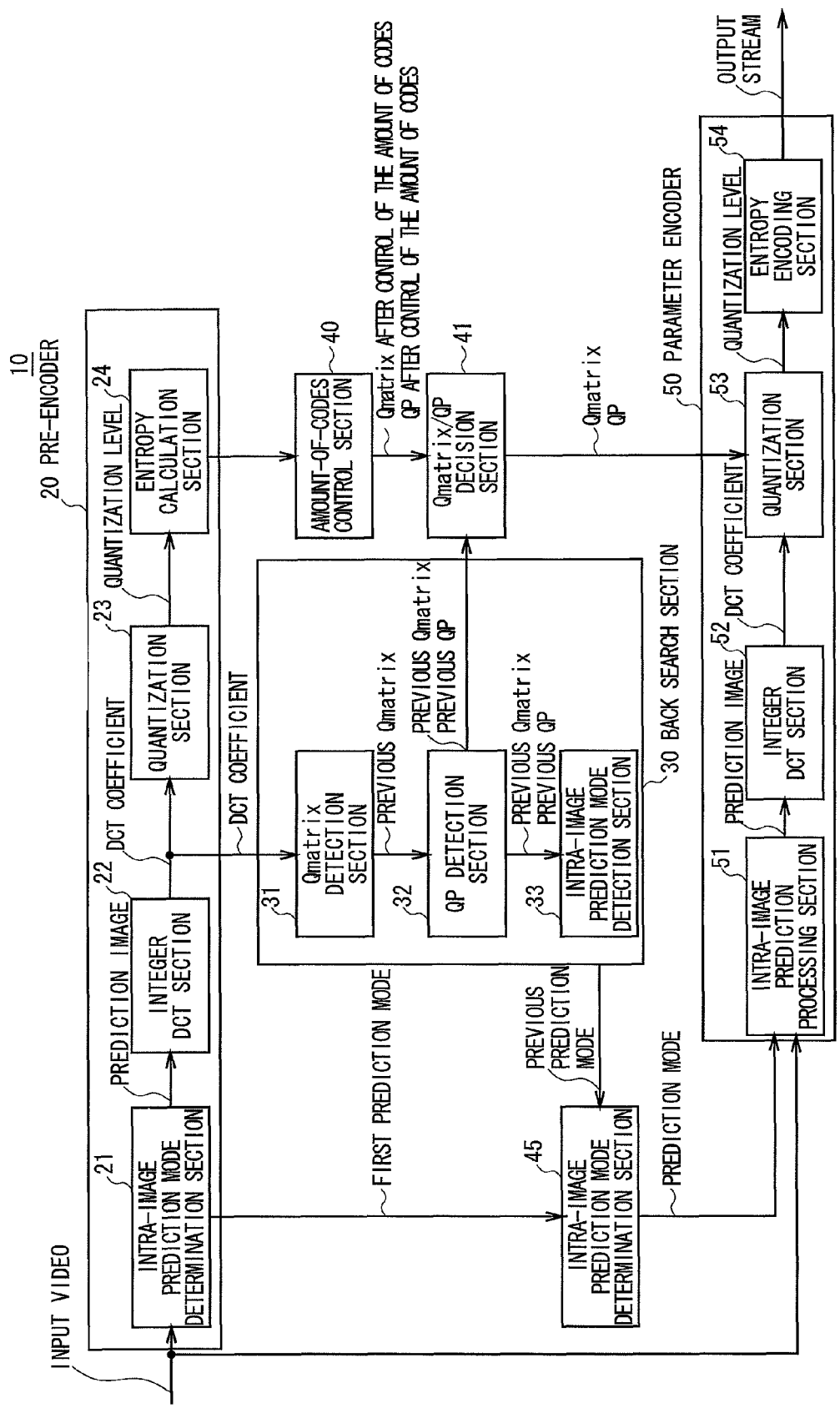
FIG. 7 is a diagram illustrating the configuration of an encoding device according to the first embodiment of the present invention.

The following describes the configuration of an encoding device 10 according to a first embodiment of the present invention, with reference to FIG. 7. Incidentally, the encoding device 10 corresponds to the image processing device 1 of FIG. 1. Moreover, a back search section 30 corresponds to the back search section 3, a parameter encoder 50 corresponds to the second encoding section 4, a prediction mode detection section 33 corresponds to the prediction mode detection section 5, a Qmatrix detection section 31 corresponds to the Qmatrix detection section 6, and a QP detection section 32 corresponds to the QP detection section 7.

As shown in FIG. 7, the encoding device 10 includes a first path pre-encoder 20, the back search section 30, the second path parameter encoder 50, an amount-of-codes control section 40, a Qmatrix/QP decision section 41, and an intra-image prediction mode decision section 45. More specifically, the first path pre-encoder 20 contains an intra-image prediction mode determination section 21, a integer DCT section 22, and a quantization section 23, an entropy calculation section 24. The back search section 30 contains the Qmatrix detection section 31, the QP detection section 32, and the intra-image prediction mode detection section 33. Then, the second path parameter encoder 50 includes a intra-image prediction processing section 51, an integer DCT section 52, a quantization section 53, and an entropy encoding section 54. Incidentally, this employs the two pass encoding method; but the basic concept is the same as when it employs other multi-pass encoding methods.

Figure 8:
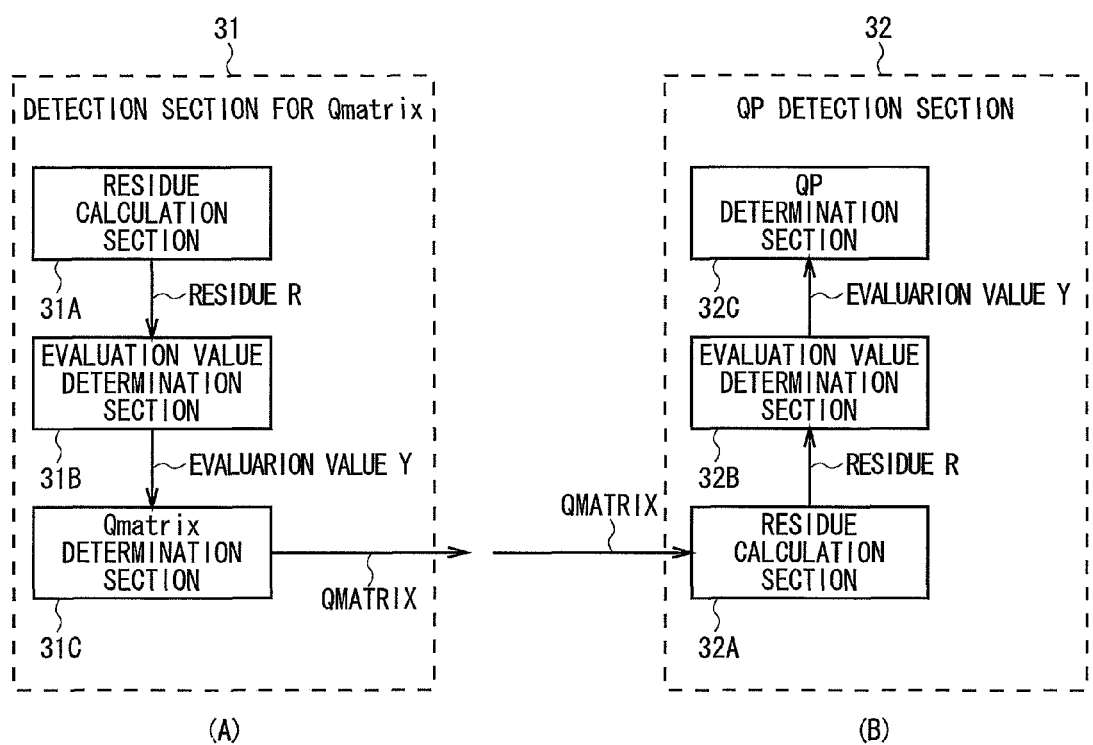
FIG. 8(a) is a diagram illustrating the configuration of Qmatrix detection section.
FIG. 8(b) is a diagram illustrating the configuration of a QP detection section.

Here, FIG. 8(a) shows a specific example of the configuration of the Qmatrix detection section 31; FIG. 8(b) shows a specific example of the configuration of the QP detection section 32.

As shown in FIG. 8(a), the Qmatrix detection section 31 includes a residue calculation section 31a, an evaluation value determination section 31b, and a Qmatrix determination section 31c. And as shown in FIG. 8(b), the QP detection section 32 includes a residue calculation section 32a, an evaluation value determination section 32b and a QP determination section 32c.

With the above configuration, the input image is input into the first path pre-encoder 20.

More specifically, the input image is input into the intra-image prediction mode determination section 21. The intra-image prediction mode determination section 21 selects the most appropriate one from the nine intra-image prediction modes; the input image generates the difference image data from the prediction image using surrounding pixels, and the intra-image prediction mode determination section 21 inputs it into the integer DCT section 22.

The integer DCT section 22 generates the DCT coefficient W from the difference image data by orthogonal transformation of discrete cosine transform, and supplies it to the quantization section 23 and the back search section 3.

After receiving the DCT coefficient W, the quantization section 23 quantizes the DCT coefficient to generate quantization data. Thanks to this quantization, the quantization level Z output from the quantization section 23 is supplied to the entropy calculation section 24.

The entropy calculation section 24 binarizes the quantization level Z and arithmetically codes it to generate an encoding stream, and supplies it to the amount-of-codes control section 40. Based on the amount of generated codes of the encoding stream, the amount-of-codes control section 40 estimates the quantization matrix Qmatrix and the quantization parameter QP for the amount-of-codes control process of the parameter encoder 50, and transmits them to the Qmatrix/QP decision section 41.

Meanwhile, the DCT coefficient W that was supplied from the integer DCT section 22 to the back search section 30 on a slice unit basis is input into the Qmatrix detection section 31. The Qmatrix detection section 31 uses the residue calculation section 31a to divide the DCT coefficient W by the rescaling factors RF of various quantization matrixes Qmatrix, and supplies the results to the evaluation value determination section 31b. Following the concepts described in the above (iii), the evaluation value determination section 31b converts the residues r into the evaluation values Y, and supplies them to the Qmatrix determination section 31c. The Qmatrix determination section 31c compares the evaluation values Y of the various quantization matrixes Qmatrix, and outputs the quantization matrix Qmatrix whose evaluation value V is the smallest as the quantization matrix Qmatrix used in the previous process. Incidentally, the quantization matrix detection process of the Qmatrix detection section 31 is described later in detail.

The detected quantization matrix Qmatrix is supplied to the QP detection section 32. The residue calculation section 32a divides the DCT coefficient W by the rescaling factors RF of various quantization parameters QP, and supplies the results to the evaluation value determination section 32b. The evaluation value determination section 32b uses the quantization matrix Qmatrix detected by the evaluation value Qmatrix detection section 31 and converts the residues r into the evaluation values Y by following the concepts described in the above (iii), and supplies them to the Qmatrix determination section 32c. The Qmatrix determination section 32c compares the evaluation values Y of the various quantization parameters QP, and outputs the quantization parameter QP whose evaluation value V is the smallest as the quantization parameter QP used in the previous process. Incidentally, the quantization parameter detection process of the QP detection section 32 is described later in detail.

The detected quantization parameter QP is supplied to the Qmatrix/QP decision section 41. The Qmatrix/QP decision section 41 decides whether it will use the quantization matrix Qmatrix and quantization parameter QP estimated by the first path pre-encoder 20, or those detected by the back search section 30. In general, if the input image data are an original image that have not yet undergone any encoding process, then this means the failure of back search because the encoding process has not yet been performed; therefore, those estimated by the encoding process of the first path pre-encoder 20 will be used. By contrast if the input image are not an original image and have already undergone the encoding process, those detected by the back search section 30 will be used to prevent the reoccurrence of quantization distortion.

Moreover, the quantization parameter QP and quantization matrix Qmatrix that were detected by the back search section 30 and that were used in the previous encoding process are also supplied to the intra-image prediction mode detection section 33. Using the quantization parameter QP and the quantization matrix Qmatrix, the intra-image prediction mode detection section 33 performs the above intra-image prediction mode detection process to detect the previous intra-image prediction mode. Incidentally, the intra-image prediction mode detection process of the intra-image prediction mode detection section 33 is described later in detail. The previous prediction mode is supplied to the intra-image prediction mode decision section 45. The intra-image prediction mode decision section 45 decides whether it will use a first prediction mode in which the sum of absolute difference SAD becomes the smallest by the first-path encoding, or the previous prediction mode detected by the intra-image prediction mode detection section 33.

So based on the quantization matrix Qmatrix and the quantization parameter QP, the intra-image prediction mode detection section 33 detects the previous prediction mode. The previous prediction mode is supplied to the intra-image prediction mode decision section 45. The intra-image prediction mode decision section 45 decides whether it will use a first prediction mode in which the sum of absolute difference SAD becomes the smallest by the first-path encoding, or the previous prediction mode detected by the intra-image prediction mode detection section 33.

Specifically, if the input image data are an original image that have not yet undergone any encoding process, then this means the failure of back search because the encoding process has not yet been performed; therefore, the one estimated by the intra-image prediction mode determination section 21 will be used. By contrast if the input image are not an original image and have already undergone the encoding process, the one detected by the intra-image prediction mode detection section 33 will be used to prevent the reoccurrence of quantization distortion.

The second path parameter encoder 50, as mentioned above, uses the quantization matrix Qmatrix and quantization parameter QP decided by the Qmatrix/QP decision section 41 and the intra-image prediction mode decided by the intra-image prediction mode decision section 45 to encode the input image, and then outputs it as an encoding stream.

More specifically, the intra-image prediction processing section 51 regards the intra-image prediction mode decided by the intra-image prediction mode decision section 45 as the most appropriate intra-image prediction mode, generates the difference image data from the input image using the prediction image of the surrounding pixels, and inputs the difference image data into the integer DCT section 52. The integer DCT section 52 outputs the difference image data as the DCT coefficient W after the orthogonal transformation of discrete cosine transform. The quantization section 53 regards the DCT coefficient W as data input into it, uses the quantization matrix Qmatrix and quantization parameter QP decided by the Qmatrix/QP decision section 41 to quantize, and supplies the quantization level Z to the entropy encoding section 54. The entropy encoding section 54 binarizes the quantization level Z and arithmetically codes it, and outputs it as the encoding stream.

(2-2) Process Procedure (2-2-1) Quantization Matrix Detection Process

Figure 10:
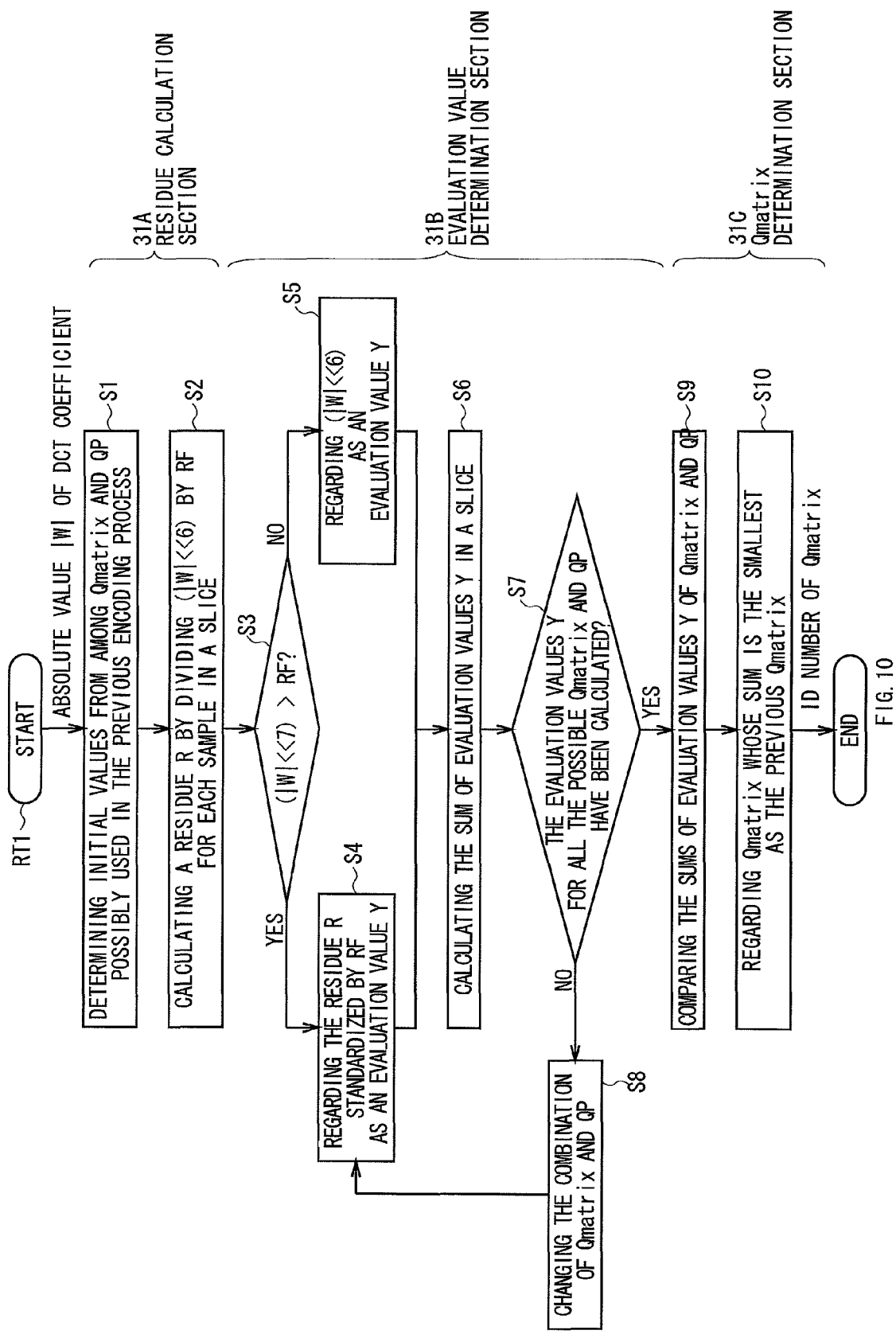
FIG. 10 is a flowchart illustrating a quantization matrix detection process by a Qmatrix detection section of an encoding device on a slice unit basis, according to the first embodiment of the present invention.

The following provides the detailed description of the Qmatrix detection process on a slice unit basis by the Qmatrix detection section 25 of the encoding device 10 according to the first embodiment of the present invention, with reference to a flowchart of FIG. 10, which illustrates a procedure RT1 of the quantization matrix detection process. This is also equivalent to an image information encoding method of the present embodiment.

Incidentally, in the case of FIG. 10, only when the absolute value |W| of each DCT coefficient is less than or equal to a standardization threshold (i.e. |W|<<7 is less than or equal to RF), the encoding device 10 standardizes the residue r using the rescaling factor RF to calculate the evaluation value Y; if the absolute value |W| of the DCT coefficient is greater than the standardization threshold, the encoding device 10 regards the residue r as the evaluation value Y. And the encoding device 10 detects the quantization matrix Qmatrix based on the rescaling factor RF whose evaluation value Y is the smallest.

The Qmatrix detection section 31 receives the absolute value |W| of the DCT coefficient W calculated by the integer DCT section 21, and determines initial values from among the quantization matrixes Qmatrix and quantization parameters QP possibly used in the previous encoding process (step S1).

Then, the Qmatrix detection section 31 calculates the rescaling factor RF for each quantization matrix Qmatrix and each quantization parameter QP by changing the combination of the quantization matrix Qmatrix and the quantization parameter QP on a macro-block unit basis. At this time, the residue calculation section 31*a* calculates the residue r by dividing |W|<<6 by the rescaling factor RF for each sample in a slice (step S2). Incidentally, as mentioned above with reference to FIG. 4, the smallest value of the residue r has a cycle of 6n with respect to the quantization parameter QP. Even if there is a difference of 6n between the quantization parameters QP, there is no problem as long as the process of FIG. 10 can detect the quantization matrix Qmatrix; as long as the value of the quantization parameter QP used in the previous encoding process can be roughly estimated, there is no problem if the evaluation is made by the six successive quantization parameters QP containing the estimated QP.

Subsequently, the evaluation value determination section 31*b* makes a determination as to whether |W|<<7>RF. If so, the evaluation value determination section 31 assumes that the residue r standardized (or rescaled) by the rescaling factor RF is the evaluation value Y (step S4); if not so, the evaluation value determination section 31*b* assumes that |W|<<6 is the evaluation value Y (step S5). In this manner, as for 256 (16× 16) samples of the macro block, the evaluation determination section 25*b* regards the residue r, which was obtained by dividing the shifted DCT coefficient (W<<6) by the rescaling factor RF and then standardized and corrected in line with the above (iii), as the evaluation value, and calculates the sum of the evaluation values Y for each quantization matrix Qmatrix and each quantization parameter QP (step S6 to S8).

In this manner, the evaluation values Y are calculated for all the possible quantization matrixes Qmatrix and the six quantization parameters QP (Yes at step S7). After that, the Qmatrix determination section 31*c* compares the sums of evaluation-values Y, each of which was calculated for each quantization matrix Qmatrix and each quantization parameter QP, on a slice unit basis (step S9). The Qmatrix determination section 31*c* detects the quantization matrix Qmatrix whose sum (ΣY) is the smallest, and regards it as the quantization matrix Qmatrix used in the previous process (step S10), and outputs the ID number of the quantization matrix Qmatrix.

Incidentally, the encoding device may 10 may calculated a weighted multiplication value by multiplying the residue by the absolute value |W| of the DCT coefficient for example before the process of step S2, standardize the multiplication value by the rescaling factor RF, and then regard it as the evaluation value Y. In this case, even if the absolute value |W| of each DCT coefficient is a large range, the encoding device 10 can avoid detecting it wrongly by increasing the evaluation value Y of that range. This allows the encoding device 10 to regard the standardized value as the evaluation value Y.

Moreover, the following is also possible: the encoding device 10, for example, regards the residue r as the evaluation value Y to detect the minimum value, and if there is a plurality of the minimum values detected, detect the large quantization parameter QP as the quantization parameter QP used in the previous encoding process after having confirmed that the minimum value of the quantization parameter QP has a cycle of 6n.

(2-2-2) Quantization Parameter Detection Process

Figure 11:
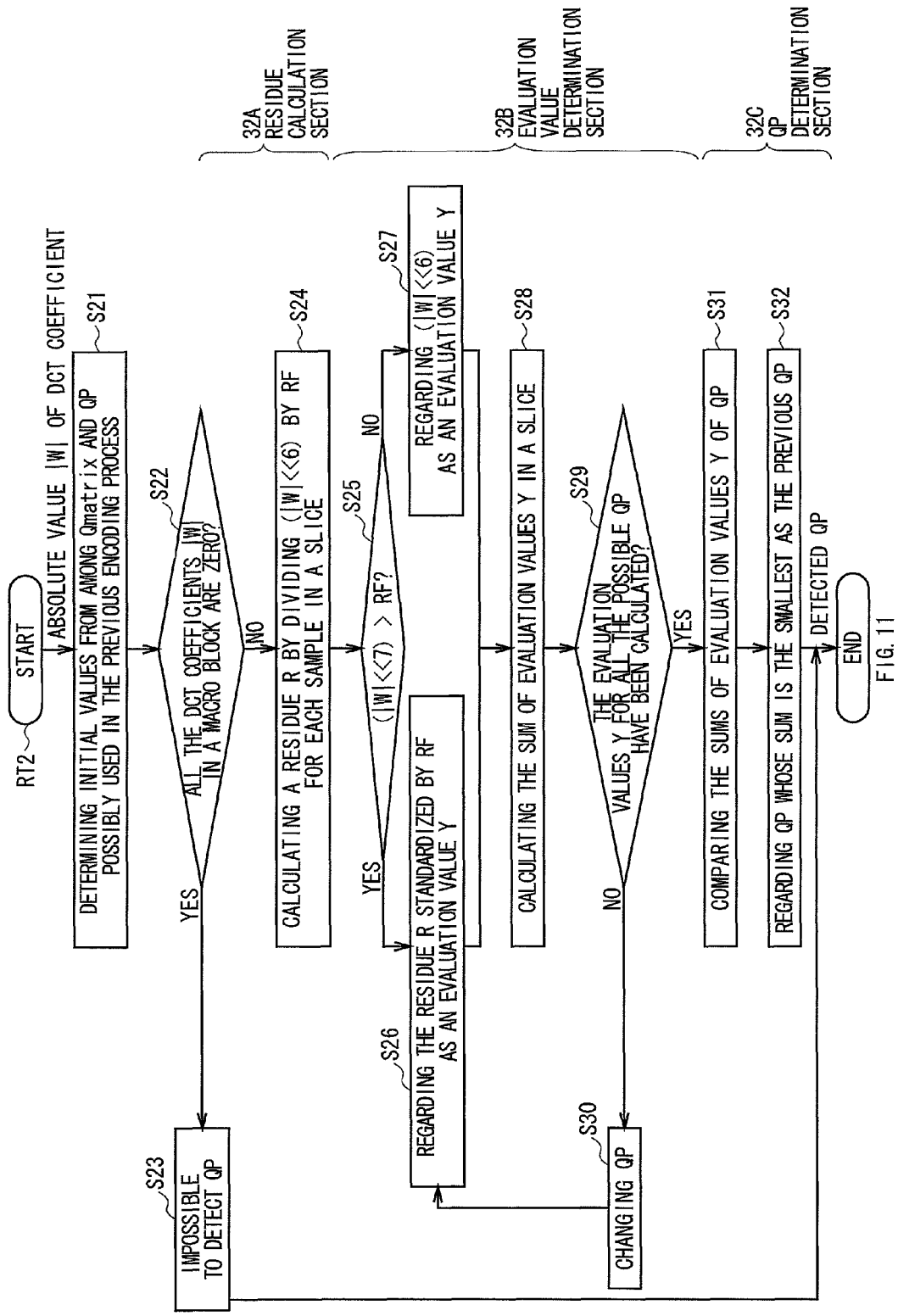
FIG. 11 is a flowchart illustrating a quantization parameter detection process by a QP detection section of an encoding device on a macro block unit basis, according to the first embodiment of the present invention.

The following provides the detailed description of the detection process of the quantization parameter QP on a macro-block unit basis by the QP detection section 32 of the encoding device 10 according to the first embodiment of the present invention, with reference to a flowchart of FIG. 11, which illustrates a procedure RT2 of the quantization parameter detection process. This is also equivalent to an image information encoding method of the present embodiment.

Incidentally, in the case of FIG. 11, only when the absolute value |W| of each DCT coefficient is less than or equal to a standardization threshold (i.e. |W|<<7 is less than or equal to RF), the encoding device 10 standardizes the residue r using the rescaling factor RF to calculate the evaluation value Y; if the absolute value |W| of the DCT coefficient is greater than the standardization threshold, the encoding device 10 regards the residue r as the evaluation value Y. And the encoding device 10 detects the quantization parameter QP based on the rescaling factor RF whose evaluation value Y is the smallest.

The QP detection section 32 receives the absolute value |W| of the DCT coefficient calculated by the integer DCT section 22, and, using the quantization matrix Qmatrix detected, calculates the rescaling factor RF for each quantization parameter QP on a macro-block unit basis. If the rough value of the previous quantization parameter QP has been already known, the QP detection section 32 sets a detection target area around that QP, thereby reducing the amount of calculation. After calculating an initial value from among the quantization parameters QP possibly used in the previous encoding process (step S21), the QP detection section 32 makes a determination as to whether the absolute values |W| of all the DCT coefficients in the macro block are zero (step S22).

If the absolute values |W| of all the DCT coefficients are zero, the QP detection section 32 assumes that it won't be able to detect the quantization parameter (step S23). That is, if the absolute values |W| of all the DCT coefficients in the macro block are zero, the result of dividing the residue by the quantization parameter QP is zero: the QP detection section 32 therefore cannot detect the quantization parameter QP, so it dismisses the detection process.

By contrast, if the absolute values |W| of all the DCT coefficients in the macro block are not zero at step S22, the residue calculation section 32a of the QP detection section 32 calculates the residue r by dividing the shifted DCT coefficient (|W|<<6), which is for each sample of 256 (16×16) in the macro bloc, by the rescaling factor RF calculated by the equation (9) (step S24).

Subsequently, the evaluation value determination section 32b makes a determination as to whether (|W|<<7)>RF (step S25). If so, the evaluation value determination section 32b regards the residue r standardized by the rescaling factor RF as the evaluation value (step S26); if not so, the evaluation value determination section 32b regards (|W|<<6) as the evaluation value Y (step S27). That is, as for 256 (=16×16) samples in the macro block, the evaluation value determination section 32b regards the residue r, which was obtained by dividing the shifted DCT coefficient (W<<6) by RF and then standardized and corrected in line with the above (iii), as the evaluation value Y, and calculates the sum (ΣY) for each quantization parameter QP (step S28).

Then, the evaluation value determination section 32b makes a determination as to whether the evaluation values Y for all the possible quantization parameters QP have been calculated (step S29). If the evaluation values Y for all the possible quantization parameters QP have not been calculated, the evaluation value determination section 32b changes the quantization parameter QP (step S30), and then repeats the processes of step S26, S28, and S29.

In this manner, after the evaluation values Y for all the possible quantization parameters QP have been calculated (Yes at step S29), the QP determination section 32c compares the sums of evaluation values Y (ΣY) of QPs on a macro-block unit basis (step. S31), regards the quantization parameter QP whose sum is the smallest as the quantization parameter used in the previous process (step S32), and outputs the value of that quantization parameter QP.

At this time, a range in which the quantization parameter is less than 6 is excluded. This is because the quantization parameters QP whose values are less than 6 are rarely used in a practical range of, for example, less than 200 Mbps: Excluding it helps improve the rate of detection.

As described above, the Qmatrix detection section 31 of the encoding device 10 of the first embodiment of the present invention can almost certainly detect the Qmatrix used in the previous encoding process from the DCT coefficient obtained during the encoding process by using the residue r for each slice. Moreover, the QP detection section 32 of the encoding device 10 can almost certainly detect the QP used in the previous encoding process from the DCT coefficient obtained during the encoding process by using the residue r for each macro block. And the encoding device 10 reuses the detected quantization matrix Qmatrix and quantization parameter QP to reduce the rounding error of quantization caused by dubbing, thereby improving the quality of dubbing. Moreover, the encoding device 10 introduces the transformation matrix D. This allows the encoding device 10 to equally use the DCT coefficient of the encoding and that of the decoding. Furthermore, the encoding device 10 weights the DCT coefficient W with the residue r and standardizes it by the rescaling factor RF, improving the accuracy of detection.

Figure 12:
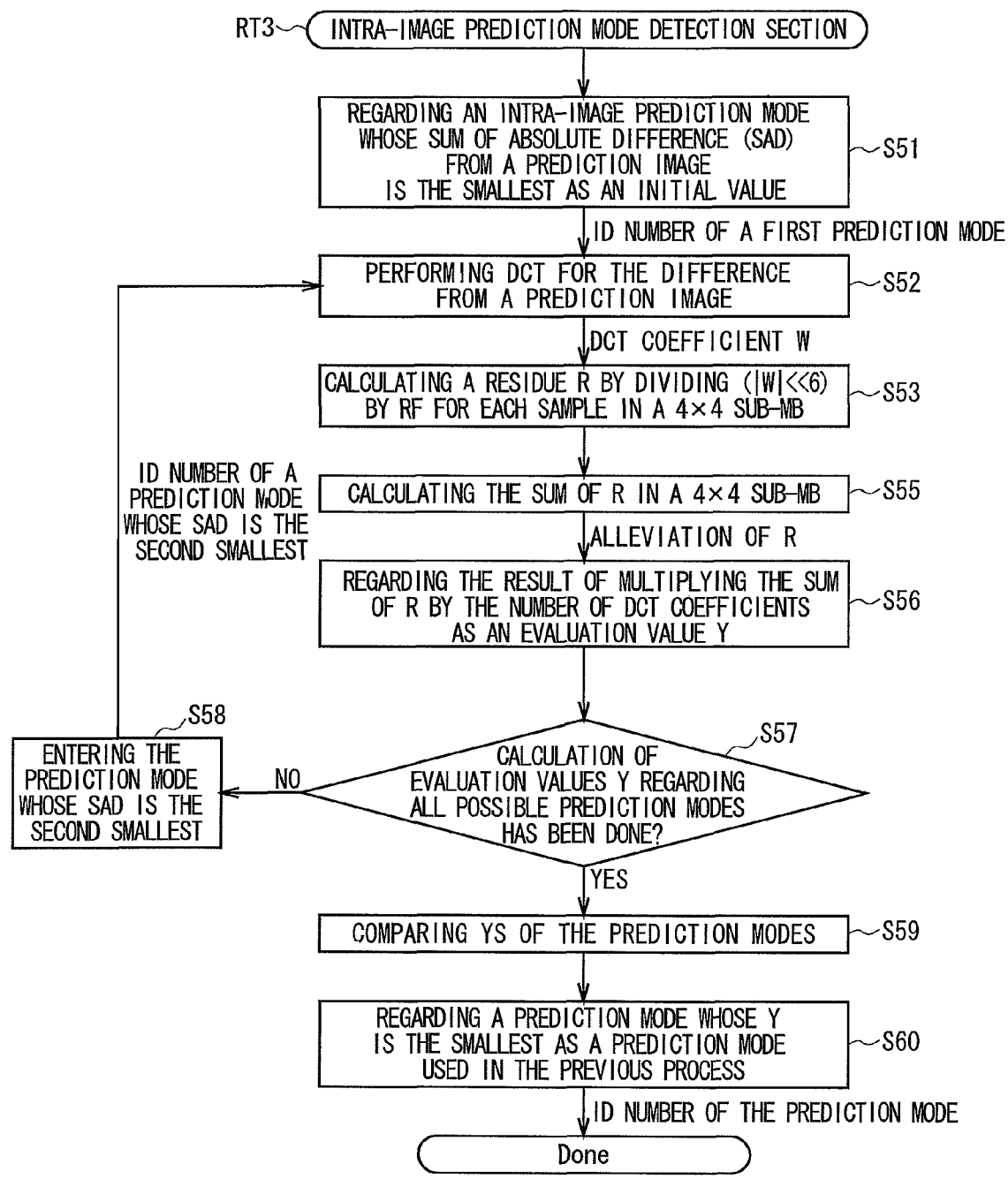
FIG. 12 is a flowchart illustrating an intra-image prediction mode detection section by, an encoding device, according to the second embodiment of the present invention.

Furthermore, the encoding device 10 takes into account the fact that the quantization parameter QP, introduced from AVC, has a cycle of 6n: if the residue r of the quantization parameter QP which is 6n larger than the quantization parameter QP whose residue r is the smallest has a minimum value, the encoding device 10 regards that quantization parameter QP, even if it does not have the smallest value, as the quantization parameter QP used in the previous encoding process. And if the rough value of the quantization parameter QP used in the previous encoding process has been already known, the encoding device 10 changes the quantization parameters QP in the range of ±n from that value as it evaluates them. This reduces the amount of calculation (2-2-3) Intra-Image Prediction Mode Detection Process The following provides the detailed description of the prediction mode detection process by the intra-image prediction mode detection section 33 of the encoding device 10 according to a second embodiment of the present invention, with reference to a flowchart of FIG. 12, which illustrates a procedure RT3 of the intra-image prediction mode detection process. This is also equivalent to an image information encoding method of the present embodiment.

First, the intra-image prediction mode detection section 33 regards the intra-image prediction mode whose sum of absolute difference from the prediction image (i.e. the sum of absolute values of the difference image data) is the smallest as an initial value (step S51). Then, the intra-image prediction mode detection section 33 performs a DCT process for the difference image data from the prediction image (step S52). The intra-image prediction mode detection section 33 calculates the residue r by dividing the |W|<<6, which was obtained as a result of shifting the DCT coefficient W by 6 bits to the left for each sample in a 4×4 sub-macro block, by RF (step S53).

Then, the intra-image prediction mode detection section 33 regards the result of multiplying the sum of residues r by an even number of the DCT coefficient as the evaluation value Y (step S56).

Subsequently, the intra-image prediction mode detection section 33 makes a determination as to whether the evaluation values V of all the possible intra-image prediction modes that are considered not to have a screen have been calculated (step S57). If all the evaluation values V have not been calculated yet, the intra-image prediction mode detection section 33 switches to the prediction mode whose sum of absolute difference SAD is the second smallest (step S58), and repeats the processes of step S52 to S57. Then, if it determines that the evaluation values V of all the possible intra-image prediction modes have been calculated (Yes at step S57), the intra-image prediction mode detection section 33 compares the evaluation values of the intra-image prediction modes (step S59), regards the intra-image prediction mode whose evaluation value Y is the smallest as the prediction mode used in the previous process (step S60), and ends the process.

As described above, the encoding device 10 of the first embodiment of the present invention arithmetically detects the intra-image prediction mode used in the previous encoding process from the input image, and therefore avoids the reoccurrence of quantization distortion caused by dubbing of AVC intra frame. Accordingly, the encoding device 10 can improve S/N ratio of dubbing and visual performance.

Moreover, when the encoding device 10 compares the sums of absolute difference SAD from the prediction images in the sub-macro block between the intra-image prediction modes, the comparison starts with those whose sum of absolute difference SAD is smaller than the others. This also means that the comparison starts with the intra-image prediction modes which were highly likely to be used in the previous encoding process. For example, choosing a predetermined number (3, for example) of the intra-image prediction modes whose sum of absolute difference SAD is small and comparing them reduces the amount of calculation. Moreover, thanks to the introduction of the transformation matrix D, the encoding device 10 can equally deal with the DCT coefficient of the encoding process and that of the decoding process.

In addition to that, the encoding device 10 can detect regardless of whatever intra-image prediction algorithm was used in the previous encoding process; even if the intra-image prediction method that takes into account visual performance is used in the first encoding process, this algorithm can be used for dubbing.

The embodiments of the present invention have been described above; but the present invention is not limited to those things. Various modifications and variations can be made without departing from the scope of the invention.

For example, the above-mentioned image information encoding processing device and method of the first and second embodiments can also be realized as a program executed by a computer and as a recording medium storing the program. This can offer the same operation and effect as the above methods do.

(2-3) Operation and Effect

With the configuration described above, the encoding device 10 performs the DCT process as orthogonal transformation for the input image data or image data, and generates the DCT coefficient as a transformation coefficient. According to AVC, as described with the equation (5) as for the inverse DCT process, which is an inverse orthogonal transformation, the encoding device 10, at this time, changes the values of the coefficient elements constituting the DCT coefficient in terms of scale by the equivalent of the transformation matrix D including a plurality of scales.

The encoding device 10 multiplies the decoding rescaling factors RFr, which are the decoding factors calculated from a plurality of quantization factors possibly used in the decoding process, by the transformation matrix D, which is a scale variation, to calculate the rescaling factors RF, which are a plurality of division factors. Moreover, the encoding device 10 calculates the sum of the evaluation values Y (ΣY), which is based on the residues r obtained as a result of dividing the elements of the DCT coefficient by the rescaling factors RF, on a detection unit basis.

Then, the encoding device 10 compares the correlations between the rescaling factors RF and the sum of the evaluation values Y (ΣY); based on the rescaling factor RF whose sum of the evaluation values Y (ΣY) is a minimum value, the encoding device 10 detects the quantization factor used in the previous process of encoding the difference image data.

Accordingly; when dividing the DCT coefficient by the rescaling factor RF, the encoding device 10 divides the DCT coefficient by the transformation matrix D to compensate for the scaling up of the DCT process, thereby preventing the value of the residue r from being scaled up by a plurality of values, according to the position of the matrix.

As a result, the comparison process of the residues r by the encoding device 10 is simple. This allows the encoding device 10 to detect the quantization factor used in the previous process of encoding the difference image data by detecting the minimum value of the sum of the evaluation values Y (ΣY), which is based on the residues r.

So since the encoding device 10 can perform the encoding process using the quantization factor used in the previous encoding process, the quantization rounding of dubbing can be prevented, thereby maintaining the quality of image of the difference image data.

The encoding device 10 detects, as a quantization factor, the quantization parameter QP set for each macro block, which is a quantization unit. In this case, the encoding device 10 sets the macro block as a detection unit.

The encoding device 10 detects, as a quantization factor, the quantization matrix Q matrix that is set for each slice, which is a encoding unit, and in which the values of the coefficient elements of the DCT coefficient are determined. In this case, the encoding device 10 sets the slice as a detection unit.

To generate a plurality of difference image data items, The encoding device 10 encodes the input image data using predetermined intra-image encoding methods, each of which is set for a different intra encoding unit IA (a 4×4 sub-macro block), which is an intra-image encoding unit. The encoding device 10 then detects, from among the difference image data items, one intra-image encoding method used in the previous process of encoding the input image data based on the sum of the evaluation values Y (ΣY) obtained when the detected quantization parameter QP and quantization matrix Qmatrix were used. In this case, the encoding device 10 sets the slice as a detection unit.

As mentioned above, the quantization parameter QP has a parameter cycle: the rescaling factor RF doubles as the value of the quantization parameter QP increases by six. Accordingly, as for the sum of the evaluation values Y (ΣY), the quantization parameter QP that is 6n smaller than the quantization parameter used in the previous encoding process may have a minimum value from the sum of the evaluation values Y (ΣY).

At this time, as for the sum of the evaluation values Y (ΣY), the sum of the evaluation values Y (ΣY) becomes smaller as the quantization parameter QP is getting smaller. The encoding device 10 regards a division value obtained as a result of dividing the residue r by the rescaling factor RF as the evaluation value Y, so that the value of the quantization parameter QP used in the previous encoding process is the smallest value.

Moreover, if it has detected a plurality of minimum values, the encoding device 10 detects the quantization factor used in the previous process of encoding the difference image data based on the rescaling factor RF whose evaluation value Y is the smallest.

As a result, the encoding device 10 can detect the quantization parameter QP used in the previous encoding process, thereby simplifying the detection process.

Moreover, if the absolute value |W| of the DCT coefficient, or the absolute value of the coefficient element, is less than the standardization threshold, the encoding device 10 regards a division value obtained by dividing the residue r by the rescaling factor RF as the evaluation value Y; if the absolute value |W| of the DCT coefficient is greater than or equal to the standardization threshold, the encoding device 10 regards the residue r as the evaluation value Y.

Accordingly, because of the standardization in the range where the rescaling factor RF is enormously large by the rescaling factor RF, the encoding device 10 can prevent the sum of the evaluation values Y (ΣY) from being too small, thereby detecting the quantization parameter QP used in the previous encoding process appropriately.

Moreover, the encoding device 10 calculates a multiplication value by multiplying the residue by the coefficient element, and calculates a division value by dividing the multiplication value by the rescaling factor RF, and regards the division value as the evaluation value Y.

In this manner, the encoding device 10 weights the evaluation value Y with the DCT coefficient; because of the standardization in the range where the rescaling factor RF is enormously large by the rescaling factor RF, the encoding device 10 can prevent the sum of the evaluation values Y (ΣY) from being too small, thereby detecting the quantization parameter QP used in the previous encoding process appropriately.

Moreover, when detecting a plurality of minimum values, the encoding device 10 confirms whether the rescaling factor RF used when the minimum values were detected has been detected by a parameter cycle deriving from the quantization parameter QP. And if the encoding device 10 determines that it is that parameter cycle, the encoding device 10, based on the rescaling factor RF whose value is large, detects the quantization factor used in the previous process of encoding the difference image data.

In this manner, the encoding device 10 can use the residue r as the evaluation value Y without changing it, and does not need to perform such processes as weighting or standardizing. Therefore, the process of calculating the evaluation value Y can be omitted.

Moreover, the encoding device 10 specifies, as a search range, a plurality of decoding rescaling factors that may possibly be used in the decoding process. Accordingly, the encoding device 10 does not have to calculate the sums of the evaluation values Y (ΣY) of all the decoding rescaling factors (i.e. all the quantization parameters QP and quantization matrixes Qmatrix): the load of the back search process can therefore be reduced.

Moreover, the encoding device 10 calculates the rescaling factor based on the quantization parameter QP and the quantization matrix Qmatrix. Within the range of one cycle (i.e. six) of the parameter cycles deriving from the quantization parameter QP, the encoding process 10 compares the correlations between the rescaling factors and the sums of the evaluation values Y (ΣY), thereby detecting the quantization matrix Qmatrix used in the previous process of encoding the difference image data.

Therefore, the encoding device 10 does not perform processes for all the quantization parameters QP, thereby reducing processing load.

Moreover, using the detected quantization matrix Qmatrix, the encoding device 10 detects the quantization parameter QP based on the sum of the evaluation values Y (ΣY) calculated by changing the value of the quantization parameter QP of the rescaling factor RF.

Therefore, the encoding device 10 detects only the quantization parameter QP after that, in order to reduce the number of rescaling factors RF to be processed. This reduces processing load.

Moreover, the encoding device 10 calculates, for each of the difference image data items generated by the intra-image prediction modes, the sum of the evaluation values Y (ΣY) calculated from the rescaling factor RF that used the detected quantization matrix Qmatrix and the quantization parameter QP. Then, among the difference image data items, the encoding device 10 detects the intra-image prediction mode corresponding to the difference image data item from which the minimum value is detected of the sum of the evaluation values Y (ΣY) as the previously-encoded intra-image prediction mode.

This means that the number of processes performed by the encoding device 10 is equal to the number of the intra-image prediction modes. Therefore, the encoding device 10 can easily detect the intra-image prediction mode.

According to the above configuration, the encoding device 10 detects the quantization parameter QP based on the residue calculated by dividing the DCT coefficient by the rescaling factor RF, which was obtained as a result of multiplying the decoding rescaling factor RFr by the transformation matrix D.

Therefore, even if the scale variation occurs for the correlation between the DCT process and the inverse DCT process, the encoding device 10 can prevent scale variation from happening to the value of the residue r: The encoding device 10 appropriately detects the quantization parameter QP by the comparison of the residues r, thereby improving the accuracy of detection of the back search.

Thus, according to the present invention, the image processing device and image processing method that can prevent the quality of image from deteriorating during the encoding process can be realized.

(2-4) Other Embodiment

In the above-noted first embodiment, the processes are performed according to AVC. However, the present invention is not limited to this. The processes may be performed in line with other standards. In short, the present invention can be applied to all the methods that cause scale changes to the value of the coefficient element using a plurality of scales in terms of the correlation between the orthogonal transformation and the inverse orthogonal transformation. Moreover, the present invention is not limited to the orthogonal transformation: the same effects can be obtained even when similar scale variations occur in terms of the correlation between the encoding process and the corresponding decoding process.

Moreover, in the above-noted first embodiment, the orthogonal transformation is the DCT process. However, the present invention is not limited to this. Another orthogonal transformation, such as wavelet transform, can be used. Moreover, as the DCT transform, it may be DCT transform in which the calculation of the fractional portion is also performed.

Moreover, in the above-noted first embodiment, the present invention is applied to the 4×4 DCT process. However, the present invention is not limited to this. For example, it may be applied to the 8×8 DCT process or the 16×16 DCT process. By replacing parts by the transformation matrixes A and C in the equation (5) according to which process is performed, it can calculate the transformation matrix D representing variation scale.

Furthermore, in the above-noted first embodiment, it sets the quantization matrixes Qmatrix on a slice unit basis. However, the present invention is not limited to this. It may set them on a per picture basis, for example.

Furthermore, in the above-noted first embodiment, it detects what it used in the previous encoding process in the following order: the quantization matrix Qmatrix, the quantization parameter QP, and then the intra-image prediction mode. However, the present invention is not limited to this. Another order may be applied. Moreover, a round-robin process can be applied for all the combinations of the quantization matrixes Qmatrix, the quantization parameters QP, and the intra-image prediction modes, before making a comparison.

Furthermore, in the above-noted first embodiment, the encoding device 10, which is an image processing device, includes: the integer DCT section 22, which is an orthogonal transformation section; the residue calculation section 32a, which serves as a division factor calculation section and a sum calculation section; the evaluation determination section 32b, which is a quantization factor detection section; and the QP determination section 32, which is a quantization factor detection section. However, the present invention is not limited to this. The image processing device of the present invention may consist of the orthogonal transformation section, division factor calculation section, sum calculation section, and quantization factor detection section having a variety of fairness.

(3) Second Embodiment (3-1) Principle of the Present Invention

For AVC (AVC Intra) of only Intra frame, in order to improve the quality of dubbing, a dubbing compensation circuit was once introduced into an encoding process to perform the above quantization matrix detection process and the quantization parameter detection process.

In general, the dubbing compensation circuit is used to detect from information of the input image what the previous encoding process used, including the quantization parameter. Before this process, the dubbing compensation circuit first makes a determination as to whether it is an original image (i.e. the input image that has not yet undergone any encoding processes). If it is the original image, the dubbing compensation circuit needs to perform a usual amount-of-codes control process: it turns off the compensation circuit or orders the subsequent encoding section not to use the parameter detected by the compensation circuit. Algorithms for determining whether it is the original image for MPEG or AVC have been already proposed. But it requires a relatively large circuit for the determination because it often uses statistics values on per frame basis. So they could be drawbacks in designing products in terms of LSI's power consumption and chip sizes.

Therefore, according to a second embodiment, the introduction of an original image determination section into a compensation circuit called back search prevents the compensation circuit from operating in an improper manner when the input image is the original image.

Specifically, the original image determination section is incorporated into the back search, which is the dubbing compensation circuit proposed in the past; parameters obtained during the back search process are counted to make a determination as to whether it is the original image. Accordingly, the use of the original image determination section, along with the back search, makes it possible to determine whether it is the original image, even if another large circuit is not added to it. The following provides the detailed description.
(1) Making a determination as to whether it is the original image using the residue of the DCT coefficient from the information of the input image
(2) Making a determination as to whether it is the original image based on the quantization parameter QP detected inside the back search circuit The following describes points the second embodiment has focused on.

As mentioned above with reference to the equations (1) and (2), according to AVC Intra, during the decoding process, the decoding rescaling factor RFr, which is a function of the quantization matrix Qmatrix and the quantization parameter QP, is multiplied by the quantization level Z, and the result of decoding is the DCT coefficient W whose figures have been shifted by six bits to the left.

Accordingly, it is considered that if the DCT coefficient W was obtained from an input image that has undergone one encoding process and one decoding process and its figures have been shifted by six bits to the left, it can be divided by the decoding rescaling factor RF including the quantization matrix Qmatrix and quantization parameter OP used in the previous process. Incidentally, according to AVC Intra, a dividing position where DCT is divided into an integral portion and a non-integral portion is different between the encoding process and the decoding process; the DCT coefficient in the encoding process is therefore not equivalent to the DCT coefficient in the decoding process. To make the DCT coefficient in the encoding process equivalent to that of the decoding process, transformation is required: the transformation matrix D mentioned in the above equation (7) can be used.

Figure 13:
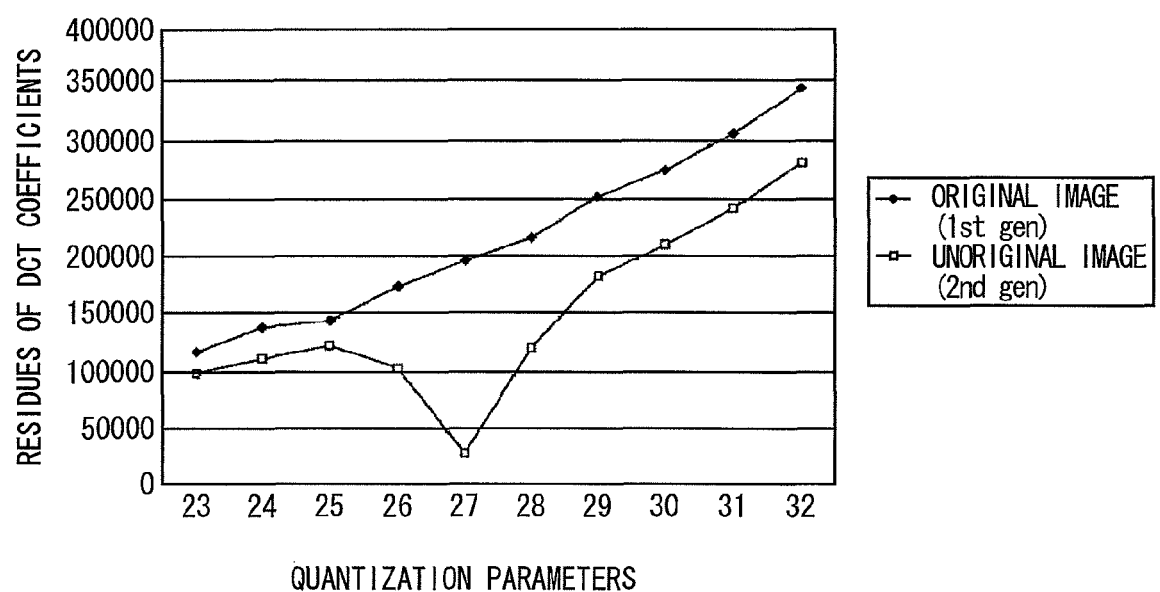
FIG. 13 is a diagram illustrating a correlation between QP and a residue of a DCT coefficient.

The reality is that the quantization parameter QP used in the previous process is still unknown at this time. Accordingly, the rescaling factor RF including various quantization parameters QP around the quantization parameter QP roughly calculated by an amount-of-codes control section is used to calculate the residues r of the DCT coefficients; given the total of each macro block, the input image that has undergone at least one encoding process and one decoding process (this image is referred to as "unoriginal image," hereinafter) has a similar tendency to that of the "unoriginal image," as shown in FIG. 13. It is obvious from this diagram that on the unoriginal image, the minimum value of the sum of the residues r ($\Sigma$r) with respect to the quantization parameter QP used in the previous process has appeared.

In theory, if the DCT coefficient W whose figures have been shifted by six bits to the left is divided by the rescaling factor RF containing the quantization parameter QP used in the previous encoding process, the residue r becomes zero. However, as mentioned above, the residue rarely becomes zero due to calculation errors of the actual processes; the quantization parameter QP used in the previous encoding process, in this case, has a minimum value of the residue. Moreover, according to the formulas of AVC Intra, RF becomes one second as the quantization parameter QP decreases by six. Accordingly, the quantization parameter QP which is 6n smaller than the quantization parameter QP used in the previous encoding process also has a minimum value of the residue r.

Meanwhile, as shown in FIG. 13, the input image that has not yet undergone any encoding and decoding processes (this image is referred to as an "original image," hereinafter) tends not to have such a minimum value, as shown in FIG. 13.

It is obvious from FIG. 13 that in general, the residue gets larger as the quantization parameter QP becomes large, regardless of whether they have already undergone the encoding and decoding processes. This is attributable to a statistical characteristic according to which the residue becomes larger as the divisor (RF) becomes large.

Here, the focus is put on the minimum value: since the minimum value appears on the unoriginal image, this becomes the smallest value of the residue r; because of monotonic increasing for the original image, the quantization parameter QP whose value is the smallest in a search range of the quantization parameter tends to have the smallest value of the residue r. Accordingly, the present invention enlarges the search range of the quantization parameter QP, and counts how many times the smallest quantization parameter QP has the smallest value of the residue r (the number of macro blocks).

In other words, within the widened search range of the quantization parameter QP, the present invention calculates the sum of the residues r ($\Sigma$r) (i.e. the sum of the evaluation values Y ($\Sigma$Y)) on per macro block basis. And if the quantization parameter QP whose sum of the residues r ($\Sigma$r) is the smallest is the smallest value in the search range, the present invention determines that the original image may exist in this macro block, and then counts this macro block.

And if the total of one frame exceeds a threshold, it determines that this frame is the original image, and then orders a subsequent encoding section to use usual amount-of-codes control instead of a dubbing compensation circuit. This depends on the accuracy in searching for the quantization parameter QP, but if the threshold is set at 80[%] (i.e. the number of macro blocks counted is greater than 80[%] of the total macro block numbers of the frame), it could appropriately perform the detection process for 25 samples, according to an experiment related to this embodiment.

In this manner, the present invention detects whether the minimum value of the sum of the residues r ($\Sigma$r) of each macro block exists. Accordingly, it can appropriately make a determination as to whether the input image data are the original or unoriginal image.

(3-2) Configuration of an Encoding Device

Figure 14:
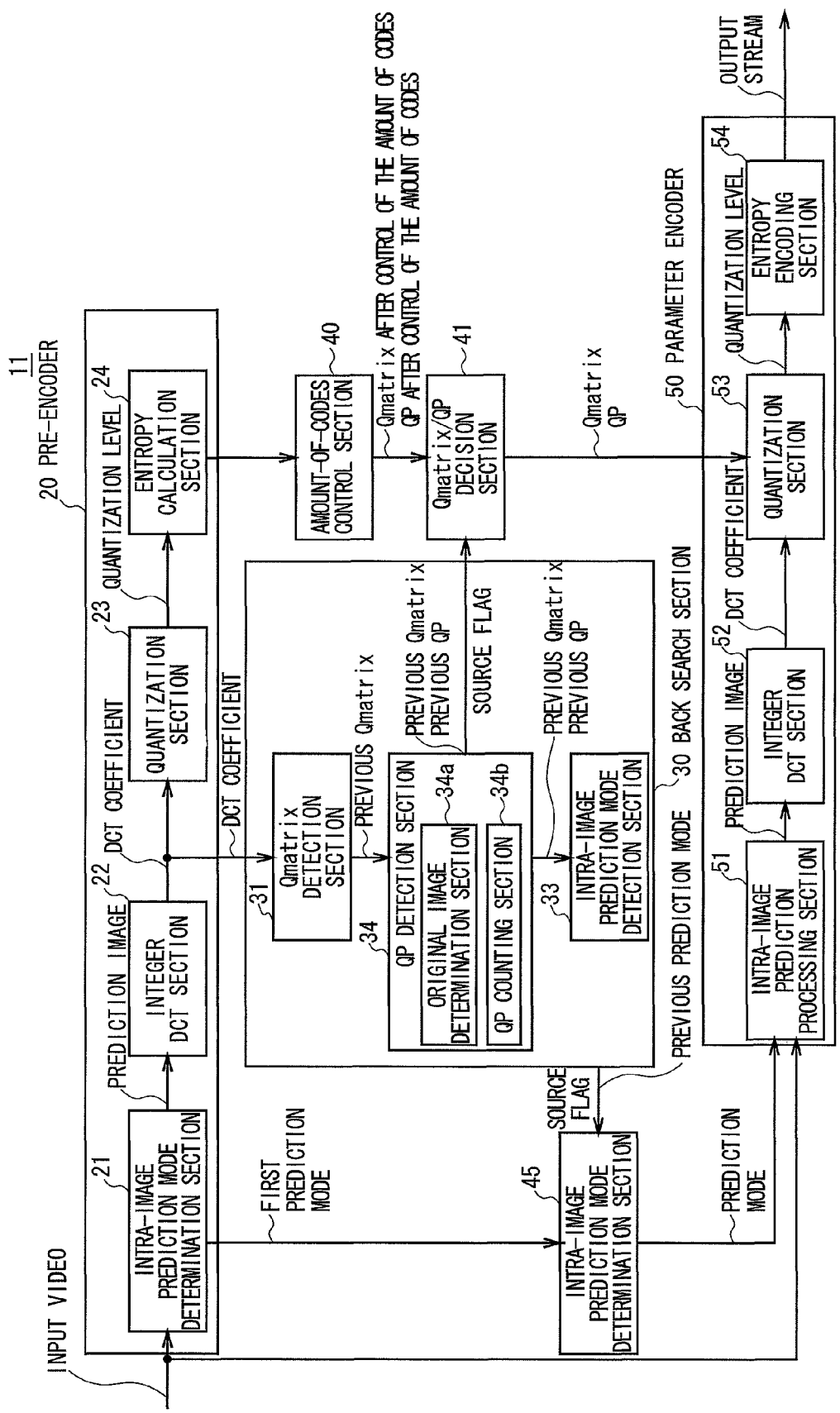
FIG. 14 is a diagram illustrating the configuration of an encoding device according to the second embodiment of the present invention.

The following describes an encoding device 11 according to a second embodiment of the present invention, with reference to FIG. 14. Since the basic configuration of the encoding device 11 is substantially the same as that of the above-described first embodiment (FIG. 7), the parts of FIG. 14 have been designated by the same symbols as the corresponding parts of FIG. 7. Moreover, the description on the same parts is omitted. Furthermore, the second embodiment uses the same algorithm for the quantization matrix Qmatrix and quantization parameter QP used in the previous encoding process as that of the first embodiment.

In FIG. 14, the main feature is that a QP detection section 34 further includes an original image determination section 34a and a QP counting section 34b. The original image determination section 34a, in a similar way to the above, makes a determination as to whether that is an original image or an unoriginal image. If that is the original image, it raises a source flag.

The Qmatrix/QP determination section 41 makes a determination as to whether it will use what the pre-encoder 20 (1 pass) estimates or what the back search section 30 detects as for the quantization matrix Qmatrix and the quantization parameter QP, according to whether, the souse flag exists. The same holds for intra-image prediction, according to whether the souse flag exists, the intra-image prediction mode decision section 45 makes a determination as to whether it will use the prediction mode whose sum of absolute difference (SAD) becomes the smallest in the pre-encoder 20 (1 pass) or the prediction mode detected by the intra-image prediction mode detection section 33.

(3-3) Procedure of an Original Image Determination Process by Back Search

Figure 15:
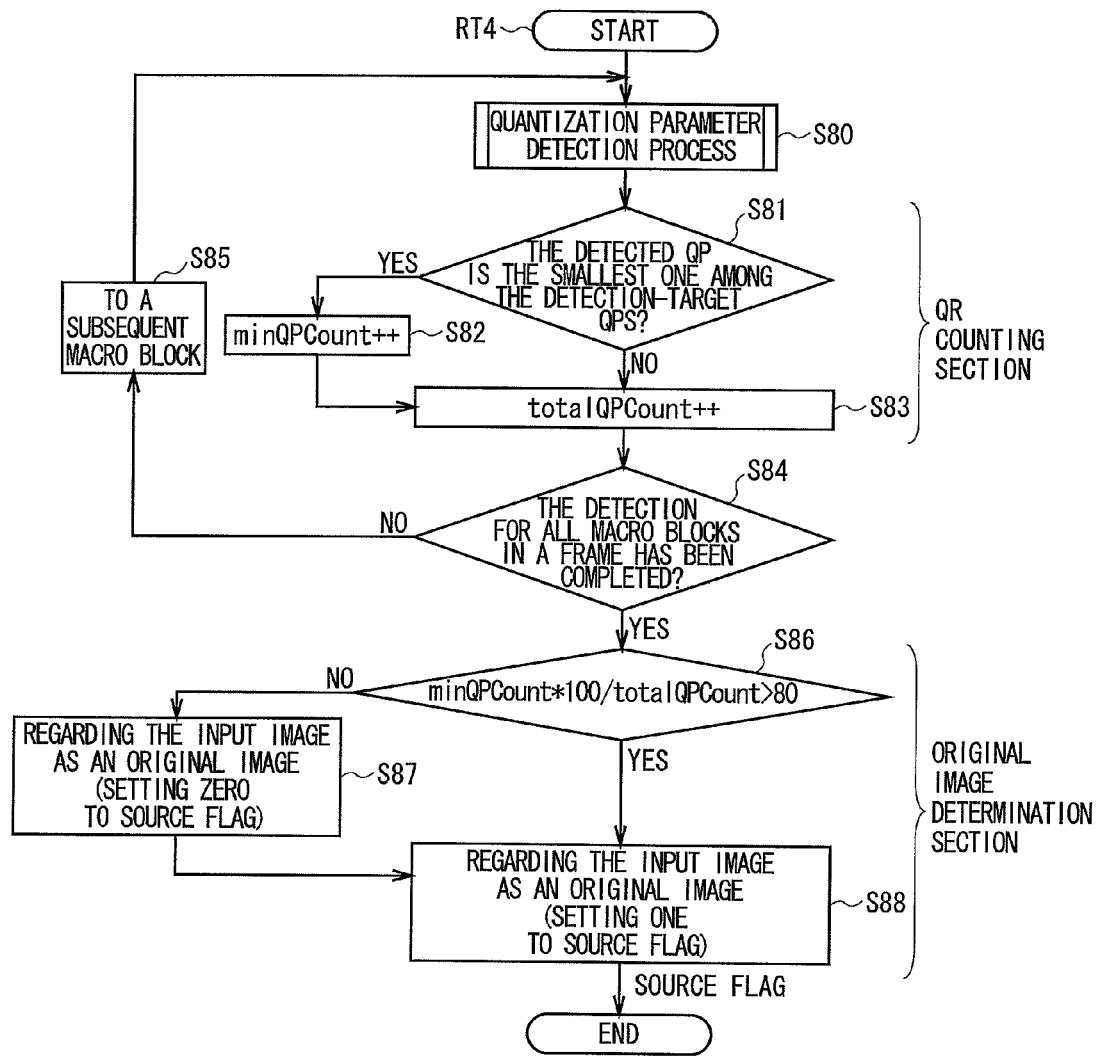
FIG. 15 is a flowchart illustrating an original image determination process by back search of an encoding device according to the second embodiment of the present invention.

The following provides the detailed description of a process of detecting the quantization parameter QP on per macro block basis by the QP detection section 34 of the encoding device 11 according to the second embodiment of the present invention, with reference to a flowchart shown in FIG. 15, which illustrates a procedure RT4 of an original image determination process by back search. This is equivalent to an image information encoding method of the present invention.

Incidentally, the encoding device 11 performs, instead of the quantization parameter detection process RT2, the procedure RT4 of the original image determination process by back search. Before this, the quantization matrix detection process RT1 (FIG. 10) is performed; after that, the prediction image mode detection process RT3 (FIG. 12) is performed.

At step S80, the QP detection section 34 of the encoding device 11 performs the processes of step S21 to S32 of the quantization parameter detection process RT2, and then proceeds to the next step SP81.

Then, the QP detection section 34 performs a counting process of the quantization parameter QP by the QP counting section 34b. That is, the QP counting section 34b makes a determination as to whether the detected quantization parameter QP is the smallest one among the detection-target quantization parameters QP (step S81). If the QP counting section 34b determines that this is the smallest quantization parameter QP, the QP counting section 34b increments minQPCount, a counter value for the smallest value of the quantization parameter QP, and then proceeds to step S83 (step S82). By contrast, if it determines that this is not the smallest quantization parameter QP, the QP counting section 34b proceeds to step SP83. At step SP83, the QP counting section 34b increments totalQPCount, a counter value for the total of the quantization parameters QP (step S83).

Then, the QP counting section 34b makes a determination as to whether the detection for all the MBs in the frame has been done (step S84). If it determines that the detection has not yet been done, the QP counting section 34b chooses the next macro block (step SP85), and then repeats those processes after step S301. By contrast, if it determines that the detection has been done, the QP counting section 34b starts the original image determination process using the original determination section 34a.

Specifically, the original image determination section 34a makes a determination as to whether the ratio of miniQPCount, the counter value for the smallest quantization parameters QP, to totalQPCount, the counter value for the total of the quantization parameters QP, is greater than a predetermined ration (80%, in this case) (step S86). If it determines that the ratio of totalQPCount is less than or equal to the predetermined ratio, the original image determination section 34a regards the input image as an unoriginal image (setting a Source flag to zero) (step S87). By contrast, if f it determines that the ratio of totalQPCount is greater than the predetermined ratio, the original image determination section 34a regards the input image as an original image (setting a Source flag to one) (step S87). Then, the original image determination section 34a ends the process.

Accordingly, the above-described encoding device 11 of the second embodiment can almost certainly detect whether the input image is the original one or not by using only information from the input image data. Moreover, the encoding device 11 can notify the subsequent parameter encoder 50 of the result of detection. This prevents the dubbing compensation circuit from being wrongly used when the input image data are the original image, and improves the quality of the encoded original image. Moreover, since the encoding device 11 can notify the subsequent parameter encoder 50 of the result of detection, the dubbing compensation circuit can be enabled when the input image data are the unoriginal image, thereby improving the quality of the unoriginal image encoded.

(3-4) Operation and Effect

With the above configuration, the encoding device 11 quantizes the DCP coefficient to generate quantization data, and then sets the quantization parameter QP for each macro block so that the amount of codes in an encoding stream, which is a stream based on the quantization data, becomes closer to a target amount of codes. If it determines that the input image data are the original image, the encoding device 10 quantizes the input image data based on the quantization parameter QP set by the amount-of-codes control section 40. By contrast, if it determines that the input image data are the unoriginal image, the encoding device 10 quantizes the input image data based on the quantization parameter QP detected by the back search section 30.

In this manner, the encoding device 11 can perform quantization using the appropriate quantization parameter QP according to whether the input image data are the original or unoriginal image. This prevents the quality of the encoded image from deteriorating.

Moreover, based on the ratio of the macro blocks in which the minimum value was detected, the encoding device 11 makes a determination as to whether the input image data are the original or unoriginal image.

Accordingly, based on the value of the quantization parameter QP detected by the back search process, the encoding process 11 can appropriately determine, by performing a simple process, whether the input image data are the original or unoriginal image.

The encoding device 11 sets part of the decoding factors possibly used in the decoding process as the search range. The encoding device 10 counts the minimum number of cases in which the smallest value of the quantization parameter corresponding to the minimum value was the smallest value of the quantization parameter within the search range, and counts how many times the process of image data is performed for each macro block processed (i.e. it counts the number of processes performed). And based on the ratio of the minimum number to the number of processes performed, the encoding device 10 makes a determination as to whether the input image data are the original or unoriginal image.

In this manner, the encoding device 11 can appropriately determine whether the input image data are the original or unoriginal image by just performing a simple process in which the minimum number and the number of processes performed are counted an the comparison is made between them.

According to the above configuration, the encoding device 11 can change the quantization parameter used for quantization depending on whether the input image is the original or not, and improve the quality of the image encoded.

(3-5) Other Embodiment

In the above-noted second embodiment, the determination as to whether the input image is the original or not is made based on the ratio of when the smallest value of the quantization parameter is the smallest value of the quantization parameter in the search range. However, the present invention is not limited to this. For example, the minimum value may be actually detected to determine whether the input image is the original or not. Moreover, the ratio for determination may vary according to the determination.

Moreover, in the above-noted second embodiment, the determination as to whether the input image is the original or not is made on per picture basis. However, the present invention is not limited to this. For example, it may be made on per slice or GOP basis. Moreover, the determination as to whether the input image is the original or not may not be made for all pictures: it may be made only for the top picture of GOP, for example.

(4) Third Embodiment (4-1) Overview of the Present Invention

Firstly, according to a third embodiment of the present invention, the quantization parameter QP for realizing a target amount of codes is predicted, and then an actual encoding process is carried out with the quantization parameter QP. Accordingly, the amount of generated codes becomes equal to the target amount of codes. In this manner, with the visual performance taken into account, the allocation of codes, or the quantization parameter, can be determined.

Secondly, the average quantization parameter and quantization matrix in a picture during the previous encoding process are determined, and if the determination is that it is the image encoded in the previous process, the input data are regarded as the input image data, and the locally decoded image is not used. This improves the accuracy of back search detection. This is one of the characteristics. The following describes them in detail.

According to the third embodiment, an encoding device 12 employs such an image encoding method as MPEG4 Part 10: AVC (Moving Picture Experts Group phase 4 Part 10: Advanced Video Coding) or another arithmetical encoding. In order to realize the appropriate allocation of codes in a picture during the amount-of-codes control process, the encoding device 12 performs a unique process as described below.

(4-1-1) Calculation of a MB Target Amount of Codes

Figure 16:
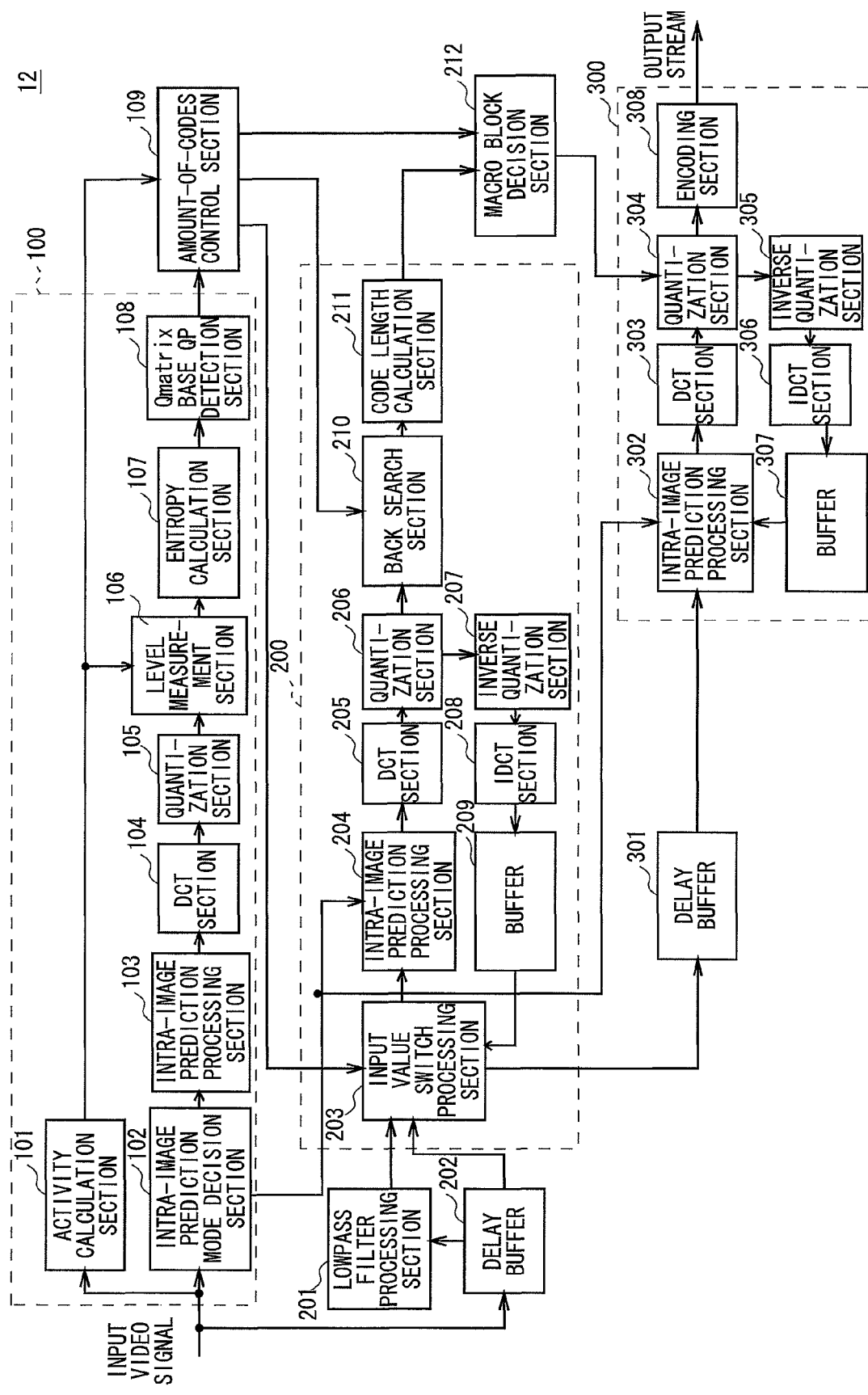
FIG. 16 is a diagram illustrating the configuration of an encoding device according to a third embodiment of the present invention.

As shown in FIG. 16, the encoding device 12 has an intra-image processing section 204, a DCT section 205, a quantization section 206, an inverse quantization section 207, an IDCT section 208, and a buffer 209, which serve as the first encoding device 2. The encoding device 12 also includes a parameter encoder 300, which serves as the second encoding section 4, and a back search section 210, which serves as the back search section 3.

The encoding device 12 performs pre-encoding two times using a first pre-encoder 100 and a second pre-encoder 200 to predict the quantization parameter QP that can realize the target amount of codes (i.e. it becomes the closest to the target amount of codes), and use this quantization parameter QP for the actual encoding process. Especially, the first pre-encoding calculates the entropy of a quantization coefficient absolute value level, which is an absolute value of a quantization coefficient after DCT (Discrete Cosine Transform) and quantization, and therefore roughly estimates an amount of MB-generated codes for each macro block.

In this case, the encoding device 12 uses the first pre-encoder 100 to perform the first pre-encoding: it first uses the smallest quantization parameter QP among the quantization parameters QP used for quantization, counts how many times each value occurs, calculates the number of occurrence of each quantization parameter QP from the number of occurrence of the smallest quantization parameter QP, and calculates the entropy of each quantization parameter QP from that value.

Moreover, the encoding device 12 calculates an predicted amount of generated codes for each quantization parameter QP from the entropy calculated by the first pre-encoder 100, and then calculates a prediction quantization parameter QPd, or the average in a picture, to realize the target amount of codes. In this case, since the calculation of the entropy is applied to a case in which the quantization matrix Qmatrix is used, the encoding device 12 counts the number of occurrence of for each position of DCT block (i.e. the matrix represented by the DCT coefficient).

Furthermore, in order for an amount-of-codes control section 109 to adapt the entropy calculation to adaptive quantization, the encoding device 12 classifies the macro blocks (MB) into groups according to Activity, and then counts the number of occurrence for each group, which was determined according to Activity.

Since it adaptively switches according to picture of the quantization matrix Qmatrix, the amount-of-codes control section 109 uses the quantization parameter QP that is used for a case in which a flat quantization matrix Qmatrix (i.e. this means Qmatrix is not used) is used and for realizing the target amount of codes. Then, the amount-of-codes control section 109 switches the quantization matrix Qmatrix using the quantization parameter QP. If the determined quantization matrix Qmatrix is not flat, the amount-of-codes control section 109 again calculates the quantization parameter QP that is used for the case in which that quantization matrix Qmatrix is used.

The encoding device 12 performs the second pre-encoding using the second pre-encoder 200, and encodes using the quantization parameter QP (referred to as a prediction quantization parameter QPd, hereinafter) and quantization matrix Qmatrix calculated by the first pre-encoder. The encoding device 12 obtains the amount of MB-generated codes, corrects the prediction quantization parameter QPd based on the difference between the amount of MB-generated codes and a target amount of MB-generated codes, and calculates a basic quantization parameter $Q_{MB}$. The actual encoding process uses the basic quantization parameter $Q_{MB}$ calculated by the second pre-encoder.

(4-1-2) Estimation of the Quantization Parameter QP Used in the Previous Encoding Process While employing the image encoding method that uses orthogonal coordinate transformation, such as DCT, like MPEG4 AVC, the encoding device 12 is also equipped with the following features in order to detect the state of discrete distribution from a coefficient distribution after DCT.

The encoding device 12 uses a Qmatrix/Base QP detection section 108 to roughly estimate the average of the quantization parameters QP in the previous encoding process's picture (referred to as an estimated quantization parameter QPe, hereinafter) and the quantization matrix Qmatris of the previous encoding process (referred to as an estimated quantization matrix QmatrixE, hereinafter). At this time, the encoding device 12 regards what was input into it as the input image data and will not use a locally decoded image. This improves the accuracy of back search detection. At this time, the encoding device 12 uses the amount-of-codes control section 109, regards a situation in which the estimated quantization parameter QPe and the estimated quantization matrix QmatrixE are not found as an original image, and makes a determination as to whether it is the original image or an image encoded in the previous encoding process.

Moreover, if it regards it as the original image and a prediction value of the prediction quantization parameter QPd, which is the average in a picture, is too large, an input value switch processing section 203 switches the input images to use an input stage's lowpass filter, thereby improving the subjective quality of image. By contrast if it regards it as the image encoded in the previous encoding process (unoriginal image), the encoding device 12 sets the estimated quantization parameter QPe and the estimated quantization matrix QmatrixE in the back search section 210, thereby putting limitations on a search range of the back search process and reducing the size of circuits. In addition to this, when a signal to which the encoding of Long GOP was applied is input, it is used for a determination of Intra picture.

That is, the encoding device 12 performs an amount-of-codes prediction process. The encoding device 12 first performs quantization using the smallest quantization parameter QP during the first pre-encoding process of the first pre-encoder 100, and uses an entropy calculation section 107 to predict the predicted amount of generated codes by the other quantization parameter QP. And the encoding device 12 predicts a prediction quantization parameter QPd and a prediction quantization matrix QmatrixD which will be used when the input image is the original image.

At this time, the first pre-encoder 100 performs the original image determination process using a quantization coefficient. The first pre-encoder 100 uses a quantization coefficient which was used when the quantization was carried out with the smallest quantization parameter QP to make a determination as to whether the input image is the original or unoriginal image. If the input image is the unoriginal image, the first pre-encoder 100 estimates the quantization parameter QP (i.e. the estimated quantization parameter QPe) around the quantization parameter used in the previous encoding process, and determines a search range for the back search process. Moreover, the first pre-encoder 100 estimates the quantization matrix Qmatrix (i.e. the estimated quantization matrix QmatrixE) used in the previous encoding process.

If the first pre-encoder 100 determines that the input image is the original image, the second pre-encoder 200 switches the back search section 210 off. Moreover, according to the prediction quantization parameter QPd of each picture predicted by the first pre-encoder 100, the second pre-encoder 200 selects whether to perform a lowpass filtering process for the input image. Then, the second pre-encoder 200 uses the predicted prediction quantization parameter QPd to perform the second pre-encoding process, corrects, for example, the prediction quantization parameter QPd based on the difference between the actual amount of generated codes and the target amount of codes, and calculates the basic quantization parameter $Q_{MB}$.

By contrast, if the first pre-encoder 100 determines that the input image is the unoriginal image, the second pre-encoder 200 switches the back search section 210 on: Then, with the search range and the estimated quantization matrix QmatrixE which are based on the estimated quantization parameter QPe determined by the first pre-encoder 100, the second pre-encoder 200 performs the back search process, and detects the quantization parameter QP used in the previous encoding process. Incidentally, the quantization parameter QP detected by the back search process is referred to as a detected quantization parameter QPb, hereinafter.

And if the input image is the original image, the parameter encoder 300 uses the basic quantization parameter $Q_{MB}$ and the prediction quantization matrix QmatrixD to perform an actual encoding process. By contrast, if the input image is the original image, the parameter encoder 300 uses the detected quantization parameter QPb and the estimated quantization matrix QmatrixE to perform an actual encoding process.

With those features taken into consideration, the following provides the detailed description of the third embodiment.

(4-2) Configuration of the Encoding Device

As shown in FIG. 16, the encoding device 12 includes the first pre-encoder 100, which performs the first pre-encoding process, the second pre-encoder 200, which performs the second pre-encoding process, the parameter encoder 300, which performs an actual encoding process, the amount-of-codes control section 109, a lowpass filter processing section 201, a delay buffer 202, and a macro block decision section 212.

More specifically, the first pre-encoder 100 includes an activity decision section 101, an intra-image prediction mode decision section 102, an intra-image prediction processing section 103, DCT section 104, a quantization section 105, a level measurement section 106, an entropy calculation section 107, and the Qmatrix/Base QP detection section 108. The second pre-encoder 200 includes the input value switch processing section 203, the intra-image prediction processing section 204, the DCT section 205, the quantization section 206, the inverse quantization section 207, IDCT section 208, the buffer 209, the back search section 210, and a code length calculation section 211. And the parameter encoder 300 includes an intra-image prediction processing section 302, DCT section 303, a quantization section 304, an inverse quantization section 305, IDCT section 306, a buffer 307, and an encoding section 308.

With this configuration, the input image data first enters the intra-image prediction mode decision section 102, and an intra-image prediction mode is decided. The decided mode will be used in the second pre-encoder 200 and the parameter encoder 300.

Then, the intra-image prediction processing section 103 calculates the difference between the input image data and the surrounding pixels of the input image data to generate difference image data. The input image data serve as these surrounding pixels. The intra-image prediction processing section 103 uses, instead of the prediction image data, the input image data as the surrounding pixels. This prevents the accumulation of errors of the prediction image data, which might occur as a result of repeating prediction if the prediction image data are used as the surrounding pixels. As a result, the intra-image prediction processing section 103 can improve the detection rates of the Qmatrix/Base QP detection section 108 detecting the quantization matrix Qmatrix and a basic quantization parameter Base QP. Moreover, this makes it possible to omit a quantization section, IDCT section and other processing sections, which the second pre-encoder 200 has.

Then, the DCT section 104 performs such processes as discrete cosine transformation, and supplies a DCT coefficient to the quantization section 105. The quantization section 105 performs a quantization process for the DCT coefficient to generate a quantization coefficient. What the quantization section 105 outputs is supplied to the entropy calculation section 107 via the level measurement section 106; the entropy is calculated; and the amount of codes is calculated on all the quantization parameters QP.

At this time, the entropy calculation section 107 calculates the values of the prediction quantization parameter QPd and the prediction quantization matrix Qmatrix, such that the amount of generated codes becomes closer to the target amount of generated codes. The entropy calculation section 107 supplies them to the Qmatrix/Base QP section 108. Moreover, the level measurement section 106 measures the level of the quantization coefficient, and supplies the result of level measurement to the Qmatrix/Base QP detection section 108 via the entropy calculation section 107. The Qmatrix/Base QP detection section 108 detects whether the input image is related to the original image, which was not encoded by the previous encoding process. At the same time, the Qmatrix/Base QP detection section 108 obtains the estimated quantization matrix QmatrixE and the estimated quantization parameter QPe.

Meanwhile, the input image is also input into the activity decision section 101. The activity decision section 101 calculates an activity for each macro block, and classifies the macro blocks into groups by activity. The activity decision section 101 inputs Activity Group numbers, which were assigned to the macro blocks, into the level measurement section 106 and the amount-of-codes control section 109.

If it is detected by the Qmatrix/Base QP detection section 108 as the original image, the amount-of-codes control section 109 calculates the prediction quantization parameter QPd, which is the average of each picture calculated by the first pre-encoder 100, and a prediction quantization matrix QmatrixD, and supplies them to the second pre-encoder section 200 along with the Activity Group of each macro block.

So the second pre-encoder 200 performs the second pre-encoding process. After the second pre-encoding process, the second pre-encoder 200 obtains the amount of generated codes at a time when the prediction quantization parameter QPd and the prediction quantization matrix QmatrixD are used. Then, the amount-of-codes control section 109 corrects the prediction quantization parameter QPd based on the amount of generated codes obtained, and generates the picture's basic quantization parameter $Q_{MB}$. At this time, the second pre-encoder 200 bypasses the back search section 210.

At this time, if the picture's prediction quantization parameter QPd is very large and its distortion stands out, the second pre-encoder 200 uses the input image switch processing section 203 to let the input image pass through the lowpass filter processing section 201. In this manner, the input image switch processing section 203 lets the input image undergo the lowpass filtering process, thereby reducing the visual distortion.

Moreover, if the Qmatrix/Base QP detection section 108 detects the quantization matrix Qmatrix and the basic quantization parameter Base QP (i.e. the input image is the unoriginal image), the second pre-encoder 200 uses the input image switch processing 203 to change what it uses as the prediction image data. That is, the input image switch processing 203 inputs, instead of the locally decoded image supplied from the buffer 209, the input image data supplied from the delay buffer 202 into the intra-image prediction processing section 204 as the prediction image data. As a result, the intra-image prediction processing section 204 uses the input image data as the prediction image data, thereby improving the detection rate of the back search section 210 during the back search process.

If it starts the back search process, the second pre-encoder 200 uses the back search section 210 to obtain the quantization parameter QP which helps minimize quantization distortion on a macro block unit basis. At this time, the back search section 210 uses the search range and the estimated quantization matrix QmatrixE, which are based on the estimated quantization parameter QPe, to perform the same quantization parameter detection process as that of the first embodiment.

If the Qmatrix/Base QP detection section 108 determines that the input image is the original image, the macro block decision section 212 controls the parameter encoder 300 to perform an actual encoding process using the basic quantization parameter $Q_{MB}$ corrected by the second pre-encoder 200.

By contrast, if the determination is that the input image is the unoriginal image, the macro block decision section 212 controls the parameter encoder 300 to perform an actual encoding process using the estimated quantization matrix QmatrixE estimated by the Qmatrix/Base QP detection section 108 and the detected quantization parameter QPb detected by the back search section 210.

Then, the parameter encoder 300, under the control of the macro block decision section 212, uses the intra-image prediction mode calculated by the first pre-encoder 100 to perform the actual encoding process for the input image data.

Figure 17:
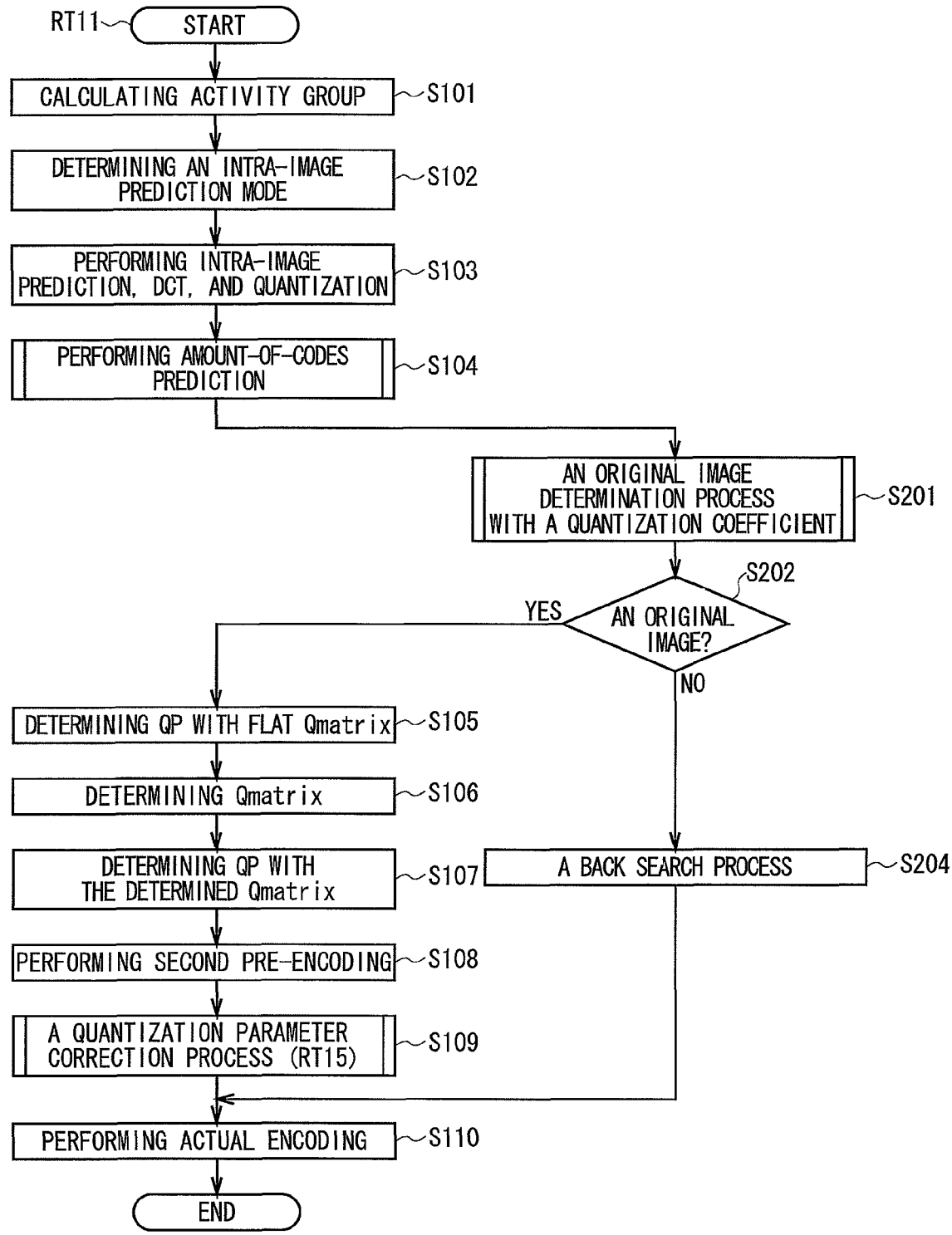
FIG. 17 is a flowchart providing the detailed description of a series of processes concerning an encoding process of an encoding device, according to the third embodiment of the present invention.

(4-3) Calculation Process of the Target Amount of Codes (4-3-1) Dealing with Activity The following provides the detailed description of a series of processes regarding the encoding of the encoding device according to the first embodiment of the present invention, with reference to a flowchart in FIG. 17, which illustrates a procedure RT11 of a three path encoding process.

The activity calculation section 101 first calculates the activity of each macro block based on the input image data, and classifies the macro blocks into activity groups according to the calculated values (step S101).

Specifically, assumes that the macro blocks are classified into 1 to NumOfActivityGourp groups: the activity calculation section 101 compares the calculated activity values of the macro blocks with thresholds (ActivityThreshold [0] to ActivityThreshold [NumOfActivityGourp-2]), which are used for classifying the macro blocks into the activity groups; and the activity calculation section 101 determines that the activity group whose activity value is within a threshold range belongs to the activity group of the macro block. With the following equation, an adaptive quantization parameter QPt of each macro block, which takes into account the activity, is calculated by adding an offset AdaptQpDelta, which depends on the activity group, to the quantization parameter QP (BaseQP), which is the average of a picture:

$$QPt = BaseQp + AdaptQpDelta[activity\_group] \quad (13)$$

For example, if the activity group NumOfActivityGroup is 13, each value of the offset AdaptQPDelta, which depends on that, is expressed as follows:

$$AdaptQpDelta[13] = \{-6,-5,-4,-3,-2,-1,0,1,2,3,4,5,6\} \quad (14)$$

That is, the activity calculation section 101 can calculate the adaptive quantization parameter QPt by adding each of the values, −6, −5, −4, −3, −1, 0, 1, 2, 3, 4, 5 and 6, to the quantization parameter QP of the macro block belonging to one of the activity groups "0" to "12."

Accordingly, when predicting the amount of generated codes regarding each quantization parameter QP, the entropy calculation section 107 uses the adaptive quantization parameter QPt calculated by the equation (14).

(4-3-2) First Pre-Encoding Process (4-3-2-1) Basic Processing

Subsequently, the first pre-encoder 100 uses the intra-image prediction mode decision section 102 to determine the intra-image prediction mode (step S102), and starts the first pre-encoding process (step S103).

The objective of the first pre-encoding process is to roughly estimate the amount of generated codes by calculating the entropy of data after DCT and quantization. Since an image compression Coding method using arithmetic coding can achieve the compression efficiency close to its limit in theory, the amount of codes is predicted with the entropy.

After going through the intra-image prediction process of the intra-image prediction processing section 103 and DCT of the DCT section 104, its value, which is after DCT, is quantized by the quantization section 105 with the smallest quantization parameter QP, and the level measurement section 106 counts how many times an absolute value of each value of the quantization coefficient appears. So if the possible range of the quantization coefficient's absolute values is from 0 to MaxLevel_In_MinQ, the level measurement section 106 counts the number of times when each absolute value of the quantization coefficient appears, Count[0] to Count[MaxLevel_In_MinQ].

In this case, the smallest quantization parameter QP means the smallest among the quantization parameters QP which are expected to be used. For example, if it is already known that the small quantization parameters won't be used due to low bit rate, this portion will be excluded.

As the quantization parameter QP to be used increases, MaxLevel_In_MinQ decreases; the level measurement section 106 can therefore reduce the number of counters it uses. However, the amount of codes at a time when a quantization parameter QP smaller than that quantization parameter QP is used can not be calculated due to the loss of information. Incidentally, the level measurement section 106 counts the number of times when an absolute value of the quantization parameter appears after quantization; this is to reduce the number of counters. If there is no limitation on the number of counters, it may count the number of times when a DCT coefficient, which is a value before quantization, appears. This calculation is carried out on all the parts of one picture.

Then, the level measurement section 106 and the entropy calculation section 107 performs an amount-of-codes prediction process to calculate a prediction value of the amounts of generated codes for each quantization parameter QP (step S104). This process is carried out for each quantization parameter QP.

Figure 18:
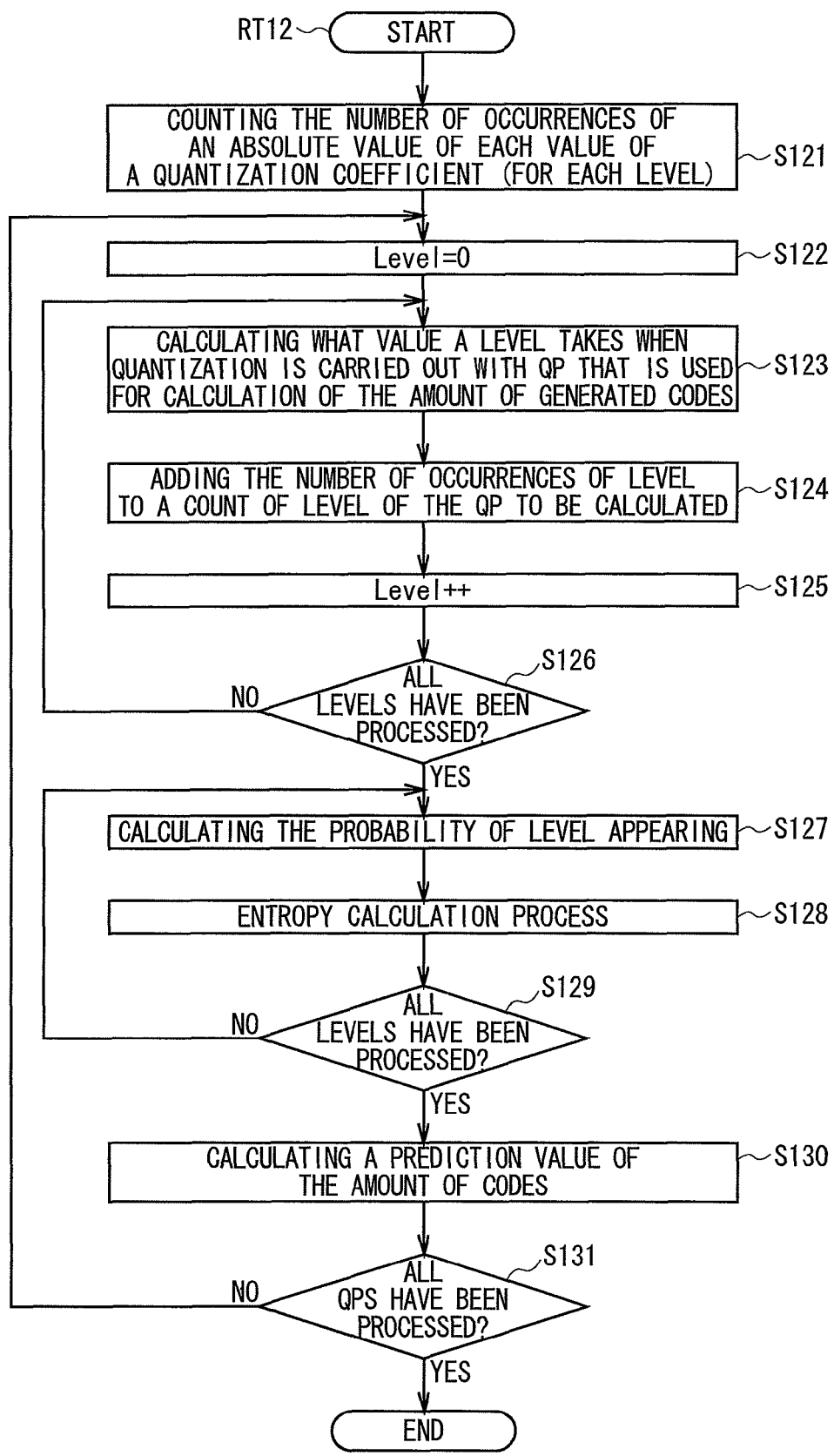
FIG. 18 is a flowchart providing the detailed description of an amount-of-codes prediction process (basic).

The detail of a procedure RT12 of the amount-of-codes prediction process is given in a flowchart of FIG. 18. That is, the level counting section 106 counts the number of times when each quantization coefficient absolute value level, which is an absolute value of each value of the quantization coefficient, appears (step S121). The level measurement section 106 first initializes a counter of the quantization coefficient absolute value level (level=0) (step S122), and calculates what value the quantization coefficient absolute value level takes when quantization is carried out with the (smallest) quantization parameter QP, which is used for calculating the amount of generated codes (step S123). Then, the level measurement section 106 adds that number, which is the number of times when the quantization coefficient absolute value level appears, to the counter of the quantization coefficient absolute value level for the quantization parameter QP for calculating the amount of codes (step S124), increments the counter of the quantization coefficient absolute value level (step S125), and makes a determination as to whether the process has been carried out on all the quantization coefficient absolute value levels (step S126).

If it determines that the process has not yet been carried out on all the quantization coefficient absolute value levels (No at step S126), the level measurement section 106 returns to the above step S123 to repeat the process. If it determines that the process has been carried out on all the quantization coefficient absolute value levels (Yes at step S126), the level measurement section 106 proceeds to step S127.

That is, during the process of from step S21 to S26, the number of times when each quantization coefficient absolute value level appears if the quantization is carried out with the smallest quantization parameter QP is calculated.

Subsequently, the entropy calculation section 107 calculates the probability of the quantization coefficient absolute value level appearing (step S27), and the entropy from what it has already calculated, or the number of times when each quantization coefficient absolute value level appears (step S28).

Now, the probability of the quantization coefficient absolute value level appearing, P[i], can be calculated:

$$P[i]=\text{count}[i]/\text{total\_count} \quad (15)$$

With the use of the probability P[i], the entropy Entropy can be calculated according to a general equation that is used for calculation of entropy:

$$\text{Entropy}=-1*\Sigma i(P[i]*\log(P[i])/\log(2)) \quad (16)$$

The entropy calculation section 107 makes a determination as to whether the processes of step S127 and S128 have been done on all the quantization coefficient absolute value levels (step S129): it repeats them until the processes of step S127 and S128 have been done on all the quantization coefficient absolute value levels. Then, if the processes have been done on all the quantization coefficient absolute value levels (Yes at step S129), the entropy calculation section 107 calculates a prediction value Estimated_Bits of the amount of codes (step S130):

$$\text{Estimated\_Bits}=\text{Entropy}*\text{total\_count}+\text{sign\_bits} \quad (17)$$

Here, a code bit sign_bits used in the equation (17) is expressed as follows, if the number of occurrences of a non-zero coefficient is non_zero_count:

$$\text{sign\_bits}=\text{total\_count}-\text{non\_zero\_count} \quad (18)$$

(4-3-2-2) Dealing with Activity

Figure 19:
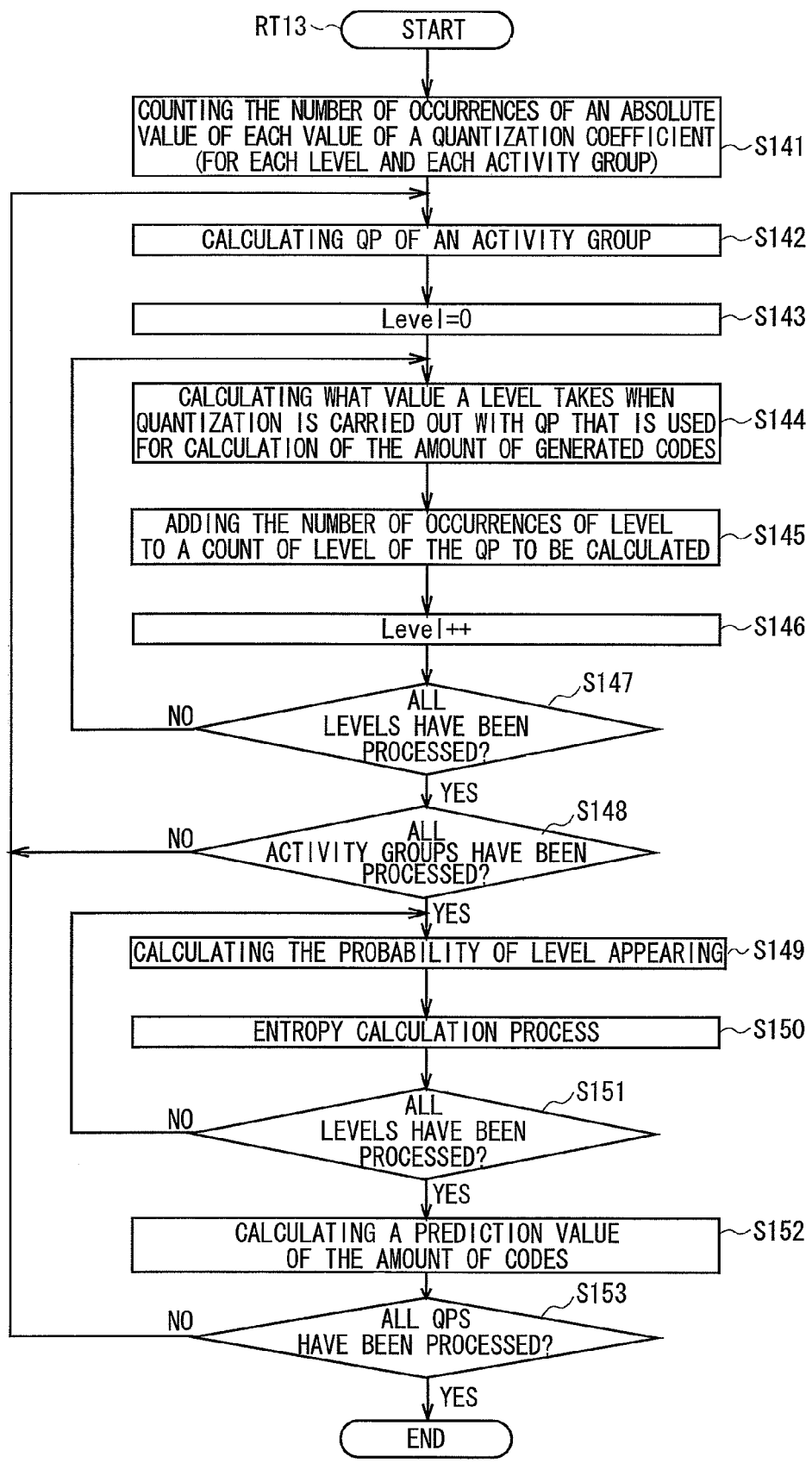
FIG. 19 is a flowchart providing the detailed description of an amount-of-codes prediction process (which supports activity).

In order to deal with activity, the (basic) procedure RT11 of the amount-of-codes prediction process shown in FIG. 18 needs to be replaced by a process shown in a flowchart of FIG. 19, which illustrates a (activity-oriented) procedure RT13 of an amount-of-codes prediction process.

Firstly, when counting the number of occurrences of an absolute value of each value of the quantization coefficient, the level measurement section 106 adds on per quantization-coefficient-absolute-value-level basis and counts on per activity-group (each_activity_group) basis (step S141).

This counter can be represented as Count[each_activity_group][each_level].

Then, the entropy calculation section 107 performs a process of calculating a prediction value of the amount of generated codes for each quantization parameter QP of a picture. This process is performed on each quantization parameter QP. The entropy calculation section 107 first calculates an adaptive quantization parameter QPt of each activity group (step S142). Subsequently, after initializing the quantization coefficient absolute value level (level=0) (step S143), the entropy calculation section 107 calculates what value the quantization coefficient absolute value level takes if the quantization is carried out with the quantization parameter QP used for calculation of the amount of generated codes (step S144). Moreover, the entropy calculation section 107 adds the number of times when the quantization coefficient absolute value level appears to the counter of the quantization coefficient absolute value level regarding the quantization parameter QP to be calculated (step S145), and increments the quantization coefficient absolute value level (step S146). The entropy calculation section 107 makes a determination as to whether the process has been carried out on all the quantization coefficient absolute value levels (step S147). If it determines that the process has not yet been carried out on all the quantization coefficient absolute value levels (No at step S147), the entropy calculation section 107 returns to the above step S144 to repeat the process. Whereas, if it determines that the process has been carried out on all the quantization coefficient absolute value levels (Yes at step S147), the entropy calculation section 107 proceeds to step S148.

The above-noted steps calculate, on per activity-group basis, the number of occurrences of an absolute value of each value of the quantization coefficient with the quantization parameter QP used for calculation of the amount of generated codes, from the number of occurrences of an absolute value of each value of the quantization coefficient with the smallest quantization parameter QP.

At step S148, the entropy calculation section 107 makes a determination as to whether the process has been done all the activity groups. If the process has not yet been done all the activity groups (No at step S148), the entropy calculation section 107 returns to the above step s142 to repeat the above process. If the process has been done all the activity groups (Yes at step S148), the entropy calculation section 107 calculates the entropy from what it has calculated, or the number of occurrences, and then calculates a prediction value of the amounts of codes (step S149 to S53.

The process of from step S149 to step S153 is substantially equal to the process of from step S127 to S131 of FIG. 18: the description about them is therefore omitted.

(4-3-2-3) Dealing with the Quantization Matrix

Figure 20:
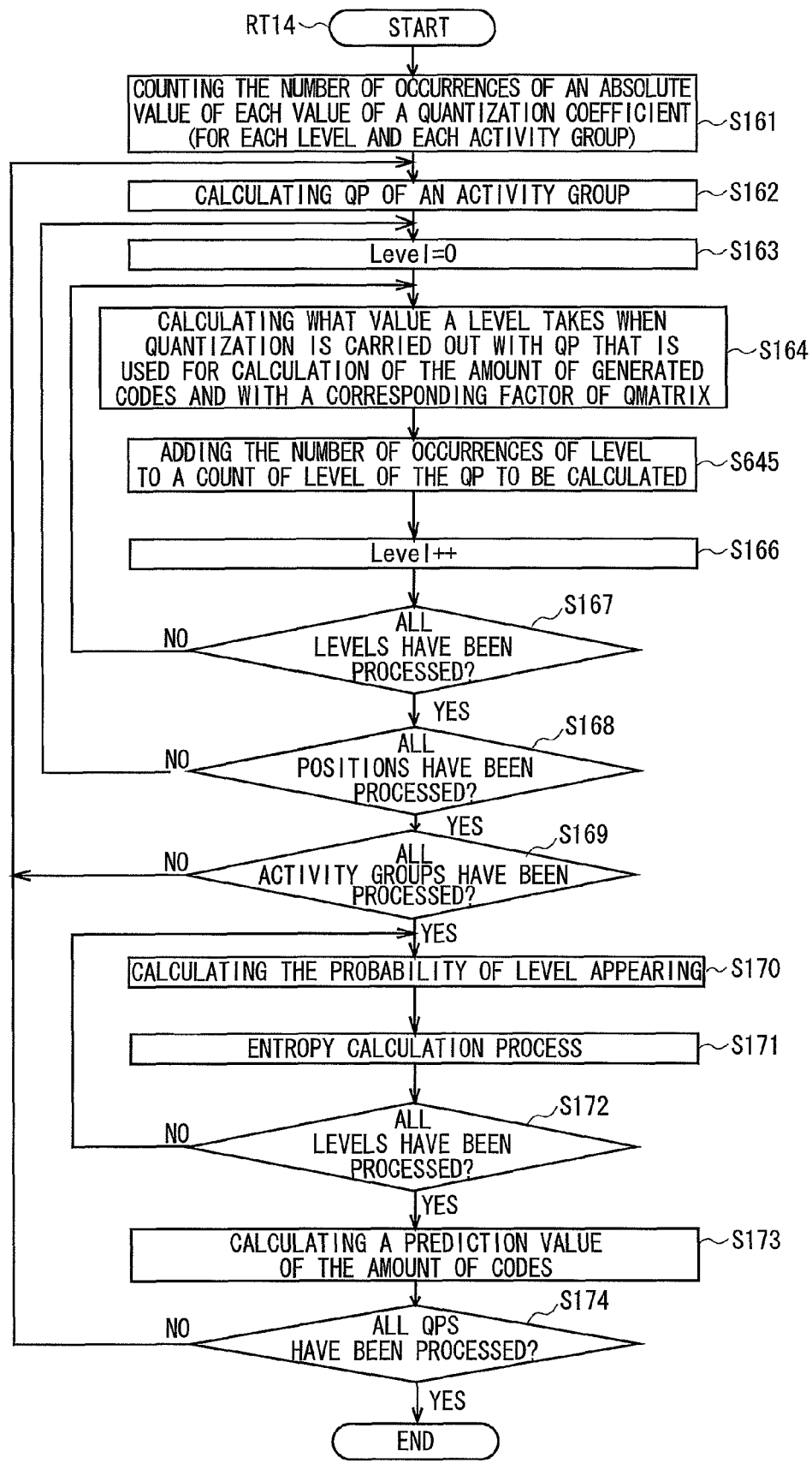
FIG. 20 is a flowchart providing the detailed description of an amount-of-codes prediction process (which supports an quantization matrix).

Moreover, in order to deal with the quantization matrix Qmatrix, the (basic) procedure RT11 of the amount-of-codes prediction process shown in FIG. 18 needs to be replaced by a process shown in a flowchart of FIG. 20, which illustrates a (quantization-matrix-oriented) procedure RT14 of an amount-of-codes prediction process.

Firstly, when counting the number of occurrences of an absolute value of each value of the quantization coefficient, it adds on per quantization-coefficient-absolute-value-level (each_level) basis and per activity-group (each_activity_group) basis, and counts for each position (each_position) of DCT Block (step S161).

This counter value can be represented as Count[each_activity_group][each_position][each_level].

Then, it carries out a process of calculating a prediction value of the amount of generated codes on each quantization parameter QP. This process is carried out on each quantization parameter QP. Added to this is a process of calculating it with each element of the quantization matrix Qmatrix of each position of DCT Block taken into account, when calculating, as the quantization parameter is carried out with the smallest quantization parameter QP, what value it takes with another quantization parameter QP used for calculation of the amount of generated codes (step S164). This means that after DCT, the coefficient is quantized by the result of multiplying the quantization parameter QP by the element of the quantization matrix Qmatrix. Then, it calculates, for each position of DCT Block, the number of occurrences of an absolute value of each value of the quantization coefficient with another quantization parameter QP used for calculation of the amount of generated codes from the number of occurrences of the quantization coefficient absolute value level when the quantization is carried out with the smallest quantization parameter QP (step S165).

It repeats them until the processes have been done on all the quantization coefficient absolute value levels (step S163 to S167). Moreover, it repeats them, until the processes have been done all the positions (position) of DCT Block (step S163 to S168). Since the subsequent processes (step S169 to S174) are substantially equal to the processes of from step S128 to S131 of FIG. 18, the description about them are omitted.

(4-3-2-4) Estimation of the Quantization Parameter.

Turning to FIG. 17, it subsequently enters a quantization parameter decision process. Since the predicted amount of codes of each quantization parameter QP has been calculated by the above processes, the entropy calculation section 17 choose, from among them, the quantization parameter QP which is closer to the target amount of codes than the rest as a prediction quantization parameter QPd (step S105).

(4-3-2-5) Adaptive Switching of the Quantization Matrix

To carry out an adaptive process of switching the quantization matrixes Qmatrix, the process of step S105 is changed in the following manner. That is, in such a case, it calculates the predicted amount of codes of the quantization parameter QP used at a time when a flat (Flat) quantization matrix Qmatrix (which means Qmatrix won't be used) is used, and choose, from among them, the quantization parameter QP which is closer to the target amount of codes than the rest.

It chooses one it will use from the calculated quantization parameters QP (step S106). More specifically, if the number of quantization matrixes Qmatrix that it may use by switching them is represented as NumOfQmatrixId, it compares thresholds QmatrixThreshold[0] to QmatrixThreshold[NumOfQmatrixId-2], which are used for associating the calculated quantization parameters QP with the quantization matrixes Qmatrix, with the quantization parameter QP, and therefore determines the quantization matrix Qmatrix. Then, it calculates the predicted amount of codes of the quantization parameter QP at a time the quantization matrix Qmatrix to be used is used, and chooses, from among them, the quantization parameter QP which is closer to the target amount of codes than the rest (step S107). This is the prediction quantization parameter QPd determined by the first pre-encoder 100.

(4-3-3) Second Pre-Encoding Process

Then, the second pre-encoder 200 performs the second pre-encoding process using the prediction quantization parameter QPd, which was determined by the first pre-encoding process of the first pre-encoder 100, the prediction quantization matrix QmatrixD, and the activity group Activity Group (step S108). The objective of the second pre-encoding process is to calculate an error of prediction and correct it by actually performing an encoding process with the prediction quantization parameter QPd roughly estimated by the first pre-encoding process. The result of the second pre-encoding process with the prediction quantization parameter QPd is the amount of generated codes.

Then, the macro block decision section 212 corrects the prediction quantization parameter QPd based on the difference between the target amount of codes and the amount of generated codes obtained as a result of the second pre-encoding process of the second pre-encoder 2 (step S109). That is, when correcting the prediction quantization parameter QPd, the macro block decision section 212 assumes that each time the quantization parameter QP increases or decreases by one, the amount of generated codes changes at a predetermined rate, or a predetermined changing ratio DiffRatio [%]. It assumes that the amount of data to be corrected is so small the level of the error is not a big problem even if a change in the amount of generated codes versus the quantization parameter QP is constant, regardless of the picture (i.e. the activity group).

Figure 21:
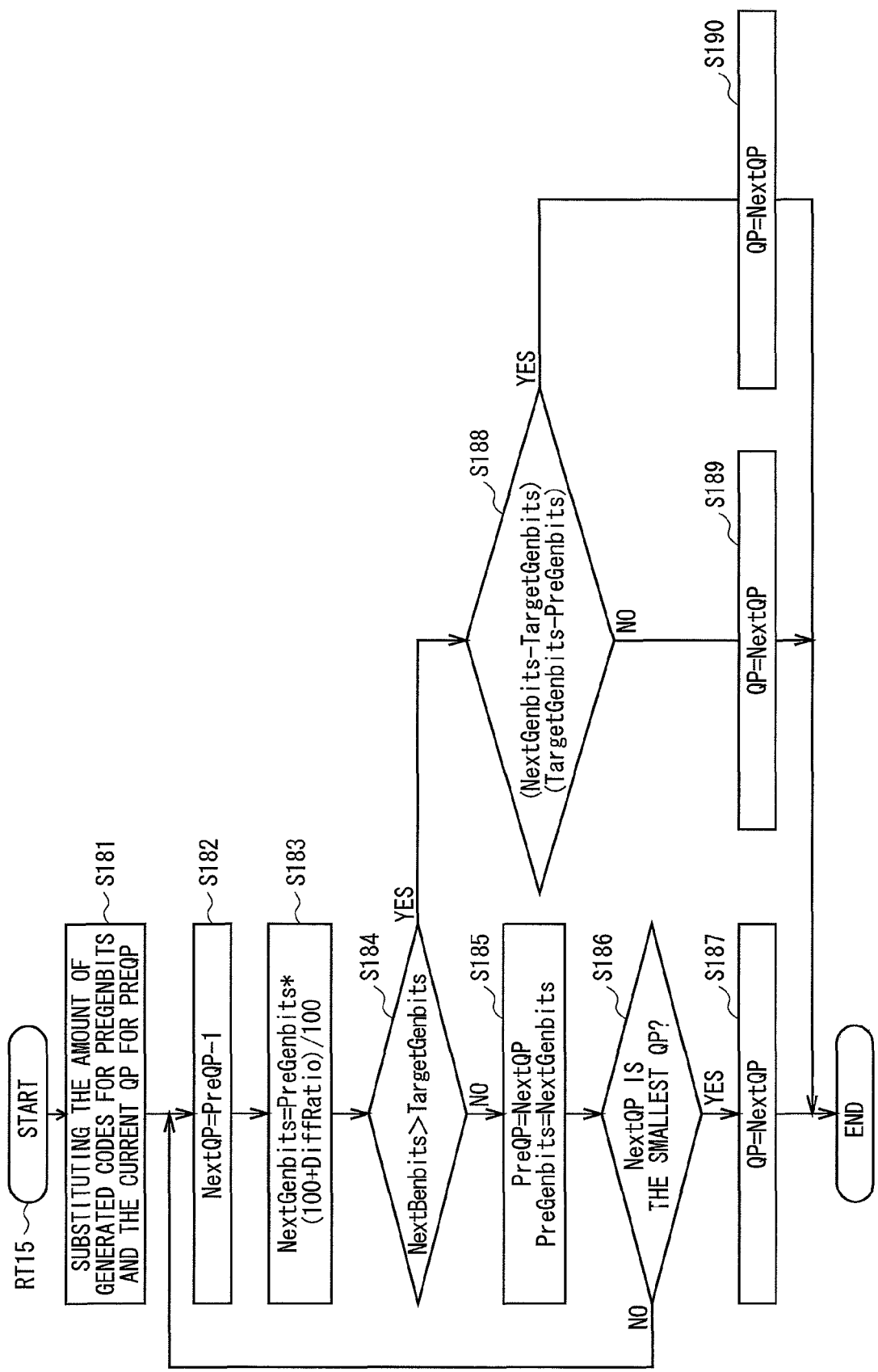
FIG. 21 is a flowchart illustrating an amount-of-codes correction process when the amount of generated codes is less than the target amount of codes and when the quantization parameter QP is not the smallest.

The following describes an amount-of-codes correction process at a time when the amount-of-codes with the prediction quantization parameter QPd is less than the target amount of codes and when the prediction quantization parameter QPd is not the smallest, with reference to a flowchart of FIG. 21, which illustrates a procedure RT15 of a quantization parameter correction process.

Incidentally, the same holds for a case in which the amount of generated codes is greater than the target amount of codes.

After starting this process, the macro block decision section 212 substitutes the amount of generated codes for PreGenbits, and the current prediction quantization parameter QP for PreQP (step S181), and calculates NextQP by subtracting one from PreQP (step S182). Incidentally, if the amount of generated codes is less than the target amount of codes, the macro block decision section 212 regards the result of adding one to PreQP as NextQP.

Then, the macro block decision section 212 regards PreGenbits*(100+DffRatio)/100 as the amount of generated codes NextGenbits corresponding to NextQP; which has increased or decreased by one from PreQP (step S183). Here, it assumes that each time the quantization parameter QP increases or decreases by one, the amount of generated codes decreases according to the changing ratio DiffRatio.

Subsequently, the macro block decision section 212 makes a determination as to whether the amount of generated codes NextGenbits is greater than the target amount of codes TargetGenbit (i.e. whether the amount of generated codes, which was less than the target amount of codes, becomes greater than the target amount of codes) (step S184). If the relation between them is not NextGenbits>TargetGenbit (i.e. the amount of generated codes, which was less than the target amount of codes, is still less than the target amount of codes), the macro block decision section 212 substitutes the current NextQP for PreQM, and the current NextGenBits for PreGenbits (step S185). It makes a determination as to whether NextQP is the smallest quantization parameter QP (step S186).

Here, if NextQP is not the smallest quantization parameter QP, the macro block decision section 212 returns to step S182 to repeat the above process. That is, the macro block decision section 212 at step S182 performs the above-noted process for NextQP, which has increased or decreased by one from that of the previous process. By contrast, if NextQP is the smallest quantization parameter QP at step S186, the macro block decision section 212 regards NextQP as the basic quantization parameter $Q_{MB}$, and ends the process. By contrast, if the relation at step S184 is NextGenbits>TargetGenbit (i.e. the amount of generated codes, which was less than the target amount of codes, becomes greater than the target amount of codes), the macro block decision section 212 then makes a determination as to whether the relationship of (NextGenbits−TargetGenbit)>(TargetGenbit−PreGenBits) is true (step S188). If this relationship is true, the macro block decision section 212 regards PreQP as the basic quantization parameter $Q_{MB}$ because the amount of generated codes PreGenBits with PreQP is closer to the target amount of codes TargetGenbit than the others. By contrast, if the relationship at step S188 is not true, the macro block decision section 212 regards the target amount of codes NextQP as the basic quantization parameter $Q_{MB}$ because the amount of generated codes NextGenBits with NextQP is closer to the target amount of codes TargetGenbit than the others, and ends the process.

(4-3-4) Actual Encoding Process

Turning to FIG. 17, the parameter encoder 300 starts the actual encoding process (step S110). The encoding of the actual encoding process uses the basic quantization parameter $Q_{MB}$ determined by the second pre-encoding process of the second pre-encoder 200, the prediction quantization matrix QmatrixD determined by the first pre-encoding process, the activity group Activity Group, and the intra-image prediction mode. In this manner, it completes the series of processes of encoding image information.

As described above, according to the third embodiment of the present invention, without performing an intra-image feed back (Feed Back) control process, it can bring the amount of generated codes closer to the target amount of codes, which is given for a one picture. This helps prevent the problems related to the feed back control process, some of which are attributable to an inappropriate initial value of a feed back parameter and an inappropriate allocation of codes for the target. As a result, by bringing the amount of generated codes closer to the target amount of codes, it can take into account the visual performance when determining the allocation of codes, or the quantization parameter.

(4-4) Original Image Determination Process with the Quantization Coefficient (4-4-1) Principle The following describes the principle of an original image determination process with the quantization coefficient.

In this case, distribution data of counter values (Count [each_activity_group][each_position][each_level]), each of which is the number of occurrences of the quantization coefficient absolute value level that is an absolute value of each value of the quantization parameter, are used as the basic information for the process.

Figure 22:
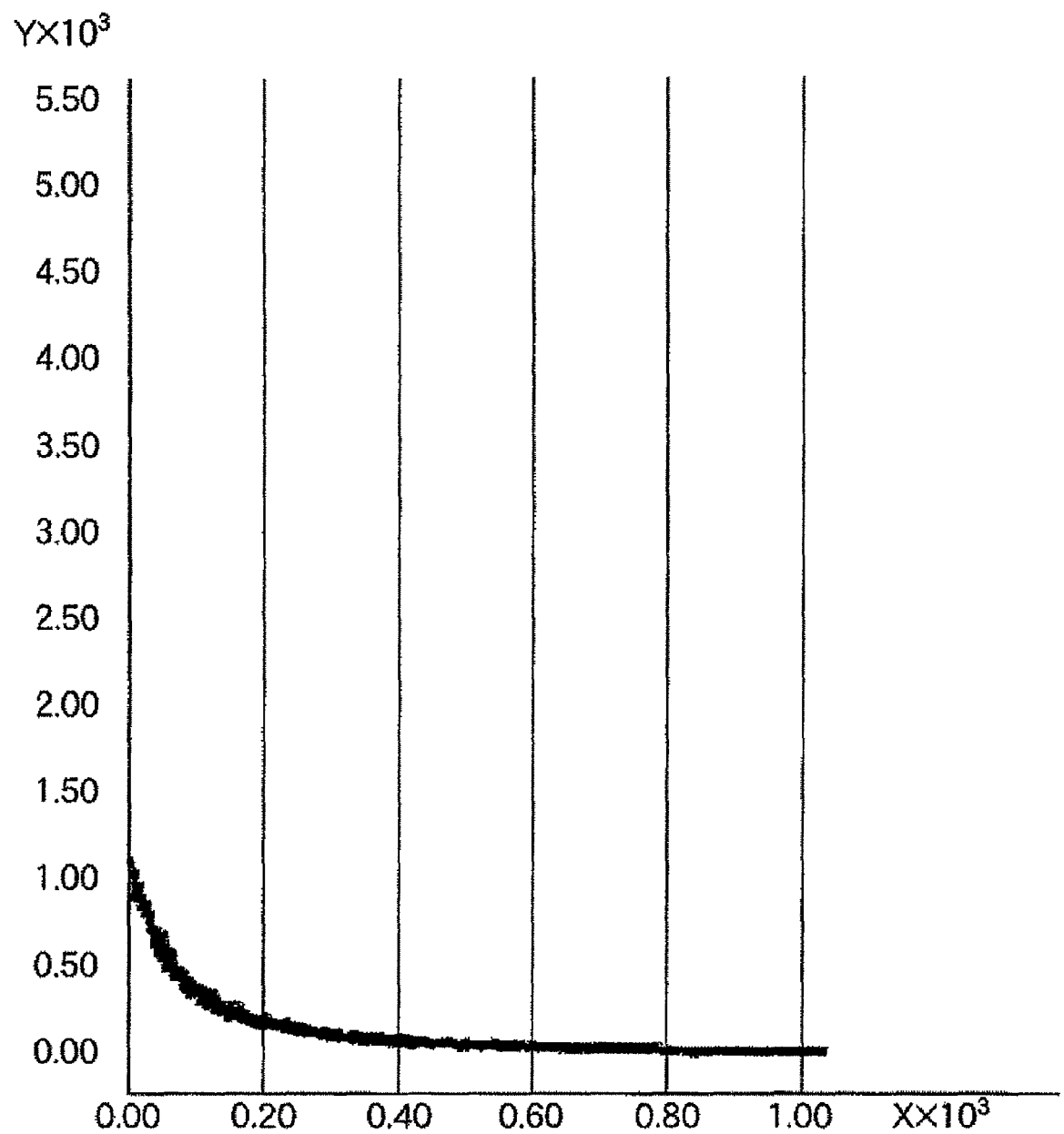
FIG. 22 is a diagram illustrating a distribution state actual measurement value when each_activity_group is zero and each_position is five after an original image is input.
Figure 23:
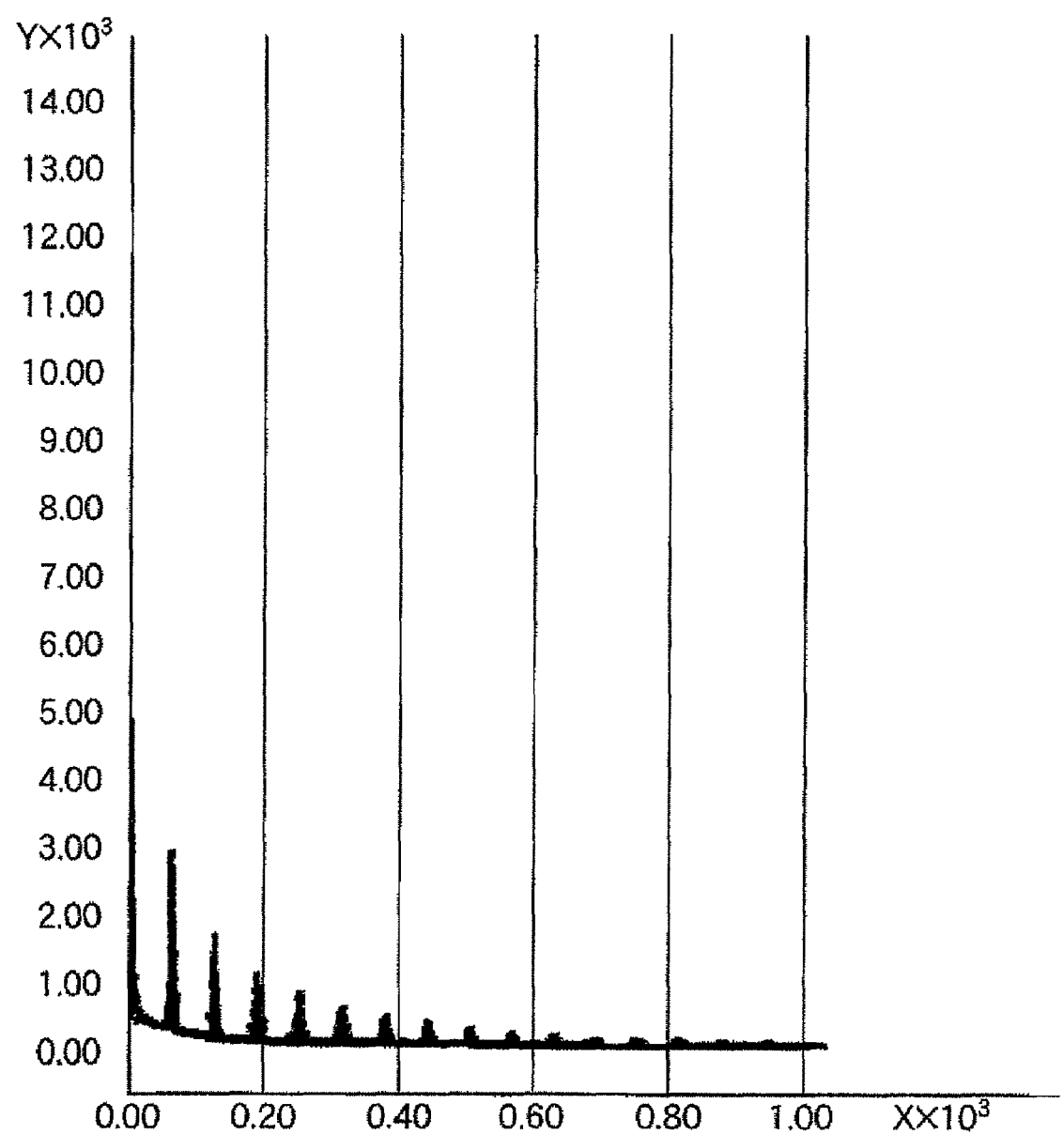
FIG. 23 is a diagram illustrating a distribution state actual measurement value when each_activity_group is zero and each_position is five after an image that was encoded with QP=20 in the previous process is input.

FIG. 22 shows actual measurement values of the distribution state when each_activity_group=0 and each_position=5; FIG. 23 is actual measurement values of the distribution state when an image encoded with the quantization parameter QP=20 in the previous process is input and when each_activity_group=0 and each_position=5. The horizontal axes represent the values of the quantization coefficient absolute value level, while the vertical axes represent the counter values of the number of occurrences of the quantization coefficient absolute value level.

According to the diagrams, as for the original image, the number of occurrences monotonically decreases as the quantization coefficient absolute value level increases. By contrast, as for the unoriginal image, since the quantization coefficient absolute value level was once rounded off by quantization, the number of occurrences of the quantization coefficient absolute value level rises when the quantization step, which is based on the quantization parameter QP, is in a simple integer ratio: as for the number of occurrences, discrete peaks appear.

Here, the quantization coefficient absolute value level is the quantization coefficient, which was quantized with the smallest quantization parameter QP during the above amount-of-codes prediction process of the entropy calculation section 17. That is, since a very small value is expected to be the smallest quantization parameter QP, the quantization coefficient absolute value level is very close to the result of dividing the DCT coefficient by a scaling factor MF, which is defined according to AVC, even if the quantization parameter QP is not zero.

Accordingly, if Qmatrix is not taken into account, the above peaks periodically appear near an integral multiple of the result of multiplying the prediction quantization parameter QPd and an element value of the quantization matrix Qmatrix.

Especially, if the quantization coefficient absolute value level is the next peak from zero (this peak is referred to as a first peak, hereinafter), it can reduce the effect caused by the amount-of-codes prediction process in which the quantization parameter QP used is not zero.

Accordingly, by determining whether it has detected the first peak, the encoding device 12 makes a determination as to whether the image of the input image data is an original image, which has not yet undergone any encoding process, or an unoriginal image, which has already undergone the encoding process.

Moreover, the encoding device 12 estimates the quantization parameter QP whose first peak was detected as the estimated quantization parameter QPe. This estimated quantization parameter QPe is the equivalent of the average of the quantization parameters QP in a picture used in the previous encoding process. Moreover, the encoding device 12 performs a process for each position of the matrix of the quantization coefficient to detect the estimated quantization matrix Qmatrix.

(4-4-2) Detailed Description of the Process

The following provides the detailed description of the original image determination process using the quantization coefficient according to the present invention.

In general, according to H.264 AVC encoding method, the spread of the discrete state caused by quantization is observed due to such factors as nonlinear distortion: one of the factors is that the accuracy in calculation of IDCT is not enough, and another is that not 100% of the Intra prediction mode can be reproduced. But the discrete state can be detected. Statistically, one screen of data is too much. Therefore, in order to reduce the amount of calculation in this case, the distribution around the quantization parameter QP, or the quantization parameter QP and the quantization matrix Qmatrix whose residue is the smallest but whose coefficient level after quantization is one, is calculated. Incidentally, since data of the distribution representing the adjoining quantization levels need to be excluded, data within a range of QP/2 to 3QP/2 are to be evaluated.

Figure 24:
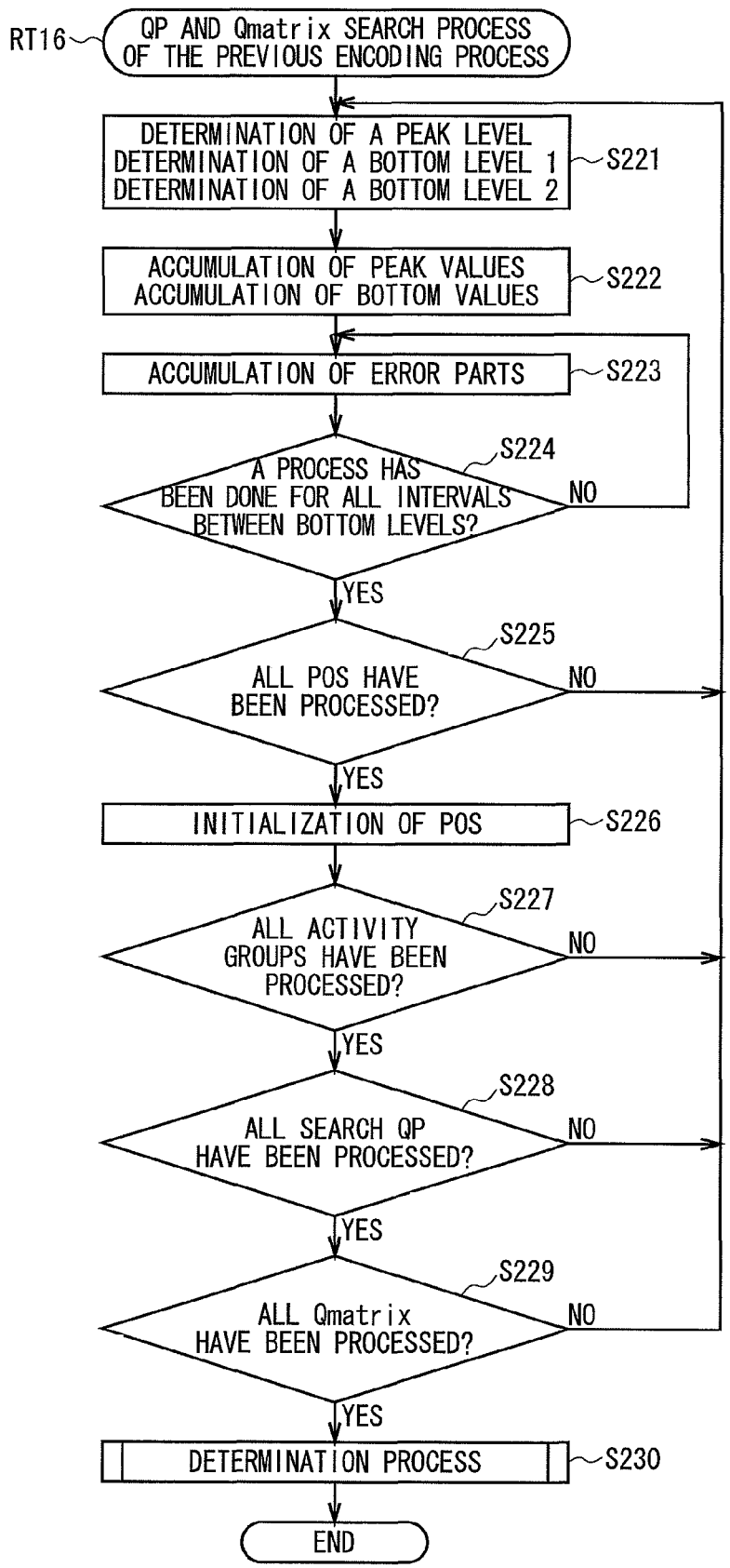
FIG. 24 is a flowchart illustrating an original image determination process that uses a quantization coefficient.

The following further describes the process of step S201, with reference to a flowchart of FIG. 24, which illustrates a procedure RT16 of the original image determination process that uses the quantization coefficient.

If a variable changing within a range of ±6 around the prediction quantization parameter QPd calculated by the amount-of-codes prediction process (i.e. the detection-target quantization parameter) is regarded as a search quantization parameter QP (sch_qp), an adaptive quantization parameter QPt(qp), obtained as a result of adding an offset of activity to the search quantization parameter QP (sch_qp), is calculated as follows:

$$qp = sch\_qp + \text{Adapt}Qp\text{Delta}[\text{activity\_group}] \quad (19)$$

Then, a peak level (t[0]) representing the quantization level of the quantization parameter QP, a bottom level 1(t[1]) representing the level of QP/2, and a bottom level 2(t[2]) representing the level of 3QP/2 are determined as follows (step S221):

$$t[0] = ((Q\_Matrix[mid][pos] * 2^{(qp/6)})/16) \quad (20)$$

Here, Q_matrix[mid][pos]* represents, among those of mid kinds of Qmatrixes of 4×4 DCT block, a value of the pos-th position. That is, according to the equation (20), the Qmatrix/Base QP detection section 108 predicts the quantization coefficient absolute value level of the peak level (t[0]), on which the first peak might appear, based on the prediction quantization parameter QPd.

That is, as for the search quantization parameter QP (sch_qp), the Qmatrix/Base QP detection section 108 sets, as the peak level (t[0]), what it has obtained as a result of multiplying by a value of a detection-target search Qmatrix, for each adaptive quantization parameter QPt, which undergoes the adaptive quantization, and each position (pos) of Qmatrix. In other words, as for one search quantization parameter QP(sch_qp), the Qmatrix/Base QP detection section 108 sets a different value as the peak level (t[0]) according to the adaptive quantization parameter QPt and the position (pos) of Qmatrix:

$$t[1] = t[0]/2 \quad (21)$$

$$t[2] = t[0] + t[1] \quad (22)$$

That is, according to the calculation of the Qmatrix/Base QP detection section 108, t[1] is ½ of t[0]; t[2] is a value obtained as a result of adding t[0] and t[1].

Then, a peak accumulation of a counter value of a peak level (t[0]) and a bottom accumulation (b[mid][qp]) of a counter value of a bottom level 1 (t[1]) are carried out (step S222):

$$p[mid][qp] += \text{Count}[\text{activity\_group}][\text{pos}][t[0]] \quad (23)$$

That is, the Qmatrix/Base QP detection section 108 adds up the counter values regarding the number of occurrences obtained as a result of counting the peak level (t[0]) for each activity group (activity_group) and each position (pos) of Qmatrix, for each search-target search Qmatrix (mid) and each search quantization parameter QP (sch_qp):

$$b[mid][qp] += \text{Count}[\text{activity\_group}][\text{pos}][t[1]] \quad (24)$$

That is, the Qmatrix/Base QP detection section 108 adds up the counter values regarding the number of occurrences obtained as a result of counting the bottom level (t[1]) for each activity group (activity_group) and each position (pos) of Qmatrix, for each Qmatrix (mid) and each search quantization parameter QP (sch_qp).

Here, the counter values are counted by the Qmatrix/Base QP detection section 108 for each activity group (activity_group) and each position (pos) of Qmatrix.

As shown in the equation (21), the Qmatrix/Base QP detection section 108 multiplies, as t[0] and for each activity group, the quantization coefficient absolute value level by 2QP/6 (but, the search quantization parameter QP is the adaptive quantization parameter QPt used for quantization during the amount-of-codes calculation process). That is, the Qmatrix/Base QP detection section 108 sets, as the search quantization parameter QP (sch_qp), a value according to the adaptive quantization parameter QPt.

This allows the Qmatrix/Base QP detection section 108 to equally deal with different activity groups in terms of the number of occurrences of the quantization coefficient absolute value level and to overlap the peak of one activity group with the peak of another activity group.

Moreover, as shown in the equation (21), the Qmatrix/Base QP detection section 108 multiplies, as t[0] and for each position (pos) of Qmatrix, the quantization coefficient absolute value level by each value of the search Qmatrix (mid).

This allows the Qmatrix/Base QP detection section 108 to equally deal with different positions (pos) of Qmatrix in terms of the number of occurrences of the quantization coefficient absolute value level and to overlap the peak of one position (pos) of Qmatrix with the peak of another position (pos) of Qmatrix.

As a result, the Qmatrix/Base QP detection section 108 corrects the difference regarding the adaptive quantization parameter QPt, and the difference regarding the position (pos) of Qmatrix, and is therefore able to deal with everything as the number of occurrences of the quantization coefficient absolute value level. Accordingly, the Qmatrix/Base QP detection section 108 can obtain a number of samples which is enough to detect the first peak, thereby, improving the accuracy in detection of the peak.

Then, the Qmatrix/Base QP detection section 108, following an equation described below, adds up errors (rest[mid][qp]) of the quantization coefficient for each search quantization parameter QP (sch_qp) and each quantization matrix Qmatrix(mid) (step S223):

$$\text{rest}[mid][qp] += \text{abs}(t[0]-\text{lev}) \times \text{Count}[\text{activity\_group}][\text{pos}][\text{lev}] \quad (25)$$

Here, lev is a variable that is changeable within a range of t[1] to t[2]; abs represents an absolute value.

At this time, in a similar way to the case of the peak level (t[0]) and the bottom level 1(t[1]), the Qmatrix/Base QP detection section 108 makes correction for each activity group and each position of Qmatrix to equally deal with the number of occurrences of the quantization coefficient absolute value level, before adding up the errors (rest[mid][qp]).

That is, as for each Qmatrix and each search quantization parameter QP (sch_qp), the Qmatrix/Base QP detection section 108 adds up the number of occurrences about the variable lev for each activity group and each position (pos) of Qmatrix to calculate an accumulation value. Moreover, the Qmatrix/Base QP detection section 108 multiplies the accumulation value by an absolute value of a subtraction value obtained as a result of subtracting the variable lev from the peak level (t[0]) in order to calculate the error (rest[mid][qp]) (i.e. the magnitude of a residue).

In other words, the Qmatrix/Base QP detection section 108 multiplies a difference value of the variable lev against the peak level (t[0]). Accordingly, the error (rest[mid][qp]) becomes small when the peak level (t[0]) becomes equal to the actual peak, because a peak portion whose, value is large is multiplied by the small difference value. On the other hand, as the peak level (t[0]) moves away from the actual peak, the error (rest[mid][qp]) becomes larger, because a peak portion whose value is large is multiplied by the large difference value.

Accordingly, as a result of adding up all the counter values regarding the activity group and the position (pos) of Qmatrix, the peak accumulation p[mid][qp], the bottom accumulation b[mid][qp], and the error rest[mid][qp] can represent a parameter representing the average distribution of all samples in a picture.

The Qmatrix/Base QP detection section 108 makes a determination as to whether all intervals between the bottom levels have been processed (step S224), and repeats the process of step S223 until everything has been professed. After everything has been processed, the Qmatrix/Base QP detection section 108 makes a determination as to whether all the positions (pos) of Qmatrix have been processed (step S225).

At step S225, the Qmatrix/Base QP detection section 108 repeats the processes of step S221 to S225 until everything has been processed. After everything has been processed, the Qmatrix/Base QP detection section 108 initializes the position (pos) of Qmatrix (step S226). The Qmatrix/Base QP detection section 108 makes a determination as to whether all the activity groups have been processed (step S227). If all the activity groups have not yet been processed, the Qmatrix/Base QP detection section 108 returns to step S221 to repeat the above processes. By contrast, if all the activity groups have been processed, the Qmatrix/Base QP detection section 108 makes a determination as to whether all the search quantization parameters QP(sch_qp) have been processed (step S228).

The Qmatrix/Base QP detection section 108, at step S228, returns to the above step S221 to repeat the above processes if all the search quantization parameters QP(sch_qp) have not yet been processed; by contrast, if all the search quantization parameters QP(sch_qp) have been processed, the Qmatrix/Base QP detection section 108 makes a determination as to whether every search Qmatrix(mid) has been processed (step S229). The Qmatrix/Base QP detection section 108, at step S229, returns to the above step S221 if all the search quantization parameters QP(sch_qp) have not yet been processed. By contrast, if all the search quantization parameters QP(sch_qp) have been processed, the Qmatrix/Base QP detection section 108 performs a determination process (step S230), and therefore comes to an end of the process.

Figure 25:
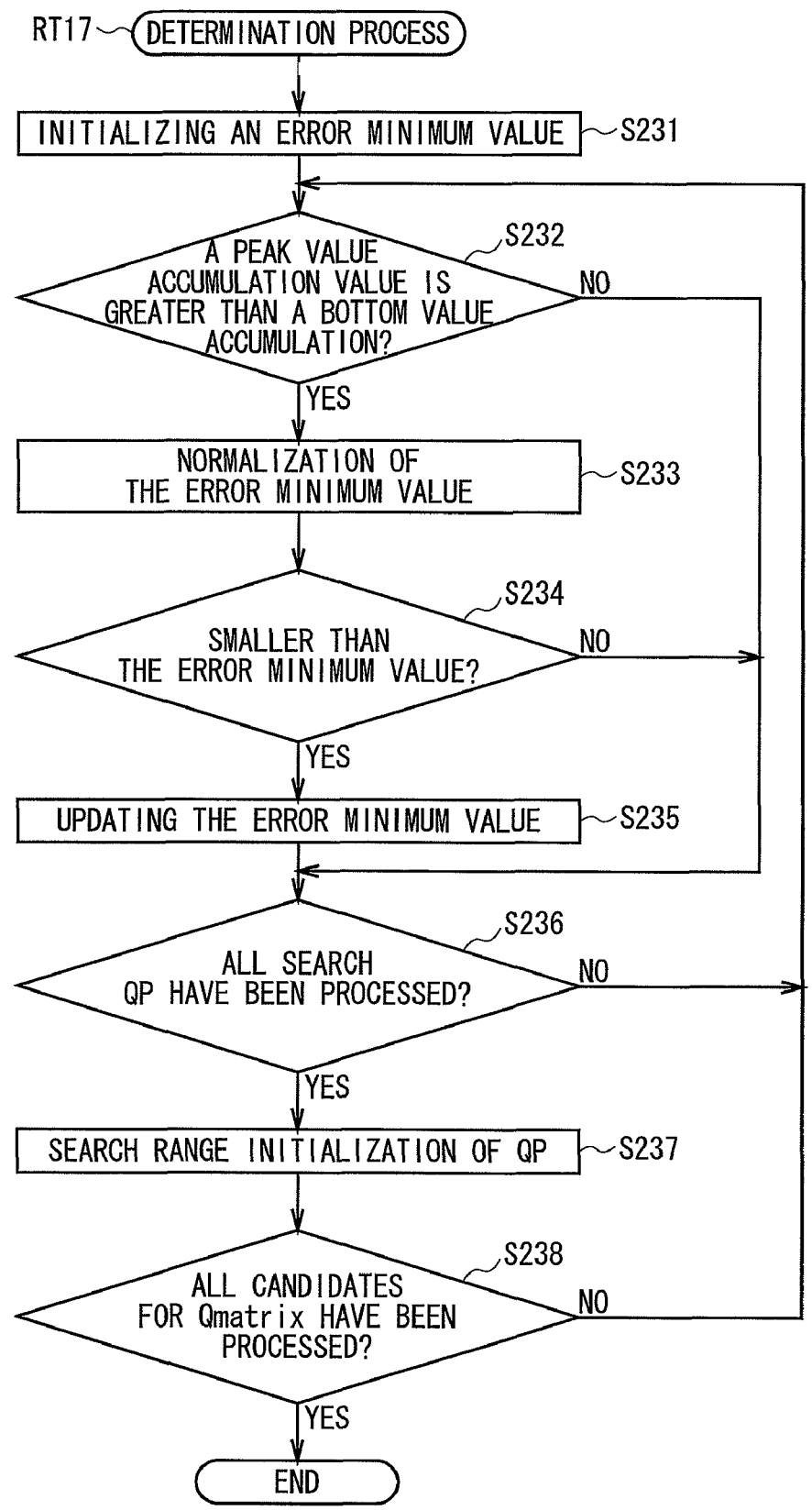
FIG. 25 is a flowchart illustrating a determination process.

The following further provides the detailed description of the determination process of step S230 of FIG. 24, with reference to a flowchart of FIG. 25, which illustrates a procedure RT17 of the determination process.

Here, the quantization matrix Qmatrix and the picture's quantization parameter QP at a time when the peak accumulation p[mid][qp], the bottom accumulation b[mid][qp], and the error rest[mid][qp] were used in the previous encoding process are calculated. Incidentally, step S231 and step S237 can be omitted.

First of all, the Qmatrix/Base QP detection section 108 initializes an error minimum value (min_rest_norm) using rest [0][0] and the like (step S231). Then, the Qmatrix/Base QP detection section 108 makes a determination at to whether the peak accumulation p[mid][qp] is greater than the bottom accumulation b[mid][qp] (step S232). In this case, if the peak accumulation p[mid][qp] is not greater than the bottom accumulation b[mid][qp], the Qmatrix/Base QP detection section 108 proceeds to step S236 because a peak t[0] is less likely to be the actual peak. By contrast, if the peak accumulation is greater than the bottom accumulation, the Qmatrix/Base QP detection section 108, following an equation described below, calculates a normalization error rest_norm which is obtained as a result of normalizing the error rest [mid][qp] with the difference between the peak accumulation p[mid][qp] and the bottom accumulation b[mid][qp] (step S233):

$$rest\_norm = rest[mid][qp]/(p[mid][qp] - b[mid][qp]) \qquad (26)$$

Therefore, after assuming that the bottom accumulation [mid][qp] that is not detected when the peak t[0] does not correspond to the actual peak is a penalty factor, the Qmatrix/Base QP detection section 108 can normalize the variation of the overall errors rest[mid][qp] with the height of the peak. Moreover, the Qmatrix/Base QP detection section 108 increases the normalization error rest_norm in the case where the input image data monotonically increase because of the input image data representing an original image, in order to ensure that the failure of detection as a error minimum value is prevented.

Subsequently, the Qmatrix/Base QP detection section 108 makes a determination as to whether the normalization error rest_norm calculated by step S233 is less than the error minimum value (step S234). If the normalization error rest_norm is less than the error minimum value, the Qmatrix/Base QP detection section 108 updates the error minimum value (step S235), and proceeds to step S236. That is, the process of step S235 is performed only when the discrete distribution state is detected, and the result is min_rest_norm=rest_norm.

Moreover, among all the quantization matrixes Qmatrix and all the search quantization parameters QP (sch_qp), the search quantization parameter QP (sch_qp) of the case where the normalization error rest_norm becomes the smallest, the quantization parameter QP of a picture for which the search Qmatrix(mid) was used in the previous encoding process, and the quantization matrix Qmatrix are represented. If this process has not been called upon even once, this means that the discrete state of quantization was not detected; therefore, it can be considered an original image that have not yet undergone any encoding process.

Subsequently, the Qmatrix/Base QP detection section 108 makes a determination as to whether all the search quantization parameters QP (sch_qp) have been processed (step S236). If all the search quantization parameters QP (sch_qp) have not yet been processed, the Qmatrix/Base QP detection section 108 returns to step S232 to repeat the above processes. By contrast, if all the search quantization parameters QP (sch_qp) have been processed, the Qmatrix/Base QP detection section 108 initializes a range of the search quantization parameter QP (sch_qp) (step S237), and makes a determination as to whether all candidates for the quantization matrix Qmatrix have been processed (step S238). If all the candidates have not yet been processed, the Qmatrix/Base QP detection section 108 returns to step S232 to repeat the above processes; if all the candidates have been processed, the Qmatrix/Base QP detection section 108 ends one example of the process.

Figure 26:
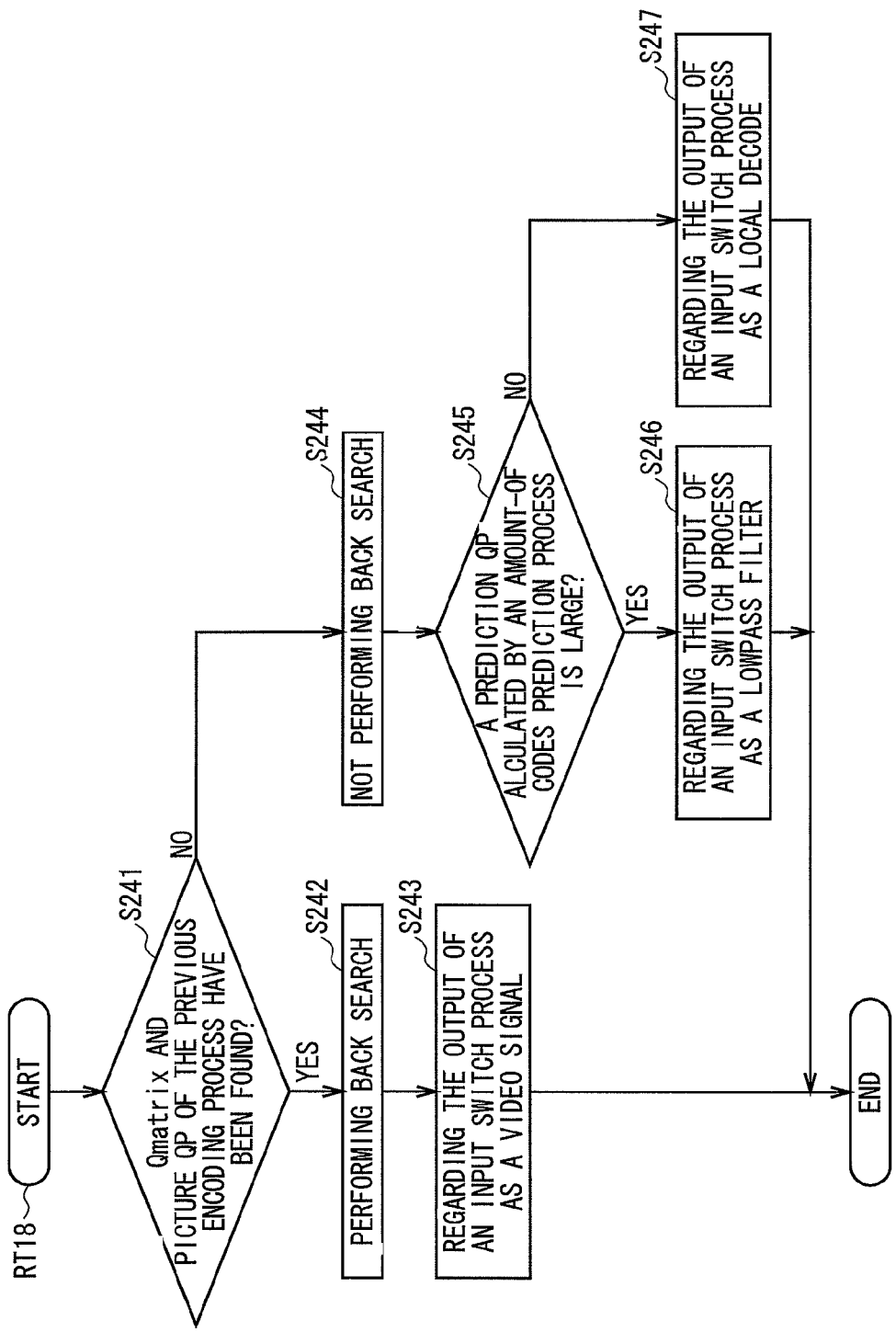
FIG. 26 is a flowchart providing the detailed description of an input image switching process.

The following provides the detailed description of an input image switching process, with reference to a flowchart of FIG. 26, which illustrates a procedure RT18 of the input image switching process. Since the encoding device 12 can detect, thanks to the process described above with reference to FIG. 25, whether an input signal is an original image or an image encoded in the previous process, the encoding device 12 switches the input signals based on this condition. That is, the encoding device 12 performs, for the original image where quantization distortion stands out, a low pass filtering process for the input image data; the encoding device 12 does not perform anything for the original image which does not stand out, and simply inputs the input image data. By contrast, if the input image data are an unoriginal image that have already undergone the encoding process, the encoding device 12 performs a back search process using the input image in order to improve efficiency.

That is, according to whether the estimated quantization matrix QmatrixE and estimated quantization parameter QPe estimated by the Qmatrix/Base QP detection section 108 are supplied, the amount-of-codes control section 109 makes a determination as to whether the quantization matrix Qmatrix of the previous encoding process and the picture's quantization parameter QP are found (step S241). If they are found, the amount-of-codes control section 109 switches on the back search section 210 (step S242), and uses the input image switch processing section 203 to output the input image data to the DCT section 205 (step S243). As a result, in the back search process, the input image is to be used as a prediction image.

By contrast if the quantization matrix Qmatrix of the previous encoding process and the picture's quantization parameter QP are not found at step S241, the amount-of-codes control section 109 switches off the back search section 210 (step S244), and makes a determination as to whether the prediction quantization parameter QPd calculated by the amount-of-codes prediction process is greater than a predetermined distortion threshold (step S245). If the prediction quantization parameter QP calculated by the amount-of-codes prediction process is greater than a predetermined distortion threshold, the amount-of-codes control section 109 uses the input image switch processing section 203 to output a signal supplied from the low pass filter processing section 201 to the DCT section 205; if it is not greater than that, the amount-of-codes control section 109 uses the input image switch processing section 203 to output a signal supplied from the delay buffer 202 (step S247), and ends this process.

As described above, according to the original image determination process of the present invention which uses the quantization coefficient, based on the discrete distribution state after DCT, whether or not it is a signal encoded in the previous process can be accurately found out. Accordingly, a determination can be made for switching a pre-filter process (low pass filtering process) that will be used only for the first time (original image). Therefore, subjective image quality can be improved while the quality of dubbing can be maintained. Moreover, if it is a signal encoded in the previous process, the input image is used as the prediction image; this improves the efficiency in detection of back search. The picture's average quantization parameter QP discovered from the distribution state and the quantization matrix Qmatrix are discovered, and the calculation of the back search section can be reduced.

(4-5) Procedure of a Three Path Encoding Process

The following describes a procedure RT11 of a three path encoding process according to the third embodiment, with reference to a flowchart of FIG. 17.

The encoding device 12, when the input image data are supplied, proceeds to step S101, calculates an activity group, and proceeds to the next step S102.

At step S102, after determining the intra-image prediction mode, the encoding device 12 proceeds to the next step S103. Incidentally, the process of step S101 may be carried out in parallel with the process of step S102.

At step S103, the encoding device 12 carries out intra-image prediction with the intra-image prediction mode determined at step S102, and performs the DCT process and the quantization process before proceeding to the next step S103.

At step S103, the encoding device 12 proceeds to the procedure RT14 of the amount-of-codes prediction process, predicts the amount of generated codes according to all the quantization parameters QP, and proceeds to the next step S201.

At step S201, the encoding device 12 proceeds to the procedure RT16 of the original image determination process that uses the quantization coefficient, makes a determination as to the original image by using the quantization coefficient that the amount-of-codes prediction process used without changing it, and proceeds to the next step S202. At this time, if the input image data are the unoriginal image, the encoding device 12 detects the estimated quantization matrix QmatrixE and the estimated quantization parameter QPe.

At step S202, the encoding device 12 makes a determination as to whether the input image data are the unoriginal image. If the affirmative result is obtained, the encoding device 12 proceeds to the next step SP105.

At step S105, the encoding device 12 uses the flat quantization matrix Qmatrix to select the quantization parameter QP that is the closest to the target amount of codes, and proceeds to the next step S106. At step S106, the encoding device 12 determines the prediction quantization matrix Qmatrix based on the quantization parameter QP, and proceeds to the next step S107.

At step S107, the encoding device 12 determines, as the prediction quantization parameter QPd, the quantization parameter QP whose amount of generated codes becomes the closest to the target amount of codes when the prediction quantization matrix Qmatrix D is used, and proceeds to the next step S108.

At step S108, the encoding device 12 performs the second pre-encoding process using the prediction quantization parameter QPd and the prediction quantization matrix QmatrixD, and proceeds to the next step S109.

At step S109, the encoding device 12 corrects the prediction quantization parameter QPd according to the amount of generated codes at step S109 to calculate the basic quantization parameter $Q_{MB}$, and proceeds to the next step S110.

At step S110, the encoding device 12 performs an actual encoding process using the prediction quantization matrix QmatrixD and the basic quantization parameter $Q_{MB}$, and proceeds to an end step to end the process.

By contrast, if the negative result is obtained at step S202, this means that the input image data are the unoriginal image that have already undergone the encoding process, so the encoding device 12 proceeds to the next step S204.

At step S204, the encoding device 12 uses the estimated quantization matrix QmatrixE estimated at step S201 to perform the back search process according to a search range that is based on the estimated quantization parameter QPe, and then proceeds to the next step S110. At this time, the encoding device 12 detects the detected quantization parameter QPb.

At step S110, the encoding device 12 uses the estimated quantization matrix QmatrixE and the detected quantization parameter QPb to perform the actual encoding process, and then proceeds to an end step to end the process.

(4-6) Operation and Effect

With the above configuration, the encoding device 12 performs an orthogonal transformation process for the difference image data, which serve as image data, to generate a DCT coefficient. The encoding device 12 counts the number of occurrences of each value (the quantization coefficient absolute value level) of the coefficient elements constituting the quantization coefficient that is based on the DCT coefficient, and, based on the dispersion state of the quantization coefficient absolute value level, estimates the quantization parameter for each picture.

Therefore, based on the dispersion state regarding the number of occurrences of the quantization coefficient absolute value level, the encoding device 12 can determine whether the input image data are the original or unoriginal image. That is, without changing, unlike the back search process, the quantization parameter and performing the process plural times, the encoding device 12 just perform a simple process using the number of occurrences of the calculated quantization coefficient absolute value level in order to make a determination as to whether the data are the original or unoriginal image.

Moreover, the encoding device 12 can determine whether the data are the original or unoriginal image before the back search process. Therefore, if the data are the original image, the encoding device 12 does not have to perform the complicated back search process. This allows the encoding device 12 to increase the speed of the encoding process in the case where the data are the original image, compared with a method of making a determination as to whether the data are the original or unoriginal image after the back search process.

Moreover, the encoding device 12 uses the quantization coefficient obtained as a result of dividing the DCT coefficient by the smallest quantization parameter QP, which serves as a scaling value. Therefore, the encoding device 12 can perform scaling for the DCT coefficient, thereby reducing the number of counters used for counting the quantization coefficients.

Furthermore, the encoding device 12 counts the number of occurrences of an absolute value of an element of the quantization coefficient in order to further reduce the number of counters.

Furthermore, the encoding device 12 detects the quantization parameter QP based on the first peak where the quantization coefficient absolute value level has the smallest value (except zero, however). Therefore, the encoding device 12 can reduce processing load because what it needs to process is only the first peak.

Moreover, the encoding device 12 performs entropy calculation based on the number of occurrences of the quantization coefficient in order to predict the amount of generated codes regarding each quantization parameter; the encoding device 12 also predicts, as the prediction quantization parameter QPd, the quantization parameter QP based on which the predicted amount of generated codes becomes the closest to the target amount of codes. The encoding device 12 uses the prediction quantization parameter QPd to quantize the DCT coefficient, and, based on the amount of generated codes of a encoding stream it has obtained as the result of the quantization, corrects the prediction quantization parameter QPd.

Accordingly, the encoding device 12 can use the number of occurrences of the quantization parameter which was counted for the prediction of the amount of generated codes, for the determination as to whether the data are the original and unoriginal image, without changing it.

Furthermore, the encoding device 12 classifies the input image data being made of macro blocks into activity groups according to the activity representing the complexity of the input image data. Then, the encoding device 12 corrects the number of Occurrences of the quantization coefficient absolute value level counted on per activity group basis using the activity and adds up it in order to generate it as the number of occurrences of each value of the quantization coefficient absolute value level.

Accordingly, the encoding device 12 uses the counter value which was counted on per activity group basis for calculation of the amount of generated codes without changing it in order to calculate the number of occurrences of each value of the quantization coefficient absolute value level; the encoding device 12 therefore does not have to count the counter value again.

Moreover, the encoding device 12 corrects the number of occurrences of the quantization coefficient absolute value level counted for each position of the matrix of the quantization coefficient absolute value level by using a value of the same position regarding a search quantization coefficient that was estimated to be used, before adding up it. Therefore, the encoding device 12 generates it as the number of occurrences of each value of the quantization coefficient absolute value level.

Therefore, the encoding device 12 uses the counter value which was counted for each position of the matrix for prediction of the quantization matrix Qmatrix without changing it in order to calculate the number of occurrences of each value of the quantization coefficient absolute value level; the encoding device 12 therefore does not have to count the counter value again.

Furthermore, the encoding device 12 sets the peak level (t[0]), which is a reference element value, for the quantization coefficient absolute value level, and calculates, as the error [mid][qp] corresponding to the peak level (t[0]), an accumulation value that is the result of accumulating values obtained as a result of multiplying a separation value (t[0]−lev) separated from the peak level (t[0]) by the number of occurrences of the quantization coefficient absolute value level.

At this time, among the accumulation values of the different peak levels (t[0]), the encoding device 12 determines the estimated quantization parameter QPe that is near the quantization parameter QP used in the previous encoding process, based on the peak level (t[0]) corresponding to the error rest[mid][qp] whose value is the smallest.

Accordingly, the encoding device 12 can detect, as the first peak, the error minimum value (min_rest_norm) where the error rest[mid][qp] is the smallest; the encoding device 12 can detect the estimated quantization parameter QPe, which is the average of a picture, from the quantization coefficient absolute value level of the first peak.

Moreover, the encoding device 12 sets the peak level (t[0]) that is based on the search quantization parameter QP (sch_qp) which is a detection target for the quantization coefficient absolute value level; if it is determined that the peak level (t[0]) is a maximum value after comparing the peak level (t[0]) and the bottom level (t[1]), the encoding device 12 determines the search quantization parameter QP (sch_qp) as the estimated quantization parameter QPe.

This ensures that the encoding device 12 can detect only the peak, thereby determining the estimated quantization parameter QPe appropriately.

Furthermore, the device sets the peak level (t[0]) that is based on the search Qmatrix which is the estimated quantization parameter QPe and the detection-target quantization matrix; if it is determined that the peak level (t[0]) is a maximum value, the device determines the search Qmatrix as the estimated quantization matrix search QmatrixE.

Therefore, the encoding device 12 can detect the estimated quantization matrix search QmatrixE, in addition to the quantization parameter QP, from the quantization coefficient.

According to the above configuration, making use of the fact that the number of occurrences of the DCT coefficient in the case where the image data have undergone the encoding process becomes discrete, the encoding device 12 estimates, as the estimated quantization parameter QPe, the quantization parameter QP that was previously encoded, based on the number of occurrences of an element value of the DCT coefficient.

Therefore, since the encoding device 12 can set the search range based on the estimated quantization parameter QPe during the back search process, the encoding device 12 can reduce the number of quantization parameters QP to be processed in the back search process, thereby reducing processing load of the back search process.

Moreover, according to whether the estimated quantization parameter QPe has been detected or not, the encoding device 12 makes a determination as to whether the input image data are the original or unoriginal image. Therefore, the encoding device 12 can make a determination as to whether the data are the original or unoriginal image before the back search process. Therefore, when the data are the original image, the encoding device 12 does not have to perform the back search process whose processing load is large, and can use the appropriate basic quantization parameter $Q_{MB}$ calculated by prediction of the amount of generated codes for the original image.

(4-7) Other Embodiment

In the above-noted third embodiment, the encoding device 12 performs the original image determination process that uses the amount-of-codes prediction process and quantization coefficient that use entropy calculation. However, the present invention is not limited to this. For example, the encoding device 12 may perform only the amount-of-codes prediction process using entropy calculation.

Figure 27:
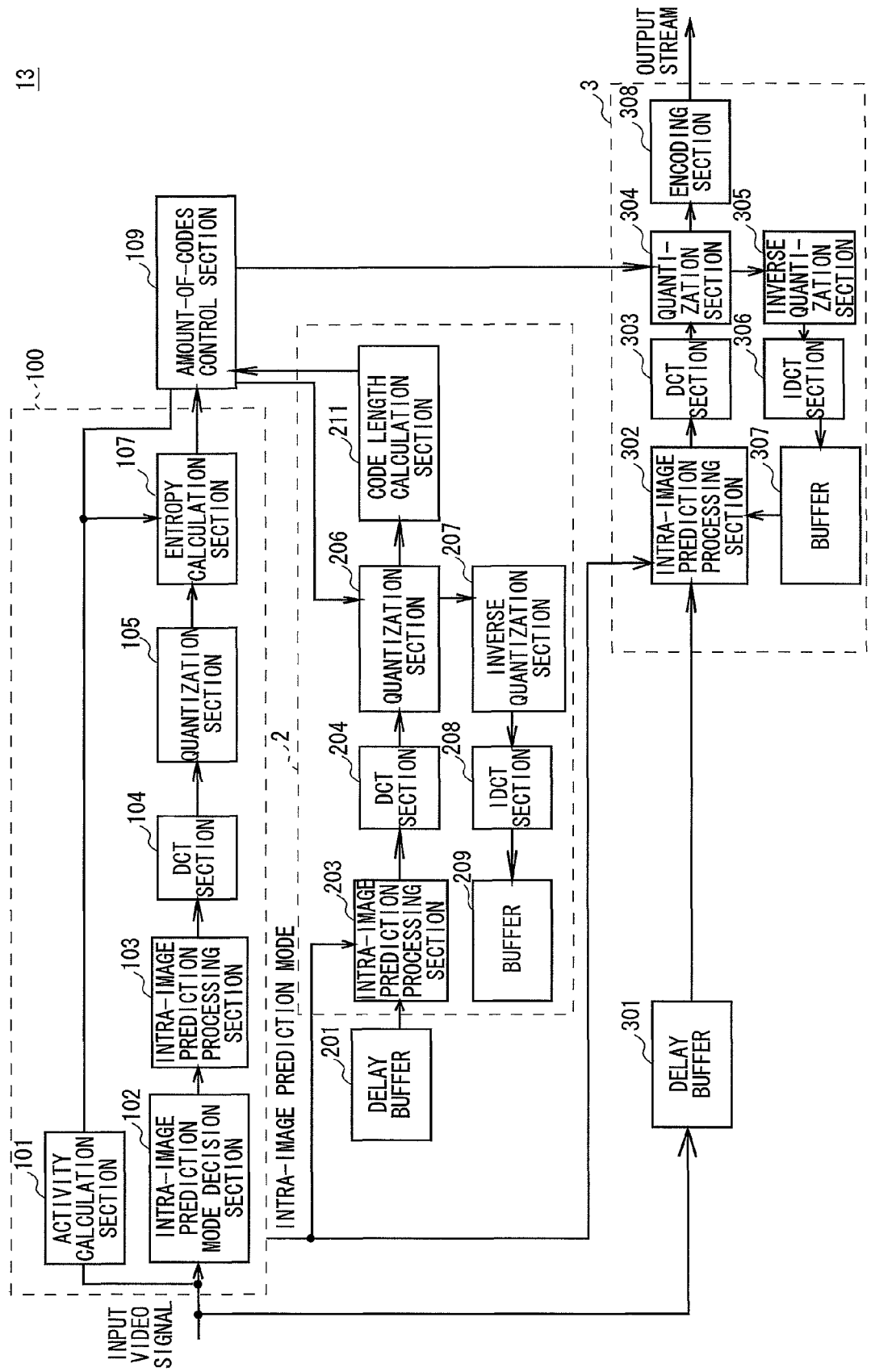
FIG. 27 is a diagram illustrating the configuration of an encoding device according to another embodiment of the present invention.

In this case, as shown in FIG. 27, the encoding device 13 includes a first pre-encoder 100 that performs the first pre-encoding process, a second pre-encoder 200 that performs the second pre-encoding process, a parameter encoder 300 that performs the actual encoding process, an amount-of-codes control section 109, delay buffers 201 and 301. The first pre-encoder 100 includes an intra-image prediction mode decision section 102, an intra-image prediction processing section 103, a DCT section 104, quantization section 105, an entropy calculation section 107, and an activity calculation section 101. The second pre-encoder 200 includes an intra-image prediction processing section 203, a DCT section 204, a quantization section 206, a code length calculation section 211, a buffer 209, an IDCT (Inverse DCT) section 208, and an inverse quantization section 207. The parameter encoder 300 includes an intra-image prediction processing section 302, a DCT section 303, a quantization section 304, an entropy encoding section 308, a buffer 307, an IDCT section 306, and an inverse quantization section 305.

With such configuration, the input image data are first input into the intra-image prediction mode decision section 102 of the first pre-encoder 100. The intra-image prediction mode decision section 102 determines the intra-image prediction mode based on the input image data. The determined intra-image prediction mode is also transmitted to the second pre-encoder 200 and the parameter encoder 300, and is used for the second pre-encoding process of the second pre-encoder 200 and the actual encoding process of the parameter encoder 300.

Then, the intra-image prediction processing section 103 calculates a difference image between the prediction image data and the input image data. In this case, the prediction image data are generated from the input image data to simplify the process. The DCT section 104 performs integer DCT, and the DCT coefficient is transmitted to the quantization section 105. The quantization section 105 performs quantization for the DCT coefficient, and transmits its output to the entropy calculation section 107. The entropy calculation section 107 predicts the amount of generated codes by calculating the entropy. As a result of the amount-of-codes prediction, the prediction quantization parameter QPd and the prediction quantization matrix QmatrixD are obtained for a picture used at the next step, and are input into the amount-of-codes control section 109. The following is a supplementary description: the quantization parameter QP is a value that is used for specifying a quantization step on AVC and that becomes larger than the quantization step as the quantization parameter QP becomes larger.

At the same time as the intra-image prediction mode is determined, the activity calculation section 101 of the first pre-encoder 100 calculates the activity, and classifies the macro blocks MB into groups according to the activity. The activity group (Activity Group) number determined for each macro block MB is input into the entropy calculation section 107 and the amount-of-codes control section 109.

From the prediction quantization parameter QPd that is the average of a picture calculated by the first pre-encoding process of the first pre-encoder 100, the prediction quantization matrix Qmatrix, and Activity Group of each macro block, the amount-of-codes control section 109 transmits information about quantization (the quantization matrix Qmatrix, and the quantization parameter QP of each MB) to the second pre-encoder 200, and performs the second pre-encoding process.

That is, after a delay process through the delay buffer 201, the input image data are input; the intra-image prediction processing section 203 calculates the difference between the prediction image data and the input image data; after DCT by the DCT section 204 and quantization by the quantization section 206, the code length calculation 211 performs an inverse quantization process to reproduce coefficient data; the IDCT section 208 performs an IDC conversion process for the coefficient data; image data regarding the input image are reproduced and stored in the buffer 209.

After the completion of the second pre-encoding process of the second pre-encoder 200, the amount of generated codes is obtained. From the amount of codes it has obtained, the amount-of-codes control section 109 corrects the picture's prediction quantization parameter QPd to calculate the basic quantization parameter $Q_{MB}$.

The parameter encoder 300 carries out the actual encoding process by using the picture's prediction quantization parameter QPd determined by the second pre-encoding process of the second pre-encoder 200, the prediction quantization matrix QmatrixD determined by the first pre-encoding process, and the activity group Activity Group.

That is, after receiving the input image data that underwent the delay process of the delay buffer 301, the intra-image prediction processing section 302 calculates the difference image between the prediction image and the input image with the prediction mode determined during the first pre-encoding process; after the DCT section 303 by the DCT section 303 and quantization by the quantization section 304, the entropy encoding process is carried out by the entropy encoding section 308; an output stream is eventually output. Incidentally, the output of the quantization section 304 is inversely quantized by the inverse quantization section 305; coefficient data are reproduced; the IDCT section 306 performs an IDCT conversion process for the coefficient data; image data regarding the input image are reproduced and stored in the buffer 307.

Figure 28:
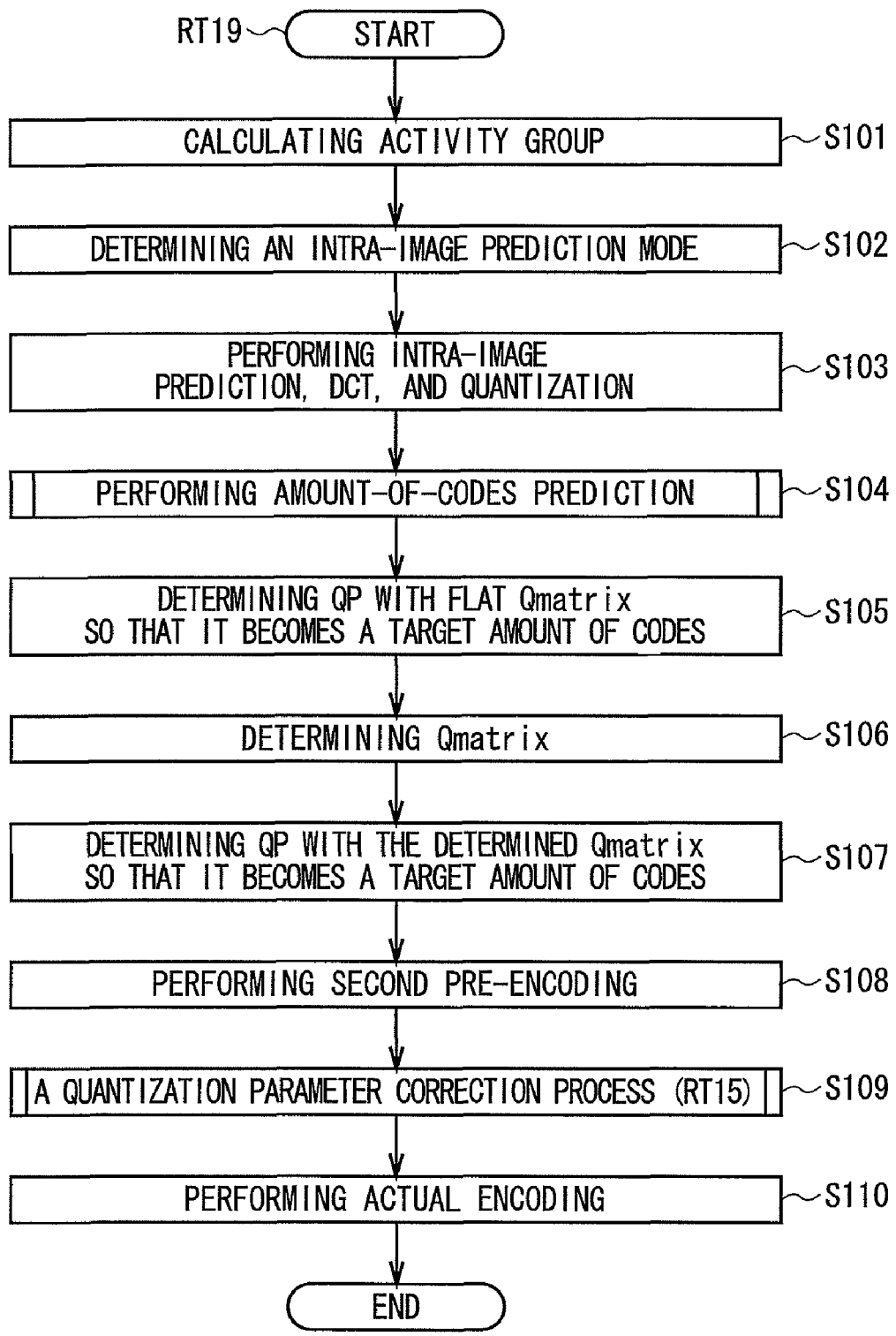
FIG. 28 is a flowchart providing the detailed description of a series of processes concerning an encoding process of an encoding device according to another embodiment of the present invention.

FIG. 28 shows a procedure RT19 of the three path encoding process by the encoding device 13. Since the process of each step is substantially the same as that of FIG. 17, the description is omitted.

Furthermore, in the above-noted third embodiment, the amount-of-codes prediction process is performed such that it corresponds to the activity. However, the present invention is not limited to this. It is not necessarily the case that the amount-of-codes prediction process corresponds to the activity. The same holds for the quantization matrix Qmatrix. Moreover, the activity is not necessarily used as an indicator for adaptive quantization; another indicator may be used for adaptive quantization.

Moreover, in the above-noted third embodiment, during the back search process, the estimated quantization matrix Qmatrix is used to detect only the quantization parameter QP. However, the present invention is not limited to this. The quantization matrix Qmatrix may be detected by the back search process. In this case, for example, a limitation may be put on the number of quantization matrixes Qmatrix it searches for, thereby reducing the amount of calculation.

Furthermore, in the above-noted third embodiment, the estimated quantization parameter QPe and the estimated quantization matrix QmatrixE are estimated for each picture. However, the present invention is not limited to this. There is no limitation on a unit to be detected. According to the present invention, for example, if the quantization matrix Qmatrix is set for each slice, the process may be carried out on per slice basis. Moreover, according to the present invention, the same holds for prediction of the prediction quantization parameter QPd, the prediction quantization matrix QmatrixD, and the basic quantization parameter $Q_{MB}$: there is no limitation on a unit to be detected.

Furthermore, in the above-noted third embodiment, the amount of generated codes is predicted for each picture. However, the present invention is not limited to this. As for a unit for prediction of the amount of generated codes, there is no limitation: for example, it can be predicted on a slice unit basis or a GOP unit basis.

Furthermore, in the above-noted third embodiment, the encoding device 13 performs both the amount-of-codes prediction process and the original image determination process that uses the quantization coefficient. However, the present invention is not limited to this. The encoding device 13 may perform only the original image determination process that uses the quantization coefficient. In this case, the encoding device 13 sequentially performs the processes of from step S201 to S204 of the procedure RT11 (FIG. 17) of the three path encoding process. At this time, the encoding device avoids the execution of adaptive quantization, and simply counts the number of occurrences of the quantization coefficient according to only the position of the quantization coefficient. Moreover, if the quantization matrix Qmatrix is flat, the encoding device may simply count the quantization coefficient.

Furthermore, in the above-noted third embodiment, the DCT coefficient is divided by the smallest quantization parameter QP expected to be used. However, the present invention is not limited to this. The number of occurrences of a value of the coefficient element of the DCT coefficient may be simply counted. Moreover, if the quantization parameter QP that the amount-of-codes prediction process uses is not zero, the quantization coefficient may be corrected so as to become a value obtained when being divided by zero.

Furthermore, in the above-noted third embodiment, following the procedure RT17 of the determination process, the device detects the first peak from the counter value of the quantization coefficient absolute value level. However, the present invention is not limited to this. The device may use other methods to detect the first peak. Moreover, the device does not necessarily detect the first peak: the device may detect the second or subsequent peak, or a plurality of peaks; the device may calculate the dispersion state from the overall waveform.

Furthermore, in the above-noted third embodiment, the device corrects the number of occurrences that was counted for each activity group and each position of the quantization coefficient and adds up it. However, the present invention is not limited to this. For example, if the number of samples it can secure is enough, the device may detect the quantization parameter QP for each activity group and each position of the quantization coefficient.

Furthermore, in the above-noted third embodiment, as the original image determination process, the device performs both the process of making a determination as to whether the data are the original or unoriginal image and the process of estimating the estimated quantization matrix Qmatrix. However, the present invention is not limited to this. The device may perform only one of them.

Furthermore, in the above-noted third embodiment, the device performs the original image determination process that uses the quantization coefficient according to AVC. However, the present invention is not limited to this, and may be applied to a encoding method, like MPEG 2, in which quantization is carried out with plurality of quantization steps based on a quantization indicator like a plurality of predetermined quantization parameters QP.

Furthermore, in the third-noted embodiment, the encoding device 10, which serves as an image processing device, includes: the DCT section 104, which as an orthogonal transformation section; and the back search section 210, which serves as a division factor calculation section, a sum calculation section and a quantization factor detection section. The present invention is not limited to this. The image processing device of the present invention may consist of the orthogonal transformation section, the division factor calculation section, the sum calculation section and the quantization factor detection section, which are configured in other manners.

Furthermore, in the above-noted third embodiment, the encoding device 12, which serves as an image processing section, includes: the DCT section 104, which serves as an orthogonal transformation section; the level measurement section 106, which serves as an element counter section; and the Qmatrix/Base QP detection section 108, which serves as an original image determination section. The present invention is not limited to this. The image processing device of the present invention may consist of the orthogonal transformation section, the element counter section and the original image determination section, which are configured in other manners.

(5) Fourth Embodiment

The following describes the fourth embodiment of the present invention. According to the fourth embodiment, in order to tame the rounding of calculation, a predetermined selection rule is provided for each value (referred to as an element, hereinafter) of the quantization matrix Qmatrix according to the quantization parameter QP; the fourth embodiment is therefore different from the above-described second embodiment.

(5-1) Selection Rule

For MPEG and AVC, a compensation circuit is often introduced in order to improve the quality of dubbing. While an effort is made to prevent the distortion caused by the repetition of quantization from appearing by improving the reproducibility of a parameter (such as the quantization parameter QP and the quantization matrix Qmatrix) used by a dubbing compensation circuit for encoding, this is sometimes not enough to cause SNR to converge when dubbing is repeated. Moreover, while the compensation circuit prevents the overall decline of SNR, the image sometimes appears strange visually after a macro block pops up after this macro block has accumulated calculation error.

On the other hand, for dubbing (a process of repeating encoding and decoding), AVC Intra sometimes employs a method in which a parameter used for encoding is reused to prevent the decline of SNR. However, even if the exactly same encoding parameter as that of the previous encoding process is actually used, the rounding of calculation may lead to the decline of SNR.

Therefore, according to an encoding device and method of the fourth embodiment, a calculation section that uses the quantization matrix Qmatrix which is one of the sections where the rounding of calculation could occur during the encoding process proposes a value that eliminates the effect of calculation rounding or prevents the effect from occurring.

Specifically, to improve the quality of dubbing, the following means is applied:

a multiple of 16 is used as an element of the quantization matrix Qmatrix when the quantization parameter QP is greater than 6, a multiple of 8 is used as an element of the quantization matrix Qmatrix when the quantization parameter QP is greater than 12, a multiple of 4 is used as an element of the quantization matrix Qmatrix 16 is used for a direct-current (DC) component of the quantization matrix Qmatrix The following provides the detailed description of the fourth embodiment.

According to AVC Intra, a quantization level Z is calculated with the use of the DCT coefficient W and the quantization parameter QP during the encoding process:

$$Z=\{(MF*16/Q\text{matrix})*W+f\}>>(15+QP/6) \qquad (27)$$

wherein MF is a scaling factor calculated from a value defined by the standard of AVC; f is a rounding factor that determines a position of rounding-down.

Moreover, during the decoding process, the result of the decoding process is obtained as a result of multiplying the quantization level Z by the quantization matrix Qmatrix and the quantization parameter QP and shifting the DCT coefficient W by six bits to the left (inverse quantization):

$$(W>>6)=(Z*V*Q\text{matrix}*2^{floor(QP/6)})>>4 \qquad (28)$$

wherein V is a decoding rescaling factor defined by the standard of AVC.

Those equations of quantization and inverse quantization includes the calculation of dividing either 16 by the quantization matrix Qmatrix or the quantization matrix Qmatrix by 16. Therefore, this leads to the rounding of division even when the encoding parameter is completely reused for dubbing. In order to eliminate the rounding of division in the calculation, each element of the quantization matrix Qmatrix of the equation needs to be 16; if all the elements are 16, the quality of dubbing improves. However, in such a case, introducing the quantization matrix makes little sense and is not realistic because the original purpose is to change the strength of quantization according to frequency.

Accordingly, with the advantage that the quantization matrix Qmatrix changes the strength of quantization according to frequency, the following selection rule is employed to make the best use of the above characteristic.

(1) A multiple of 16 is used as an element of the quantization matrix Qmatrix

When a value obtained as a result of multiplying 16 by n is applied as an element of the quantization Qmatrix, the rounding of division does not occur if MF is a multiple of n. Accordingly, the probability of the division rounding occurring decreases. Moreover, during the inverse quantization process, since a multiple of 16 is divided by 16, the division rounding does not occur.

(2) When the quantization parameter QP is greater than 6, a multiple of 8 is used as an element of the quantization matrix Qmatrix As mentioned above, eliminating the division rounding requires the element of the quantization matrix Qmatrix to be 16. However, if the element of the quantization matrix Qmatrix is 8, the division rounding also does not occur during the quantization process. Even in the inverse quantization process, when QP is greater than 6, $2^{floor(QP6)}$ is a multiple of 2. Therefore, an accumulation to be divided by 16 is a multiple of 16. So the division rounding does not occur.

(3) When the quantization parameter QP is greater than 12, a multiple of 4 is used as an element of the quantization matrix Qmatrix.

This is in line with the method of (2). When QP is greater than 12, $2^{floor(QP6)}$ is a multiple of 4. Therefore, an accumulation to be divided by 16 is a multiple of 16. So the division rounding does not occur.

(4) 16 is used for a direct-current (DC) component of the quantization matrix Qmatrix Given the visual performance of each element of a frequency space of the input image, if the diffusion (the repetition of increase or decrease) occurs thanks to the division rounding of DC during dubbing, only a macro block may pop up. Therefore, it is considered important to use 16 for DC, except for the above-mentioned (2) and (3).

Moreover, according to AVC Intra, the intra-image prediction refers to a value of an adjacent macro block: if distortion occurs on one macro block, this affects the adjacent macro blocks, especially affecting DC significantly. Considering this point, it is desirable to use 16.

Figure 29:
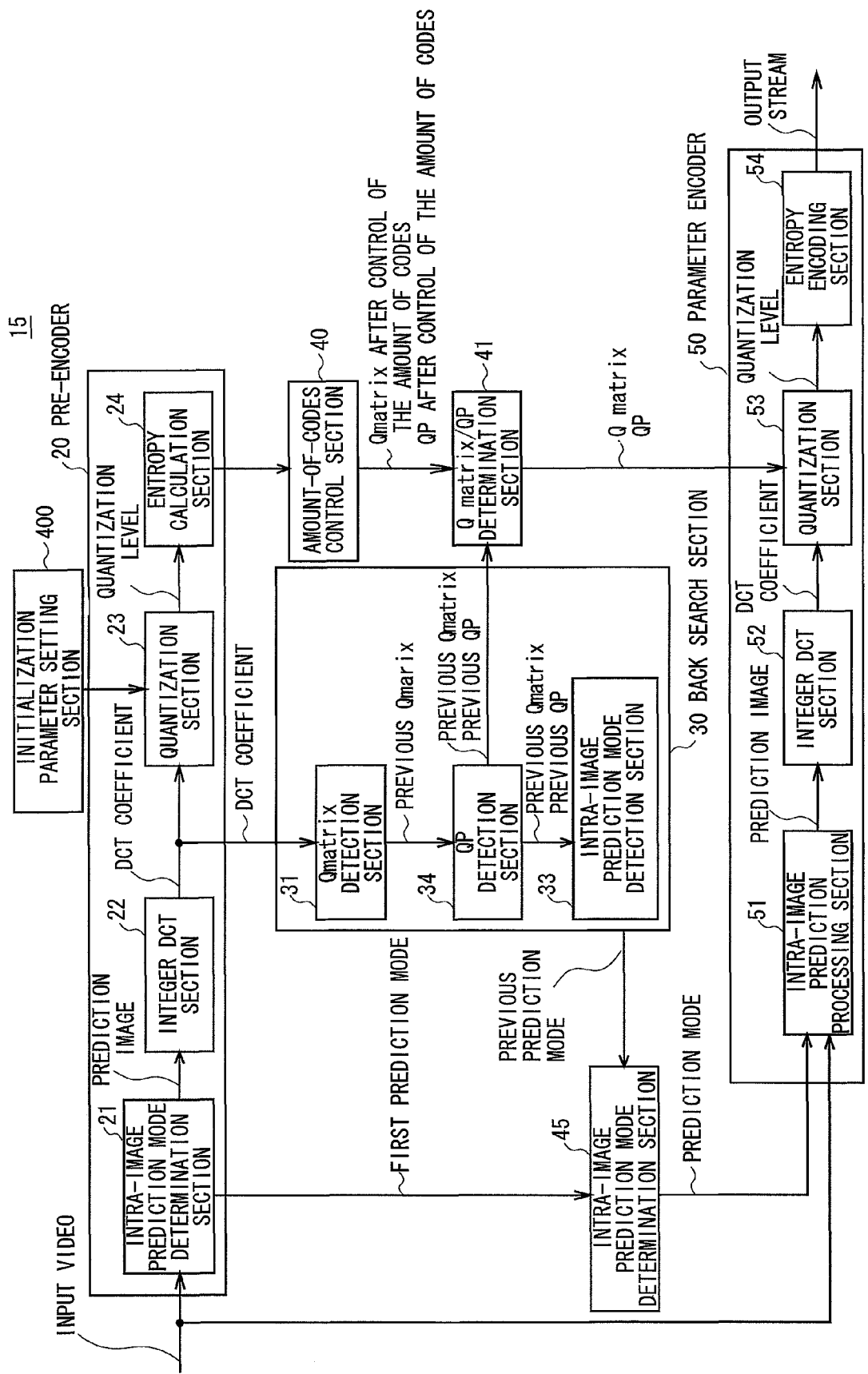
FIG. 29 is a diagram illustrating the configuration of an encoding device according to a fifth embodiment of the present invention.

Specifically, as shown in FIG. 29, an encoding device 15 includes an initialization parameter setting section 40 that stores the quantization parameter Qmatrix in line with the selection rule. Then, a quantization section 23, according to the quantization parameter QP used for quantization, selects the quantization matrix Qmatrix by following a selection rule described below.

Moreover, based on the encoding process of a pre-encoder 20 and according to the quantization parameter QP, a Qmatrix/AP decision section 41 selects the quantization matrix Qmatrix by following the selection rule.

As described above, according to the fourth embodiment of the present invention, the device reduces the upward rounding caused by the division rounding, and the accumulation caused by rounding-down, thereby avoiding the decline of SNR and preventing MB from popping up. Thus, the visual performance improves.

(5-2) Operation and Effect

With the above configuration, the encoding device 15 sets the quantization matrix Qmatrix according to the value of the quantization parameter QP in order to prevent the division rounding in an effective manner. This prevents the decline of the quality of image, which may be caused by encoding.

(6) Fifth Embodiment

The following describes the fifth embodiment. According to the fourth embodiment, the DCT process of 8×8 pixels (referred to as 8×8 DCT, hereinafter) is carried out with the rounding of calculation being reduced; the fifth embodiment is therefore different from the above-described fourth embodiment. The configuration of an encoding device 16 of the fifth embodiment is substantially the same as that of the encoding device 15 of the fourth embodiment: the description is therefore omitted.

(6-1) Calculation Rounding Reduction Process for 8×8 DCT

According to AVC, an 8×8-pixel sub block can be used as one of the block sizes of the integer DCT. But the 8×8 DCT makes the integer calculation a bit more complex than the DCT process for 4×4 pixels (referred to as 4×4 DCT, hereinafter).

For example, reference software (JW) proposed by Joint Video Team (JVT) employs, as the 8×8 DCT in which integer calculation is carried out, a calculation method in which a decimal fraction is dropped during the calculation of 8×8 DCT. Its calculation is not as accurate as that of 4×4 DCT.

Especially, according to JM, dubbing (the repetition of encoding and decoding) contributes to the accumulation of calculation error, leading to the deterioration of the quality of image. For example, if the SNR of 8×8 DCT is compared with that of 4×4 DCT during dubbing in a range where SNR exceeds 40 dB, the decline of SNR of 8×8 DCT stands out more than that of 4×4 DCT.

Here, assume that X is the input of 8×8 DCT (a real-space sample, i.e. difference image data supplied on a 8×8-pixel basis), and X is the output (a frequency-space DCT coefficient sample). Then, with the use of a transformation matrix A of the equation (29), the output X is expressed in the following equation (30):

$$A = \begin{pmatrix} 1 & 1 & 1 & 1 & 1 & 1 & 1 & 1 \\ \frac{3}{2} & \frac{5}{4} & \frac{3}{4} & \frac{3}{8} & -\frac{3}{8} & -\frac{3}{4} & -\frac{5}{4} & -\frac{3}{2} \\ 1 & \frac{1}{2} & -\frac{1}{2} & -1 & -1 & -\frac{1}{2} & \frac{1}{2} & 1 \\ \frac{5}{4} & -\frac{3}{8} & -\frac{3}{2} & -\frac{3}{4} & \frac{3}{4} & \frac{3}{2} & \frac{3}{8} & -\frac{5}{4} \\ 1 & -1 & -1 & 1 & 1 & -1 & -1 & 1 \\ \frac{3}{4} & -\frac{3}{2} & \frac{3}{8} & \frac{5}{4} & -\frac{5}{4} & -\frac{3}{8} & \frac{3}{2} & -\frac{3}{4} \\ \frac{1}{2} & -1 & 1 & -\frac{1}{2} & -\frac{1}{2} & 1 & -1 & \frac{1}{2} \\ \frac{3}{8} & -\frac{3}{4} & \frac{5}{4} & -\frac{3}{2} & \frac{3}{2} & -\frac{5}{4} & \frac{3}{4} & -\frac{3}{8} \end{pmatrix} \quad (29)$$

$$X = A \times A^T \quad (30)$$

That is, the transformation matrix A of 8×8 DCT is different from that of 4×4 DCT (the equation (3)): this includes a fractional number whose denominator is 2, 4 or 8.

For ease of explanation, the focus is put on only the conversion of the horizontal direction of the above equation (30). The conversion is expressed as follows (a suffix H represents the horizontal component):

$$XH = A \times H \quad (31)$$

An input component $X_H$ can be represented as an input component $X_H[i]$: a coordinate of a sample in a real space (i.e. the position of the 8×8-pixel sample) is an index i. An output component $X_H$ can be represented as an output component $X_H[j]$: a coordinate of a sample in a frequency space is j.

Here, the output component $X_H[0]$ is a coefficient of a direct-current (DC) component in the horizontal direction after 8×8 DCT; the output component $X_H[7]$ is a coefficient of the highest frequency component in the horizontal direction after 8×8 DCT. For example, the second component $X_H[1]$ from the low-frequency side of the horizontal direction of 8×8 DCT that AVC employs is expressed as follows:

$$X_H[1] = \left(\frac{3}{2}\right)*x_H[0] + \left(\frac{5}{4}\right)*x_H[1] + \left(\frac{3}{4}\right)*x_H[2] + \left(\frac{3}{8}\right)*x_H[3] - \left(\frac{3}{8}\right)*x_H[4] - \left(\frac{3}{4}\right)*x_H[5] - \left(\frac{5}{4}\right)*x_H[6] - \left(\frac{3}{2}\right)*x_H[7] \quad (32)$$

The AVC standard employs the integer DCT. The orthogonal transformation is realized by the integer calculation of multiplication and right shifting (division by a power of two); the decimal fraction is therefore dropped during the calculation. As shown in the equation (29), in the 8×8 DCT, each element of the transformation matrix A is not an integer, and each calculation produces a decimal fraction.

Therefore, if the encoding device shifts the coefficient to the right during the calculation of DCT, the decimal fraction will be dropped during calculation, thereby reducing the accuracy of calculation.

According to the present invention, to solve the above problem, the right-shifting calculation, which causes the rounding of calculation, is carried out altogether after an integer DCT section 22 that performs 8×8 DCT, thereby reducing the rounding during calculation as much as possible.

Figure 30:
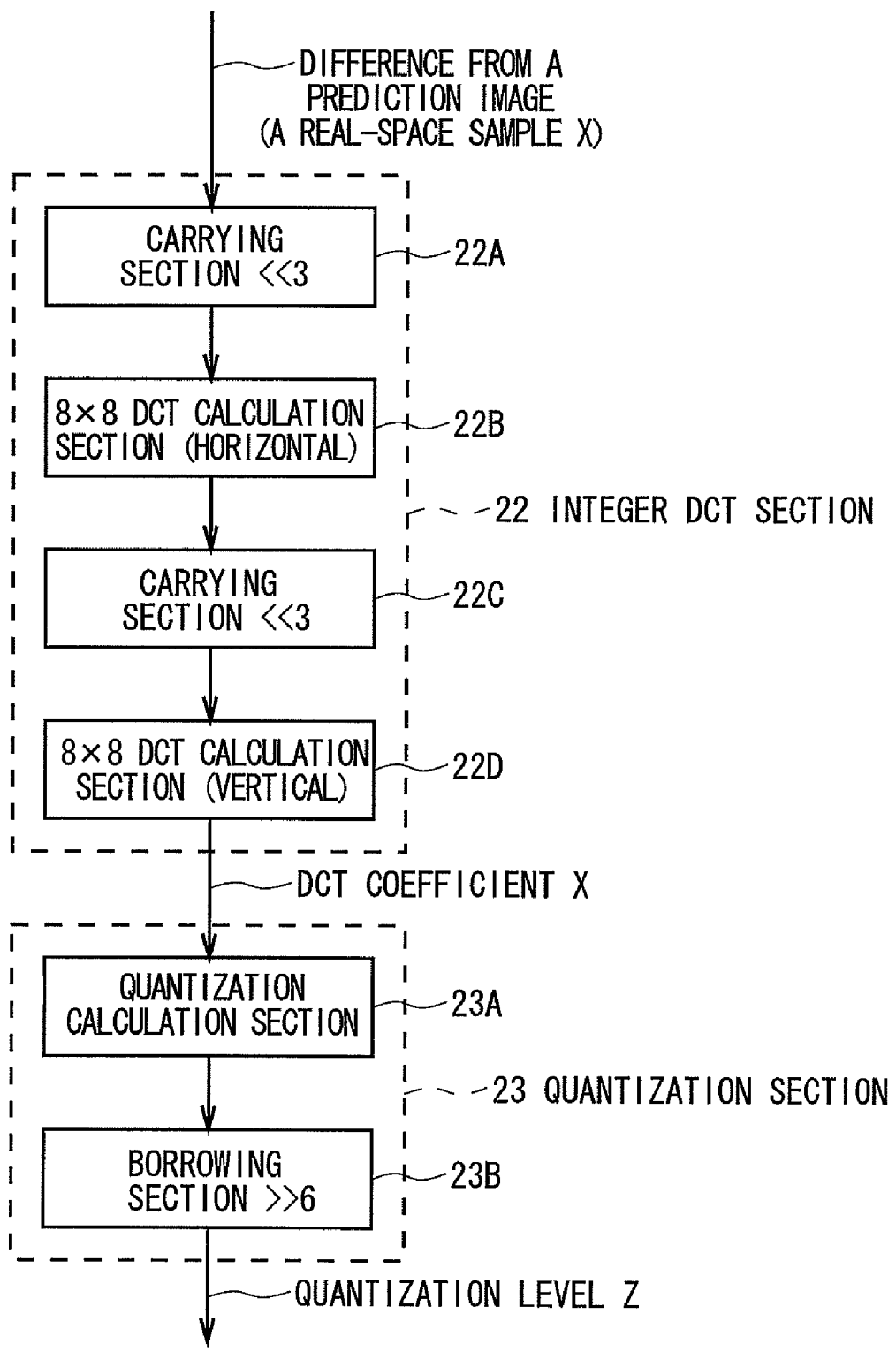
FIG. 30 is a diagram providing the detailed description of the configuration of a DCT section and a quantization section according to a sixth embodiment of the present invention.

Specifically, as shown in FIG. 30, before the calculation of 8×8 DCT, the encoding device 16 calculates a DCT coefficient X from input samples each of which was shifted by 3 bits to the left immediately before the horizontal- and vertical-direction 8×8 DCT in order to prevent the calculation rounding even during the integer calculation. The following equation represents the actual 8×8 DCT calculation in the horizontal direction.

$$(X_H[1] \ll 3) = \left(\frac{3}{2}\right)*(x_H[0] \ll 3) + \left(\frac{5}{4}\right)*(x_H[1] \ll 3) + \\ \left(\frac{3}{4}\right)*(x_H[2] \ll 3) + \left(\frac{3}{8}\right)*(x_H[3] \ll 3) - \left(\frac{3}{8}\right)*(x_H[4] \ll 3) - \\ \left(\frac{3}{4}\right)*(x_H[5] \ll 3) - \left(\frac{5}{4}\right)*(x_H[6] \ll 3) - \left(\frac{3}{2}\right)*(x_H[7] \ll 3) \quad (33)$$

The equation (33) can be expressed as follows:

$$(X_H[1] \ll 3) = 12*x_H[0] + 10*x_H[1] + 6*x_H[2] + \\ 3*x_H[3] - 3*x_H[4] - 6*x_H[5] - 10*x_H[6] - 12*x_H[7] \quad (34)$$

That is, thanks to a three-bit carry, each element of the transformation matrix A is multiplied by eight. This maintains the same level of accuracy in calculation as when every element of the transformation matrix A is an integer.

Incidentally, the example of the equations (33) and (34) refers to the second component from the low-frequency side of the horizontal direction. However, even as for the conversion of another horizontal and vertical direction, the one shifted by three bits to the left is applied as the input signal of 8×8 DOT.

The 8×8 DCT coefficients X obtained as a result of those calculation processes are the one shifted by three bits to the left and the other shifted by six bits to the left in the horizontal and vertical directions, respectively. Therefore, in order to maintain the consistency of the whole system (the encoding and decoding sections), a 6-bit right-shifting process needs to be performed after the 8×8 DCT calculation process.

This 6-bit right-shifting calculation process can be carried altogether out inside the quantization section 23. That is, a conventional encoding device, following the equation (35) described below, performs the quantization calculation process to calculate the quantization level Z corresponding to the quantization coefficient. Incidentally, Z represents the quantization level, MF represents a rescaling factor calculated from a value defined by the AVC standard, W is the DCT coefficient, and $f_1$ is a rounding factor based on which the position of rounding-up and rounding-down is determined.

$$Z=\{(MF*16/Q\text{matrix})*W+f1\} \gg (15+QP/6) \quad (35)$$

Meanwhile, the quantization section 23 of the encoding device 16 can perform calculation, including the 6-bit right-shifting process, by performing the quantization calculation process with the equation (36), thereby maintaining the consistency of the whole system. Incidentally, $f_2$ is a rounding factor based on which, the position of rounding-down is determined; the value has moved from $f_1$ due to the result of the carry by the integer DCT processing section 22.

$$Z=\{(MF*16/Q\text{matrix})*W+f2\} \gg (15+QP/6+6) \quad (36)$$

That is, before the 8×8 DCT calculation, the encoding device 16 carries each element of the transformation matrix A by three bits and a quantization calculation section 23b carries it by six bits. At this time, the encoding device 16 performs the 6-bit carrying at the same time as it performs borrowing during the quantization calculation process. This reduces the number of times the borrowing is carried out, thereby reducing the rounding of calculation, which might be caused by the borrowing, as much as possible.

FIG. 30 is a schematic block diagram illustrating a calculation rounding reduction process for 8×8 DCT.

When receiving the input x, the integer DCT section 22 of the encoding device 16 uses a carrying section 22a to carry it, uses an 8×8 DCT calculation section 22b to perform horizontal-direction 8×8 DCT calculation, and then calculate the output $X_H$. Incidentally, the integer DCT section 22 actually carries each element by three bits during 8×8 DCT calculation, as shown in the equation (33).

Furthermore, similarly, the integer DCT section 22 carries the output $X_H$ using a carrying section 22d, uses an 8×8 DCT calculation section 22b to perform vertical-direction 8×8 DOT calculation, and then calculate the output X. The output X is supplied to the quantization section 22 as the DCT coefficient W.

After receiving the DCT coefficient W, the quantization section 23 uses a quantization calculation section 23a to perform a quantization process and therefore calculates the quantization level Z; the quantization section 23 uses a borrowing section 23b to borrow 6 bits for the quantization level Z. Incidentally, the quantization section 23 actually carries each element by six bits during the quantization calculation according to the equation (36).

In that manner, for 8×8 DCT, the encoding device 16 carries each element of the transformation matrix A by three bits before the 8×8 DCT calculation process, and, after calculation, carries the result of calculation by six bits. In this manner, the encoding device 16 prevents the calculation rounding of the 8×8 DCT calculation process, which occurs because each element of the transformation matrix A is a fractional number, and maintains the consistency of the whole system.

(6-2) Operation and Effect

With the configuration above, when performing the 8×8 DCT process as the integer DCT process, the encoding device 16 carries each element of calculation-target image data or the transformation matrix in the horizontal and vertical directions, before the completion of the 8×8 DCT calculation process for the horizontal and vertical directions (the equation (33)). Then, after completing the 8×8 DCT calculation process for the horizontal and vertical directions, the encoding device 16 borrows three bits for the coefficient data based on the DCT coefficient (the equation (36)).

Therefore, the encoding device 16 can reduce the calculation rounding of the decimal fraction, which might be caused by the 8×8 DCT calculation process, and prevent the deterioration of the quality of image associated with encoding in an effective manner. The encoding device 16, in particular, can effectively prevent the decline of the quality of image associated with a plurality of 8×8 DCT calculation processes during dubbing.

(6-3) Decoding Device

Figure 31:
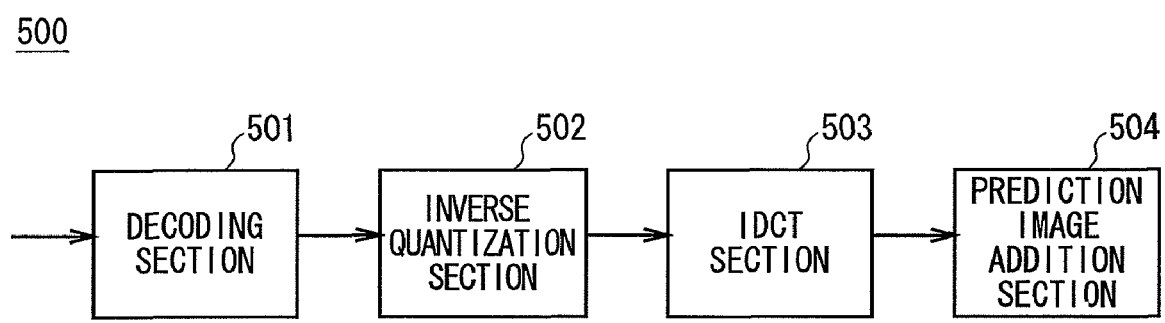
FIG. 31 is a diagram illustrating the configuration of a decoding device according to the present invention.

The following describes the configuration of a decoding device 500 that decodes an actual encoding stream which was encoded in that manner, with reference to FIG. 31.

After receiving the actual encoding stream, the decoding device 500 starts decoding the actual encoding stream using setting information set in the actual encoding stream. Specifically, the decoding device 500 supplies the actual encoding stream to a decoding section 501. The decoding section 501 decodes the actual encoding stream to generate quantization data, and supplies them to an inverse quantization section 502.

The inverse quantization section 502 uses the quantization parameter QP set in the setting information to inversely quantize the quantization data and there reproduce image data made of the DCT coefficients, and supplies them to an IDCT section 503. The IDCT section 503 performs an IDCT process for the image data, and supplies difference image data to a prediction image addition section 504.

The prediction image addition section 504 adds to the difference image data a prediction value predicted by an inverse intra prediction process and a motion prediction process, generates a video output signal representing an image, and supplies it to an external device (not shown).

(6-4) Other Embodiment

In the above-noted fifth embodiment, during the 8×8 DCT calculation process, the device carries each element of the transformation matrix A by three bits. However, the present invention is not limited to this. For example, each element of the transformation matrix A which was carried by three bits in advance may be stored for later use. Moreover, according to the present invention, even if each element of the input x is carried by three bits in advance, the same effect can be obtained. Furthermore, according to the present invention, even if they are carried by one or two digits, or four or more bits, the calculation rounding can be reduced.

Furthermore, in the above-noted fifth embodiment, after the quantization calculation section 23a, 6-bit borrowing is carried out. However, the present, invention is not limited to this. For example, 6-bit borrowing may be performed after the 8×8 DCT calculation section 22d. This allows a data transmission line not to be made thick even if the amount of data increased due to carrying, when the integer DCT section 22 and the quantization section 23 are designed as different circuit blocks. Moreover, 3-bit borrowing may be carried out after the 8×8 DCT calculation sections 22b and 22c.

Furthermore, in the above-noted fifth embodiment, the encoding device 16, which serves as an image processing device, includes: the carrying section 22a, which serves as a carrying section; and the carrying section 22c, which serves as a borrowing section. However, the present invention is not limited to this. The image processing device of the present invention may include the carrying section and the borrowing section that have been configured in various different manners.

Furthermore, in the above-noted first to fifth embodiments, the encoding device, which serves as an image processing device, performs the encoding process. However, the present invention is not limited to this. The image processing device may perform both the encoding and decoding processes.

The above describes the embodiments of the present invention, but this does not limit the scope of the present invention. Various modifications and alterations may occur insofar as they are within the scope of the appended claims or the equivalents thereof.

For example, the above-noted functions of the encoding device and method may be realized by a computer program; these may be realized as a storage medium on which the program is recorded.

DESCRIPTION OF SYMBOLS

1 . . . FIRST ENCODING SECTION, 3 . . . BACK SEARCH SECTION, 4 . . . SECOND ENCODING SECTION, 5 . . . PREDICTION MODE DETECTION SECTION, 6 . . . Qmatrix DETECTION SECTION, 7 . . . OP DETECTION SECTION, 20 . . . PRE-ENCODER, 21 . . . INTRA-IMAGE PREDICTION MODE DETERMINATION SECTION, 22 . . . INTEGER DCT SECTION, 23 . . . QUANTIZATION SECTION, 24 . . . ENTROPY CALCULATION SECTION, 30 . . . BACK SEARCH SECTION, 31 . . . Qmatrix DETECTION SECTION, 32 . . . OP DETECTION SECTION, 33 . . . INTRA-IMAGE PREDICTION MODE DETECTION SECTION, 40 . . . AMOUNT-OF-CODES CONTROL SECTION, 41 . . . Qmatrix/OP DECISION SECTION, 45 . . . INTRA-IMAGE PREDICTION MODE, DECISION SECTION, 50 . . . PARAMETER ENCODER, 51 . . . INTRA-IMAGE PREDICTION PROCESSING SECTION, 52 . . . INTEGER DCT SECTION, 53 . . . QUANTIZATION SECTION, ENTROPY ENCODING SECTION, 100 . . . FIRST PRE-ENCODER, 109 . . . AMOUNT-OF-CODES CONTROL SECTION, 200 . . . SECOND PRE-ENCODER, 300 . . . PARAMETER ENCODER.

The invention claimed is:

1. An image processing device comprising:
   an orthogonal transformation section that generates a transformation coefficient by performing orthogonal transformation for image data, and performs, in terms of correlation with inverse orthogonal transformation, scale change on a value of a coefficient element constituting the transformation coefficient with a plurality of scales;
   a division factor calculation section that calculates a plurality of division factors by multiplying the scale change by a decoding factor calculated based on a plurality of quantization factors possibly used during decoding;
   a sum calculation section that calculates, for each detection unit, the sum of evaluation values based on a residue obtained as a result of dividing the element of the transformation coefficient by a plurality of the division factors; and
   a quantization factor detection section that compares correlations of the sum of the evaluation values with a plurality of the division factors, and detects, based on the division factor whose sum of the evaluation values is a minimum value, the quantization factor used in the previous process of encoding the image data.

2. The image processing device according to claim 1, wherein
   the quantization factor is a quantization parameter set for each quantization unit.

3. The image processing device according to claim 2, wherein
   the quantization factor is a quantization matrix that is set for each intra-image encoding unit and in which a value of each coefficient factor of the transformation coefficient is set.

4. The image processing device according to claim 3, comprising:
   an intra-image encoding section that is set for each intra-image encoding unit and that generates a plurality of items of image data by encoding input image data according to a plurality of predetermined intra-image encoding methods; and
   an intra-image encoding method detection section that detects one intra-image encoding method used in the previous process of encoding the input image data, based on the sum of the evaluation values at a time when the quantization factor detected by the quantization factor detection section was used, among a plurality of items of the image data.

5. The image processing device according to claim 1, wherein
the sum calculation section regards a division value obtained as a result of dividing the residue by the division factor as the evaluation value.

6. The image processing device according to claim 5, wherein
the sum calculation section regards a division value obtained as a result of dividing the residue by the division factor as the evaluation value when an absolute value of the coefficient element is less than a standardization threshold, while regarding the residue as the evaluation value when an absolute value of the coefficient element is greater than or equal to the standardization threshold.

7. The image processing device according to claim 5, wherein
the sum calculation section calculates a multiplication value obtained as a result of multiplying the residue by the coefficient element, and regards a division value obtained as a result of dividing the multiplication value by the division factor as the evaluation value.

8. The image processing device according to claim 2, comprising
a rear original image determination section that makes a determination as to whether the image data are an original image that have not yet undergone any encoding process or an unoriginal image that has undergone an encoding process at least once, based on the ratio of the image data from which the minimum value was detected to the image data to be processed by the quantization factor detection section.

9. The image processing device according to claim 8, comprising
a search range specification section that specifies, among a plurality of decoding factors possibly used in the decoding process, part of them as a search area, wherein
the original image determination section includes:
a minimum value count section that counts the minimum number of times when a minimum value of the quantization parameter corresponding to the above minimum value is a minimum value of the quantization parameter within the search range;
a process times count section that counts the number of image data processes the encoding unit detection section has performed on per detection unit basis, wherein
the ratio of the number of the image data processes to the minimum number of times is regarded as the ratio of the image data from which the minimum value was detected to the image data to be processed by the quantization factor detection section.

10. The image processing device according to claim 1, wherein
the search range setting section includes:
a front orthogonal transformation section that performs orthogonal transformation for the image data to generate a transformation coefficient;
an element count section that counts the number of times when each value of the coefficient elements constituting the transformation coefficient appears as the number of element occurrences; and
a quantization parameter estimation section that estimates the quantization parameter on per image encoding unit basis based on the dispersion state of the number of element occurrences.

11. The image processing device according to claim 10, comprising
a front original image determination section that makes a determination as to whether the image data are an original image that have not yet undergone any encoding process or an unoriginal image that has undergone an encoding process at least once, based on the dispersion state of the number of element occurrences.

12. The image processing device according to claim 11, wherein
the quantization parameter estimation section detects the quantization parameter based on a first peak where an absolute value of the coefficient element becomes a minimum value (but except zero) as for the number of element occurrences.

13. The image processing device according to claim 10, wherein
the quantization parameter estimation section includes:
an accumulation section that sets a reference element value for an absolute value of the coefficient element, and calculates, as an accumulation value corresponding to the reference element value, an accumulation value by accumulating values obtained as a result of multiplying a separation value separated from the reference element value by the number of occurrences of the absolute value of the coefficient element; and
an estimation quantization parameter decision section that determines an estimation quantization parameter that is near the quantization parameter used in the previous encoding process, based on the reference element value corresponding to the smallest accumulation value, among the accumulation values of the different reference element values.

14. The image processing device according to claim 13, wherein
the estimation quantization parameter decision section sets the reference element value based on a search quantization parameter that is a detection target for an absolute value of the coefficient element, and if the reference value is determined as a maximum value, determines that the search quantization matrix is the estimation quantization matrix.

15. The image processing device according to claim 10, comprising
an estimation quantization matrix decision section that sets a reference element value based on the estimation quantization parameter and the detection-target quantization matrix, and determines, if it is determined that the reference value is a maximum value, the search quantization matrix as the estimation quantization matrix.

16. The image processing device according to claim 10, comprising:
an amount-of-generated-codes prediction section that predicts the amount of generated codes of each quantization parameter by calculation of entropy based on the number of element occurrences;
a quantization parameter prediction section that predicts, as a prediction parameter, the quantization parameter that allows the amount of generated codes predicted by the amount-of-generated-codes prediction section to become closer to the target amount of codes;
a prediction quantization section that quantizes the transformation coefficient using the prediction parameter to generate prediction quantization data; and a parameter correction section that corrects the prediction parameter based on the amount of generated codes of a prediction stream based on the prediction quantization data.

17. The image processing device according to claim 1, comprising
an initialization parameter setting section that sets a quantization matrix according to a value of the quantization parameter.

18. An image processing method comprising:
an orthogonal transformation step of generating a transformation coefficient by performing orthogonal transformation for image data, and performing, in terms of correlation with inverse orthogonal transformation, scale change on a value of a coefficient element constituting the transformation coefficient with a plurality of scales;
a division factor calculation step of calculating a plurality of division factors by multiplying the scale change by a decoding factor calculated based on a plurality of quantization factors possibly used during decoding;
a sum calculation section step of calculating, for each detection unit, the sum of evaluation values based on a residue obtained as a result of dividing the element of the transformation coefficient by a plurality of the division factors; and
a quantization factor detection step of comparing correlations of the sum of the evaluation values with a plurality of the division factors, and detecting, based on the division factor whose sum of the evaluation values is a minimum value, the quantization factor used in the previous process of encoding the image data.

* * * * *